United States Patent
Izu et al.

(10) Patent No.: US 7,900,050 B2
(45) Date of Patent: Mar. 1, 2011

(54) DIGITAL DOCUMENT MANAGEMENT SYSTEM, DIGITAL DOCUMENT MANAGEMENT METHOD, AND DIGITAL DOCUMENT MANAGEMENT PROGRAM

(75) Inventors: Tetsuya Izu, Kawasaki (JP); Masahiko Takenaka, Kawasaki (JP); Takashi Yoshioka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 890 days.

(21) Appl. No.: 11/512,323

(22) Filed: Aug. 30, 2006

(65) Prior Publication Data

US 2007/0168672 A1 Jul. 19, 2007

Related U.S. Application Data

(63) Continuation-in-part of application No. 11/403,824, filed on Apr. 14, 2006, now abandoned.

(30) Foreign Application Priority Data

Jan. 16, 2006 (JP) ................................. 2006-007314
Jun. 30, 2006 (JP) ................................. 2006-182707

(51) Int. Cl.
*H04L 9/32* (2006.01)
(52) U.S. Cl. ............... 713/176; 705/71; 705/76; 705/80; 705/72; 380/28; 380/30
(58) Field of Classification Search .................. 713/176; 705/71, 76, 80, 72; 380/28, 30
See application file for complete search history.

(56) References Cited

U.S. PATENT DOCUMENTS 5,465,299 A * 11/1995 Matsumoto et al. .......... 713/176
6,907,529 B1 6/2005 Hirose
7,093,137 B1 * 8/2006 Sato et al. ..................... 713/193
2004/0255116 A1 12/2004 Hane et al.
2005/0091261 A1 4/2005 Wu et al.
2005/0216524 A1 * 9/2005 Gomes et al. ................. 707/201
2007/0168672 A1 * 7/2007 Izu et al. ....................... 713/176

FOREIGN PATENT DOCUMENTS

| EP | 1 517 214 | 3/2005 |
|---|---|---|
| JP | 2003-216601 | 7/2003 |
| WO | WO 00/62220 | 10/2000 |
| WO | 2006/008847 | 1/2006 |
| WO | WO2006/008847 | 1/2006 |

OTHER PUBLICATIONS

European Search Report mailed Mar. 17, 2010 in corresponding Application Serial No. EP 06 25 4545.

(Continued)

*Primary Examiner* — Thanhnga B Truong
*Assistant Examiner* — Angela Holmes
(74) *Attorney, Agent, or Firm* — Staas & Halsey LLP

(57) ABSTRACT

Disclosed is a digital document management program capable of achieving a third-party certification of document information with reduced amount of meta data.

At the registration time of new document information, the digital document management program manages a digital signature created in association with document information. At the correction time of the document information, the program acquires partial identification information related to a corrected part of the document information before correction, creates a digital signature to be appended to the corrected document information, and manages the digital signature and partial identification information related to the corrected part of the document information in association with the corrected document information. At the verification time, the program uses partial identification information, the partial identification information corresponding to a corrected part of the document information before correction, and digital signature to perform verification.

19 Claims, 60 Drawing Sheets

OTHER PUBLICATIONS

Anna Lysyanskaya et al.: "Sequential Aggregate Signatures From Trapdoor Permutations", Apr. 17, 2004, Advances In Cryptology—Eurocrypt 2004; Springer-Verlag, Berlin/Heidelberg, pp. 74-90, XP019005045, ISBN: 9783540219354.

* cited by examiner

FIG. 3

POLICY INFORMATION.xml

```
<POLICY INFORMATION DocName="AGREEMENT DOCUMENT">
    <INPUT TAG>NAME</INPUT TAG>
    <INPUT TAG>ADDRESS</INPUT TAG>
    <INPUT TAG>BIRTH DATE</INPUT TAG>
    <ADD TAG>NULL</ADD TAG>
    <CORRECTABLE AREA>NAME</CORRECTABLE AREA>
    <CORRECTABLE AREA>ADDRESS</CORRECTABLE AREA>
    <NON-CORRECTABLE AREA>BIRTH DATE</NON-CORRECTABLE AREA>
    <SANITIZING ALLOWABLE AREA>BIRTH DATE</SANITIZING ALLOWABLE AREA>
<POLICY INFORMATION>
...
```

FIG. 4

AGREEMENT DOCUMENT_FIRST VERSION.xml

```
<PROFILE DATA R="012">
    <NAME R="123">HANAKO SUZUKI</NAME>
    <ADDRESS R="234">KAWASAKI-SHI NAKAHARA-KU</ADDRESS>
    <BIRTH DATE R="345">1970/11/19</BIRTH DATE>
</PROFILE DATA>
...
```

→ HASH INFORMATION IS GENERATED FROM CHARACTER STRING "HANAKO SUZUKI 123"

↓

GENERATION RESULT=abcdefgh

PARTIAL IDENTIFICATION INFORMATION_FIRST VERSION.xml

```
<PARTIAL IDENTIFICATION INFORMATION>
    <Hash ELEMENT="BIRTH DATE">yz012345</Hash>
    <Hash ELEMENT="PROFILE DATA">ijklmnop</Hash>
    <Hash ELEMENT="NAME">abcdefgh</Hash>
    <Hash ELEMENT="ADDRESS">qrstuvwx</Hash>
</PARTIAL IDENTIFICATION INFORMATION>
...
```

FIG. 8

```
PARTIAL CORRECTION INFORMATION_SECOND VERSION.xml

<PARTIAL CORRECTION INFORMATION>
    <TARGET FILE NAME>AGREEMENT DOCUMENT_SECOND VERSION.xml</TARGET FILE NAME>
    <CORRECTED DATE AND TIME>2004/4/1 10:34:21</CORRECTED DATE AND TIME>
    <CORRECTOR>HANAKO SUZUKI</CORRECTOR>
    <CORRECTED PART>ADDRESS</CORRECTED PART>
    <CORRECTION CODE>U:CORRECTION</CORRECTION CODE>
    <INFORMATION BEFORE CORRECTION>KAWASAKI-SHI NAKAHARA-KU</INFORMATION BEFORE CORRECTION>
    <CORRECTION REASON>DUE TO RELOCATION</CORRECTION REASON>
</PARTIAL CORRECTION INFORMATION>
...
```

FIG. 11

```
POLICY INFORMATION.xml

<POLICY INFORMATION DocName="AGREEMENT DOCUMENT">
    <INPUT TAG>NAME</INPUT TAG>
    <INPUT TAG>ADDRESS</INPUT TAG>
    <INPUT TAG>BIRTH DATE</INPUT TAG>
    <ADD TAG>NULL</ADD TAG>
    <CORRECTABLE AREA>NAME</CORRECTABLE AREA>
    <CORRECTABLE AREA>ADDRESS</CORRECTABLE AREA>
    <NON-CORRECTABLE AREA>BIRTH DATE</NON-CORRECTABLE AREA>
    <SANITIZING ALLOWABLE AREA>BIRTH DATE</SANITIZING ALLOWABLE AREA>
<POLICY INFORMATION>
...
```

```
PARTIAL CORRECTION INFORMATION_SECOND VERSION.xml

<PARTIAL CORRECTION INFORMATION>
    <TARGET FILE NAME>AGREEMENT DOCUMENT_SECOND VERSION.xml</TARGET FILE NAME>
    <CORRECTED DATE AND TIME>2004/4/1 10:34:21</CORRECTED DATE AND TIME>
    <CORRECTOR>HANAKO SUZUKI</CORRECTOR>
    <CORRECTED PART>ADDRESS</CORRECTED PART>
    <CORRECTION CODE>U:CORRECTION</CORRECTION CODE>
    <INFORMATION BEFORE CORRECTION>KAWASAKI-SHI NAKAHARA-KU</INFORMATION BEFORE CORRECTION>
    <CORRECTION REASON>DUE TO RELOCATION</CORRECTION REASON>
</PARTIAL CORRECTION INFORMATION>
...
```

FIG. 25

```
INSURANCE APPLICATION FORM_FIRST VERSION.xml

<INSURANCE APPLICATION FORM R="000">
   <CONTRACTOR R="123">
      <NAME R="234">
         <FAMILY NAME R="345">SUZUKI</FAMILY NAME>
         <FIRST NAME R="456">HANAKO</FIRST NAME>
      </NAME>
      <ADDRESS R="567">UMISAKI-SHI UEHARA-KU</ADDRESS>
      <TELEPHONE NUMBER R="678">004-888-9999</TELEPHONE NUMBER>
   </CONTRACTOR>
   <DESIGNATED ACCOUNT R="789">
      <NAME OF FINANCIAL INSTITUTION R="890">TATEHAMA BANK</NAME OF FINANCIAL INSTITUTION>
      <ACCOUNT NUMBER R="901">12345678</ACCOUNT NUMBER>
      <ACCOUNT HOLDER R="012">HANAKO SUZUKI</ACCOUNT HOLDER>
   </DESIGNATED ACCOUNT>
   <AGREEMENT INFORMATION R="abc">
      <KIND OF INSURANCE R="bcd>A,B</KIND OF INSURANCE>
      <INSURANCE AMOUNT R=cde">1,800</INSURANCE AMOUNT>
   </AGREEMENT INFORMATION>
</INSURANCE APPLICATION FORM>                    (SUZUKI)
```

FIG. 27

```
PARTIAL IDENTIFICATION INFORMATION_FIRST VERSION.xml

<PARTIAL IDENTIFICATION INFORMATION>
  <Hash ELEMENT="INSURANCE APPLICATION FORM">bd623</Hash>
  <Hash ELEMENT="CONTRACTOR">7ed6c</Hash>
  <Hash ELEMENT="NAME">cba76</Hash>
  <Hash ELEMENT="FAMILY NAME">a8b99</Hash>
  <Hash ELEMENT="FIRST NAME">53a8d</Hash>
  <Hash ELEMENT="ADDRESS">03aed</Hash>
  <Hash ELEMENT="TELEPHONE NUMBER">6832c</Hash>
  <Hash ELEMENT="DESIGNATED ACCOUNT">8c320</Hash>
  <Hash ELEMENT="NAME OF FINANCIAL INSTITUTION">b2d7a</Hash>
  <Hash ELEMENT="ACCOUNT NUMBER">5abc2</Hash>
  <Hash ELEMENT="ACCOUNT HOLDER">21acf</Hash>
  <Hash ELEMENT="AGREEMENT INFORMATION">7df21</Hash>
  <Hash ELEMENT="KIND OF INSURANCE">abfd3</Hash>
  <Hash ELEMENT="INSURANCE AMOUNT">623a1</Hash>
</PARTIAL IDENTIFICATION INFORMATION>
```
(SUZUKI)

FIG. 30

```
INSURANCE APPLICATION FORM_SECOND VERSION.xml

<INSURANCE APPLICATION FORM R="111">
   <CONTRACTOR R="123">
      <NAME R="234">
         <FAMILY NAME R="345">SUZUKI</FAMILY NAME>
         <FIRST NAME R="456">HANAKO</FIRST NAME>
      </NAME>
      <ADDRESS R="567">UMISAKI-SHI UEHARA-KU</ADDRESS>
      <TELEPHONE NUMBER R="678">004-888-9999</TELEPHONE NUMBER>
   </CONTRACTOR>
   <DESIGNATED ACCOUNT R="789">
      <NAME OF FINANCIAL INSTITUTION R="890">TATEHAMA BANK</NAME OF FINANCIAL INSTITUTION>
      <ACCOUNT NUMBER R="901">12345678</ACCOUNT NUMBER>
      <ACCOUNT HOLDER R="012">HANAKO SUZUKI</ACCOUNT HOLDER>
   </DESIGNATED ACCOUNT>
   <AGREEMENT INFORMATION R="xyz">                                    ─── TZ
      <KIND OF INSURANCE R="asd">*****</KIND OF INSURANCE>
      <INSURANCE AMOUNT R="zxc">*****</INSURANCE AMOUNT>
   </AGREEMENT INFORMATION>
</INSURANCE APPLICATION FORM>                              (INSURANCE)
```

FIG. 34

```
INSURANCE APPLICATION FORM_THIRD VERSION

<INSURANCE APPLICATION FORM R="222">
   <CONTRACTOR R="123">
      <NAME R="234">
         <FAMILY NAME R="345">SUZUKI</FAMILY NAME>
         <FIRST NAME R="456">HANAKO</FIRST NAME>
      </NAME>
      <ADDRESS R="567">UMISAKI-SHI UEHARA-KU</ADDRESS>
      <TELEPHONE NUMBER R="678">004-888-9999</TELEPHONE NUMBER>
   </CONTRACTOR>
   <DESIGNATED ACCOUNT R="789">
      <NAME OF FINANCIAL INSTITUTION R="890">TATEHAMA BANK</NAME OF FINANCIAL INSTITUTION>
      <ACCOUNT NUMBER R="901">12345678</ACCOUNT NUMBER>
      <ACCOUNT HOLDER R="012">HANAKO SUZUKI</ACCOUNT HOLDER>
   </DESIGNATED ACCOUNT>
   <AGREEMENT INFORMATION R="xyz">
      <KIND OF INSURANCE R="asd">*****</KIND OF INSURANCE>
      <INSURANCE AMOUNT R="zxc">*****</INSURANCE AMOUNT>
   </AGREEMENT INFORMATION>
   <FINANCIAL CREDIT INFORMATION R="cvb">               ─ KZ
      <CREDIT INFORMATION R="sdf">OK</CREDIT INFORMATION>
      <CREDITNO R="dfs">YS30200</CREDIT INFORMATION>
   </FINANCIAL CREDIT INFORMATION>
</INSURANCE APPLICATION FORM>                     (FINANCE)
```

FIG. 37

INSURANCE APPLICATION FORM_SECOND VERSION.xml

```
<INSURANCE APPLICATION FORM R="111" Ver="2">
  <CONTRACTOR R="123">
    <NAME R="234">
      <FAMILY NAME R="345">SUZUKI</FAMILY NAME>
      <FIRST NAME R="456">HANAKO</FIRST NAME>
    </NAME>
    <ADDRESS R="567">UMISAKI-SHI UEHARA-KU</ADDRESS>
    <TELEPHONE NUMBER R="678">004-888-9999</TELEPHONE NUMBER>
  </CONTRACTOR>
  <DESIGNATED ACCOUNT R="789">
    <NAME OF FINANCIAL INSTITUTION R="890">TATEHAMA BANK</NAME OF FINANCIAL INSTITUTION>
    <ACCOUNT NUMBER R="901">12345678</ACCOUNT NUMBER>
    <ACCOUNT HOLDER R="012">HANAKO SUZUKI</ACCOUNT HOLDER>
  </DESIGNATED ACCOUNT>
  <AGREEMENT INFORMATION R="xyz">
    <KIND OF INSURANCE R="asd">*****</KIND OF INSURANCE>
    <INSURANCE AMOUNT R="zxc">*****</INSURANCE AMOUNT>
  </AGREEMENT INFORMATION>
</INSURANCE APPLICATION FORM>
```

(INSURANCE)

PARTIAL IDENTIFICATION INFORMATION.xml

```
<PARTIAL IDENTIFICATION INFORMATION Ver="1">
  <Hash ELEMENT="INSURANCE APPLICATION FORM">bd623</Hash>
  <Hash ELEMENT="CONTRACTOR">7ed6c</Hash>
  <Hash ELEMENT="NAME">cba76</Hash>
  <Hash ELEMENT="FAMILY NAME">a8b99</Hash>
  <Hash ELEMENT="FIRST NAME">53a8d</Hash>
  <Hash ELEMENT="ADDRESS">03aed</Hash>
  <Hash ELEMENT="TELEPHONE NUMBER">6832c</Hash>
  <Hash ELEMENT="DESIGNATED ACCOUNT">8c320</Hash>
  <Hash ELEMENT="NAME OF FINANCIAL INSTITUTION">b2d7a</Hash>
  <Hash ELEMENT="ACCOUNT NUMBER">5abc2</Hash>
  <Hash ELEMENT="ACCOUNT HOLDER">21acf</Hash>
  <Hash ELEMENT="AGREEMENT INFORMATION">7df21</Hash>
  <Hash ELEMENT="KIND OF INSURANCE">abfd3</Hash>
  <Hash ELEMENT="INSURANCE AMOUNT">623a1</Hash>
</PARTIAL IDENTIFICATION INFORMATION>
```

(SUZUKI)

```
<PARTIAL IDENTIFICATION INFORMATION Ver="2">
  <Hash ELEMENT="CONTRACTOR">7ed6c</Hash>
  <Hash ELEMENT="DESIGNATED ACCOUNT">8c320</Hash>
  <Hash ELEMENT="INSURANCE APPLICATION FORM">a2309</Hash>
  <Hash ELEMENT="AGREEMENT INFORMATION">8321d</Hash>
  <Hash ELEMENT="KIND OF INSURANCE">d2419</Hash>
  <Hash ELEMENT="INSURANCE AMOUNT">f56da</Hash>
</PARTIAL IDENTIFICATION INFORMATION>
```

(INSURANCE)

FIG. 38

INSURANCE APPLICATION FORM_THIRD VERSION.xml

```
<INSURANCE APPLICATION FORM R="222" Ver="3">
  <CONTRACTOR R="123">
    <NAME R="234">
      <FAMILY NAME R="345">SUZUKI</FAMILY NAME>
      <FIRST NAME R="456">HANAKO</FIRST NAME>
    </NAME>
    <ADDRESS R="567">UMISAKI-SHI UEHARA-KU</ADDRESS>
    <TELEPHONE NUMBER R="678">004-888-9999</TELEPHONE NUMBER>
  </CONTRACTOR>
  <DESIGNATED ACCOUNT R="789">
    <NAME OF FINANCIAL INSTITUTION R="890">TATEHAMA BANK</NAME OF FINANCIAL INSTITUTION>
    <ACCOUNT NUMBER R="901">12345678</ACCOUNT NUMBER>
    <ACCOUNT HOLDER R="012">HANAKO SUZUKI</ACCOUNT HOLDER>
  </DESIGNATED ACCOUNT>
  <AGREEMENT INFORMATION R="xyz">
    <KIND OF INSURANCE R="asd">*****</KIND OF INSURANCE>
    <INSURANCE AMOUNT R="zxc">*****</INSURANCE AMOUNT>
  </AGREEMENT INFORMATION>
  <FINANCIAL CREDIT INFORMATION R="cvb">
    <CREDIT INFORMATION R="sdf">OK</CREDIT INFORMATION>
    <CREDIT NO R="dfs">YS203100</CREDIT NO>
  </FINANCIAL CREDIT INFORMATION>
</INSURANCE APPLICATION FORM>
```
(FINANCE)

PARTIAL IDENTIFICATION INFORMATION.xml

```
<PARTIAL IDENTIFICATION INFORMATION Ver="1">
  <Hash ELEMENT="INSURANCE APPLICATION FORM">bd623</Hash>
  <Hash ELEMENT="CONTRACTOR">7ed6c</Hash>
  <Hash ELEMENT="NAME">cba76</Hash>
  <Hash ELEMENT="FAMILY NAME">a8b99</Hash>
  <Hash ELEMENT="FIRST NAME">53a8d</Hash>
  <Hash ELEMENT="ADDRESS">03aed</Hash>
  <Hash ELEMENT="TELEPHONE NUMBER">6832c</Hash>
  <Hash ELEMENT="DESIGNATED ACCOUNT">8c320</Hash>
  <Hash ELEMENT="NAME OF FINANCIAL INSTITUTION">b2d7a</Hash>
  <Hash ELEMENT="ACCOUNT NUMBER">5abc2</Hash>
  <Hash ELEMENT="ACCOUNT HOLDER">21acf</Hash>
  <Hash ELEMENT="AGREEMENT INFORMATION">7df21</Hash>
  <Hash ELEMENT="KIND OF INSURANCE">abfd3</Hash>
  <Hash ELEMENT="INSURANCE AMOUNT">623a1</Hash>
</PARTIAL IDENTIFICATION INFORMATION>
```
(SUZUKI)

```
<PARTIAL IDENTIFICATION INFORMATION Ver="2">
  <Hash ELEMENT="CONTRACTOR">7ed6c</Hash>
  <Hash ELEMENT="DESIGNATED ACCOUNT">8c320</Hash>
  <Hash ELEMENT="INSURANCE APPLICATION FORM">a2309</Hash>
  <Hash ELEMENT="AGREEMENT INFORMATION">8321d</Hash>
  <Hash ELEMENT="KIND OF INSURANCE">d2419</Hash>
  <Hash ELEMENT="INSURANCE AMOUNT">f56da</Hash>
</PARTIAL IDENTIFICATION INFORMATION>
```
(INSURANCE)

```
<PARTIAL IDENTIFICATION INFORMATION Ver="3">
  <Hash ELEMENT="CONTRACTOR">7ed6c</Hash>
  <Hash ELEMENT="DESIGNATED ACCOUNT">8c320</Hash>
  <Hash ELEMENT="AGREEMENT INFORMATION">8321d</Hash>
  <Hash ELEMENT="INSURANCE APPLICATION FORM">df234</Hash>
  <Hash ELEMENT="FINANCIAL CREDIT INFORMATION">32109</Hash>
  <Hash ELEMENT="CREDIT INFORMATION">f6430</Hash>
  <Hash ELEMENT="CREDIT NO">dba21</Hash>
</PARTIAL IDENTIFICATION INFORMATION>
```
(FINANCE)

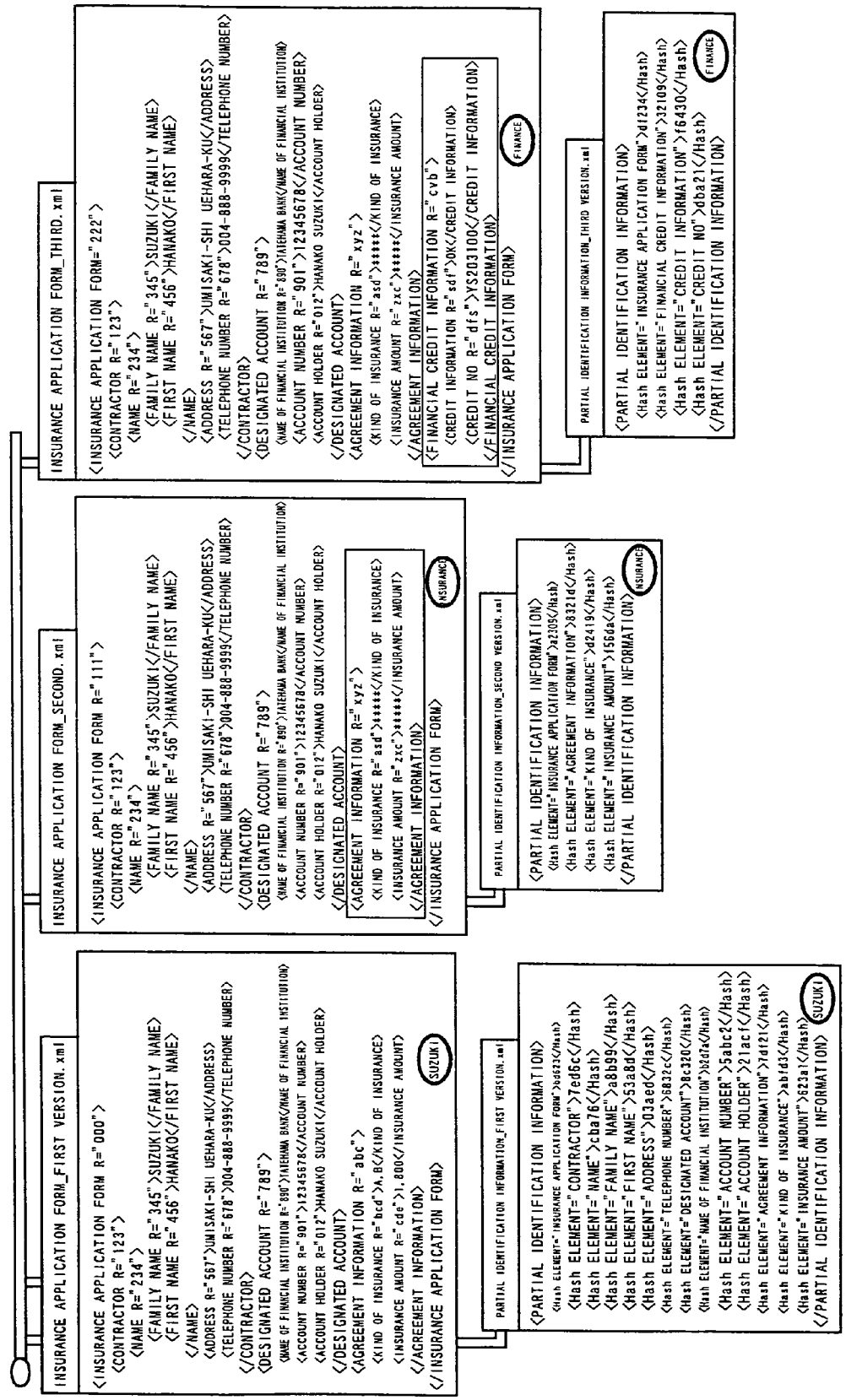
F I G. 40

FIG. 41

```
INSURANCE APPLICATION FORM_FIRST VERSION.xml
```

```
<INSURANCE APPLICATION FORM>
    <CONTRACTOR>
        <NAME>
            <FAMILY NAME>SUZUKI</FAMILY NAME>
            <FIRST NAME>HANAKO</FIRST NAME>
        </NAME>
        <ADDRESS>UMISAKI-SHI UEHARA-KU</ADDRESS>
    </CONTRACTOR>
    <KIND OF INSURANCE>AAA</KIND OF INSURANCE>
</INSURANCE APPLICATION FORM>
```

FIG. 42

```
INSURANCE APPLICATION FORM_FIRST VERSION.xml

<INSURANCE APPLICATION FORM>
    <CONTRACTOR>
        <NAME>
            <FAMILY NAME>SUZUKI</FAMILY NAME>
            <FIRST NAME>HANAKO</FIRST NAME>
        </NAME>
        <ADDRESS>UMISAKI-SHI UEHARA-KU</ADDRESS>
    </CONTRACTOR>
    <KIND OF INSURANCE>AAA</KIND OF INSURANCE>
</INSURANCE APPLICATION FORM>
```

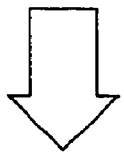

KIND OF INSURANCE IS CHANGED FROM "AAA" TO "BBB"

```
INSURANCE APPLICATION FORM_SECOND VERSION.xml

<INSURANCE APPLICATION FORM>
    <CONTRACTOR>
        <NAME>
            <FAMILY NAME>SUZUKI</FAMILY NAME>
            <FIRST NAME>HANAKO</FIRST NAME>
        </NAME>
        <ADDRESS>UMISAKI-SHI UEHARA-KU</ADDRESS>
    </CONTRACTOR>
    <KIND OF INSURANCE>BBB</KIND OF INSURANCE>
</INSURANCE APPLICATION FORM>
```

| | COMPARISON TARGET (METHOD 0) | METHOD 1 | METHOD 2 |
|---|---|---|---|
| TRANSFER/STORAGE DATA AMOUNT | 7 | 3 | 2 |
| UPPER HALF: THE NUMBER OF LINES<br>LOWER HALF: COST COMPARISON WITH METHOD 0 | — | 57% REDUCTION | 71% REDUCTION |
| VERIFICATION PROCESSING | 14 | 6 | 9 |
| UPPER HALF: NUMBER OF VERIFICATION OPERATIONS<br>LOWER HALF: COST COMPARISON WITH METHOD 0 | — | 57% REDUCTION | 36% REDUCTION |

EMBEDDING OF PARTIAL IDENTIFICATION INFORMATION UPDATE INFORMATION

FIG.62

| | UNDERLYING TECHNIQUE 2 | FIRST EMBODIMENT | SECOND EMBODIMENT |
|---|---|---|---|
| SIGNATURE DATA AMOUNT | $(ad+e)(b+1)$<br>Min: $ad+e$<br>Max: $(ad+e)(b+1)$ | $c(d+\alpha)+e(b+1)$<br>Min: $e$<br>Max: $a(d+\alpha)+e(b+1)$ | $c(d-f+\alpha)+e(b+1)$<br>Min: $e$<br>Max: $a(d-f+\alpha)+e(b+1)$ |
| IDENTIFICATION OF SANITIZER | ENABLED | ENABLED | ENABLED |
| SANITIZING/ADDITION/DELETION/CHANGE | ALL ENABLED | ALL ENABLED | SANITIZING/ADDITION: ENABLED<br>DELETION/CHANGE: DISABLED |
| IDENTIFICATION OF ILLEGAL SANITIZER | ENABLED | ENABLED | ENABLED |

COMPARISON WITH CONVENTIONAL PIAT

WHERE
a: NUMBER OF MESSAGE BLOCKS b: NUMBER OF SANITIZERS
c: NUMBER OF SANITIZED BLOCKS d: HASH DATA AMOUNT
e: DATA AMOUNT OF PUBLIC KEY SIGNATURE f: AVERAGE MESSAGE BLOCK SIZE
$\alpha$: ID LENGTH + BLOCK NO LENGTH

FIG.63

APPLIED TO SIGNATURE TIME (1)

$M^{(0)} = [M_1][M_2][M_3][M_4][M_5][M_6]\cdots[M_n]$ $H^{(0)} = h(M_1)\ h(M_2)\ h(M_3)\ h(M_4)\ h(M_5)\ h(M_6)\ \ h(M_n)$ $\sigma_0 = (h(H^{(0)}))^{sk_0}$
$\sigma^{(0)} = \sigma_0$
DISCLOSED: $M^{(0)}, \sigma^{(0)}$ WHERE
$\sigma^{(0)}$: AGGREGATE SIGNATURE BY SIGNER
$sk_0$: AGGREGATE SIGNATURE PRIVATE KEY OF SIGNER
$pk_0$: AGGREGATE SIGNATURE PUBLIC KEY OF SIGNER
$g_1$: GENERATION SOURCE 1 OF AGGREGATE SIGNATURE
$pk_0 = g_1^{sk_0}$

FIG.64

SANITIZING TIME (1)

$M^{(1)} = [M_1 | M_2 | M_3 \to S_3 | M_4 | M_5 \to S_5 | M_6 | \ldots | M_n]$ $H^{(1)} = h(M_1) \; h(M_2) \; h(S_3) \; h(M_4) \; h(S_5) \; h(M_6) \quad h(M_n)$ $\sigma_1 = (h(H^{(1)}))^{sk_1}$
$\sigma^{(1)} = \sigma^{(0)} \times \sigma_1$
DISCLOSED: $M^{(1)}, \sigma^{(1)}, (3, h(M_3), ID_1), (5, h(M_5), ID_1)$ WHERE
$\sigma^{(1)}$ : AGGREGATE SIGNATURE BY SANITIZER 1
$sk_1$ : AGGREGATE SIGNATURE PRIVATE KEY OF SANITIZER 1
$pk_1$ : AGGREGATE PUBLIC KEY OF SANITIZER 1
$g_1$ : GENERATION SOURCE 1 OF AGGREGATE SIGNATURE
$pk_1 = g_1^{sk_1}$

FIG.65

SANITIZING TIME (2)

$M^{(i)} = [M_1 | M_2 | S_3 | M_4 \to S_4 | S_5 | S_6 | \ldots | M_n]$ $H^{(i)} = h(M_1) \; h(M_2) \; h(S_3) \; h(S_4) \; h(S_5) \; h(S_6) \quad h(M_n)$ $\sigma_i = (h(H^{(i)}))^{sk_i}$
$\sigma^{(i)} = \sigma^{(i-1)} \times \sigma_i$
DISCLOSED: $M^{(i)}, \sigma^{(i)}, (3, h(M_3), ID_1), (5, h(M_5), ID_1), \ldots$
$(4, h(M_4), ID_i)$ WHERE
$\sigma^{(i)}$ : AGGREGATE SIGNATURE BY SANITIZER I
$sk_i$ : AGGREGATE SIGNATURE PRIVATE KEY OF SANITIZER I
$pk_i$ : AGGREGATE PUBLIC KEY OF SANITIZER I
$g_1$ : GENERATION SOURCE 1 OF AGGREGATE SIGNATURE
$pk_i = g_1^{sk_i}$

FIG. 68

| COMPARISON WITH CONVENTIONAL PIAT | | | |
|---|---|---|---|
| | CONVENTIONAL | APPLICATION OF (1)+ AGGREGATE SIGNATURE | APPLICATION OF (2)+ AGGREGATE SIGNATURE |
| SIGNATURE DATA AMOUNT | $(ad+e)(b+1)$<br>Min: $ad+e$<br>Max: $(ad+e)(b+1)$ | $c(d+\alpha)+e$<br>Min: $e$<br>Max: $a(d+\alpha)+e$ | $c(d-f+\alpha)e$<br>Min: $e$<br>Max: $a(d-f+\alpha)+e$ |
| IDENTIFICATION OF SANITIZER | ENABLED | ENABLED | ENABLED |
| SANITIZING/ADDITION/ DELETION/CHANGE | ALL ENABLED | ALL ENABLED | SANITIZING/ADDITION: ENABLED<br>DELETION/CHANGE: DISABLED |
| IDENTIFICATION OF ILLEGAL SANITIZER | ENABLED | DISABLED | DISABLED |

WHERE
a: NUMBER OF MESSAGE BLOCKS        b: NUMBER OF SANITIZERS
c: NUMBER OF SANITIZED BLOCKS      d: HASH DATA AMOUNT
e: DATA AMOUNT OF PUBLIC KEY SIGNATURE    f: AVERAGE MESSAGE BLOCK SIZE
$\alpha$: ID LENGTH + BLOCK NO LENGTH

FIG. 70

<CANCELLATION MARK>　　　　○○ AGREEMENT
(FISCAL STAMP with SUZUKI and YAMADA seals)
(TITLE)

THIS AGREEMENT IS MADE BY AND BETWEEN ○○ (HEREINAFTER REFERRED TO AS "FIRST PARTY") AND ○○ (HEREINAFTER, REFERRED TO AS "SECOND PARTY") WITH RESPECT TO ○○, AS FOLLOWS.
(PREAMBLE)

CONDITION: ARTICLE 1(○○)........　　— P2
　　<CORRECTED WORD> COMMISSIONED BUSINESS
　　ARTICLE 2(○○) ~~COMMISSIONER HANDLING~~...　　— P1
(MAIN CLAUSE)

IN WITNESS WHEREOF, THE PARTIES HERETO HAVE EXECUTED THIS AGREEMENT IN DUPLICATE BY PLACING THEIR SIGNATURES AND SEALS THEREON, AND EACH PARTY SHALL KEEP ONE COPY OF THE ORIGINALS.
(CLOSING REMARK)

ON ○○, ○○, ○○
(DATE)

FIRST PARTY　ADDRESS
　　○○ CO. LTD　MANAGING DIRECTOR
　　MINORU SUZUKI　　(SUZUKI)

SECOND PARTY　ADDRESS
　　○○ (NAME OF FIRM) REPRESENTATIVE
　　TARO YAMADA　　(YAMADA)
(ADDRESS, NAME, AND SEAL OF BOTH PARTIES)

DIGITAL DOCUMENT MANAGEMENT SYSTEM, DIGITAL DOCUMENT MANAGEMENT METHOD, AND DIGITAL DOCUMENT MANAGEMENT PROGRAM

This is a Continuation-In-Part Application of U.S. patent application Ser. No. 11/403,824, filed Apr. 14, 2006, now abandoned.

BACKGROUND OF THE INVENTION

1. Field of the Invention

The present invention relates to a digital document management system or the like that manage document information including digital information and, more particularly, to a digital document management system, a digital document management method, and a digital document management program which are applied to digitization, distribution, storage of a document that needs weight of evidence as heavy as that a paper document provides and which are capable of easily identifying a corrected part in digital document information involving a partial correction (including, e.g., addition, change, deletion, sanitizing), guaranteeing the validity of the correction, and performing a third-party certification of the correction.

2. Description of the Related Art

As a prior art, a correction method and verification method of the validity of the correction used in a paper document will firstly be described.

Conventionally, as a representative correction method for use in performing correction for a paper document, there is known a method as shown in FIG. 69. That is, the method includes: crossing out characters to be corrected with a double line and entering proper characters in the space immediately above the correction (P1), putting signatures (initials) of both parties thereto (P2). Note that, in drawings, hereinafter, where the correction is made with a seal (name in a circle), this means the above correction method, that is, it corresponds to putting signatures of both parties thereto.

It is possible to guarantee/confirm the following points by conducting the above P1 and P2 in the conventional correction method for a paper document.

(1) Capable of easily confirming/identifying a corrected part, as well as capable of confirming that any other part than the corrected part includes no deliberate or negligent change.

(2) Capable of easily confirming/identifying corrected area.

(3) Capable of easily confirming a person who has made the correction.

(4) Capable of confirming whether the corrected part is a correctable part.

(5) Capable of confirming the original before correction.

(6) Capable of making a correction and verifying the correction according to a policy (control information) related to corrections.

Similarly, it is possible to guarantee/confirm the following points in the conventional correction method for a paper document with carbon-copied paper used for an insurance application form, transportation order form, or the like.

(7) Capable of partially hiding the document, as well as confirming that any other part than the hidden part includes no change.

(8) Capable of confirming the identity between a base paper and carbon-copied paper by comparing handwritings on respective papers.

(9) Capable of detecting falsification of document by separately storing the base paper and carbon-copied paper.

(10) Capable of performing a third-party certification related to the content of the document, even if being brought in court case, according to (9).

(11) The base paper and carbon-copied paper can be distributed as needed. In some cases, they can independently be distributed of each other.

As described above, a correction method and a method of certificating the validity of the correction in a paper document are excellent in various points. Meanwhile, along with recent advancement in IT technology, a technique that handles digital data (digital information) in place of the above paper document in view of convenience of data handling and data storage has been proposed (refer to, e.g., Jpn. Pat. Appln. Laid-Open Publications Nos. 2000-285024, 2001-117820, and 2003-114884, Paper of Information Processing Society of Japan/Computer Security Group (CSEC) "Digital document sanitizing problem (2003 Jul. 17) (2003-CSEC-22-009)", and Paper of SCIS2004 "A Digital Document Sanitizing Scheme with Disclosure Condition Control").

The above publications Nos. 2000-285024 and 2001-117820, which relate to a technique of storing the original of a digital document, propose techniques that give the properties that the original document (paper document) has to digital information and protect the digital document from being falsified. That is, these techniques focus that a mechanism for storing and managing a digital document of the final fixed version as an original document, that is, the storage location of the original document is made evident and focus how safely the original documents accumulated within an organization are stored.

However, in such an original document storage technique, even when only minor corrections are made for a digital document, it is regarded as "falsification". For example, in the case of the abovementioned "corrections for paper agreement document", a correction procedure of "crossing out word to be corrected with a double line, entering corrected word in the space immediately above the correction, and putting signatures of both parties". In this case, even after corrections have been made for the paper agreement document, it is regarded as an original document.

The above correction procedure in a paper society is publicly judged to be valid and therefore the corrections made can be confirmed through a third-party certification.

On the other hand, in the case, even if the conventional original document storage technique, a problem that it is impossible to determine whether corrections are "falsification" or "proper change". This can also be explained from the current feature of a digital signature which can detect every change made for a digital document.

The above publication No. 2003-114884, which relates to a digital document editing/displaying technique, proposes a technique for performing correction, addition and display control for a digital document on an element basis while guaranteeing the originality of the digital document without dividing the digital document into a plurality of parts. In this technique, original document information is constituted and managed by one file including actual data corresponding to original document information and a definition describing control for each element. When corrections or additions are made, they are described/added in/to the definition as correction information. As a result, a third-party certification related to the correction information can be achieved.

In this technique, however, it is necessary to reveal all correction information including previous versions in order to obtain a third-party certification. That is, a third-party certification cannot be achieved with a document a part of which is hidden (sanitized) or only with some versions.

The above paper "Digital document sanitizing problem" of CSEC, which relates to a digital document sanitizing technique, proposes a sanitizing technique applied to a digital document that solves a problem that a signature appended to a given document cannot be verified when a part of the document is made confidential. An application of the digital document sanitizing technique disclosed in the paper makes it possible to perform the signature verification even when sanitizing is applied to a digital document with a signature, to perform a third-party certification to certify that any other part than the sanitized part includes no change, and to perform "a third-party certification with a document a part of which is hidden (sanitized)" which has been pointed out as a problem of the publication no. 2003-114884.

In the digital document sanitizing technique of the paper, however, a creator of the original document is assured but it is impossible to identify who has performed the sanitizing. Further, the paper takes up the digital document sanitizing problem with a system of public offering of information as a usage scene of a digital document and has not mentioned about further utilization of the digital document under the condition that the document including some sanitized portions is distributed among a plurality of entities.

SUMMARY OF THE INVENTION

The present invention has been made to solve the above problems and an object thereof is to provide a digital document management system, a digital document management method, and a digital document management program capable of, in the process where a digital document is distributed among a plurality of entities: identifying a corrected part in digital document including a partial correction (including, e.g., addition, change, deletion); confirming that any other part than the corrected part includes no change; identifying/confirming who has made the partial correction for the digital document; guaranteeing that the partial correction has been made according to a proper procedure; and achieving a third-party certification of the validity of the above confirmations or identifications.

To solve the above problems, according to a first aspect of the present invention, there is provided a digital document management program that allows a computer to manage document information created and registered in a digital form, the program allowing the computer to execute: a partial identification information generation step that divides the document information into a plurality of parts and generates partial identification information that represents, in an identifiable manner, the respective parts of the document information based on information included in the respective parts; a digital signature creation step that creates a digital signature to be appended to the document information using the partial identification information; a management step that manages the document information; and a verification step that verifies the validity of the managed document information, wherein at the registration time of new document information, the management step manages a digital signature created by the digital signature creation step in association with the document information and, at the correction time of the document information, it acquires partial identification information related to a corrected part of the document information before correction, allows the digital signature creation step to create a digital signature to be appended to the corrected document information, and manages the digital signature and partial identification information related to the corrected part of the document information before correction in association with the corrected document information, and the verification step uses the partial identification information and digital signature managed in association with the corrected document information by the management step and partial identification information newly created from the corrected document information by the partial identification information generation step to perform the verification.

In the digital document management program according to the present invention, the digital signature creation step uses a set of partial identification information created by the partial identification information generation step and a private key as parameters to create a digital signature according to a signature function.

In the digital document management program according to the present invention, the digital signature creation step uses an Aggregate signature function which is a kind of a group signature scheme and which is capable of aggregating a plurality of signatures on one signature.

In the digital document management program according to the present invention, the partial identification information managed in association with the corrected document information is managed separately from the corrected document information data.

In the digital document management program according to the present invention, the partial identification information is managed by being embedded in the corrected document information.

The digital document management program according to the present invention further comprises: a policy information storage step that stores previously defined policy information; and a partial correction information generation step that generates partial correction information which is information related to a correction history of a corrected part in the case where any correction has been made for the document information, wherein in the case where any correction has been made for a part of the document information, the management step allows the partial correction information generation step to generate partial correction information and manages the generated partial correction information and policy information stored by the policy information storage step in association with the corrected document information, and the verification step uses the partial correction information and policy information in addition to the partial identification information and signature information managed in association with the corrected document information by the management step to verify the validity of the document information.

In the digital document management program according to the present invention, the partial identification information generation step divides document information into a plurality of parts and uses a hash function to generate partial identification information for respective parts of the document information.

In the digital document management program according to the present invention, the information managed by the management step is constituted by XML data having a hierarchical document structure.

In the digital document management program according to the present invention, the management step handles all digital information as original document information corresponding to version numbers, and an access to the content of the original document information managed based on its version numbers can be controlled depending on the content thereof in the respective versions in an identifiable manner.

The digital document management program according to the present invention further comprises an encryption step that encrypts a digital signature created by the digital signature creation step.

In the digital document management program according to the present invention, the encryption step encrypts a digital signature created by the digital signature creation step with a given encryption key.

In the digital document management program according to the present invention, the encryption step adds a given random number to a digital signature created by the digital signature creation step.

According to a second aspect of the present invention, there is provided a digital document management system that manages document information created and registered in a digital form, comprising: a partial identification information generation section that divides the document information into a plurality of parts and generates partial identification information that represents, in an identifiable manner, the respective parts of the document information based on information included in the respective parts; a digital signature creation section that creates a digital signature to be appended to the document information using the partial identification information; a management section that manages the document information; and a verification section that verifies the validity of the managed document information, wherein at the registration time of new document information the management section manages a digital signature created by the digital signature creation section in association with the document information and, at the correction time of the document information, it acquires partial identification information related to a corrected part of the document information before correction, allows the digital signature creation section to create a digital signature to be appended to the corrected document information, and manages the digital signature and partial identification information related to the corrected part of the document information before correction in association with the corrected document information, and the verification section uses the partial identification information and digital signature managed in association with the corrected document information by the management section and partial identification information newly created from the corrected document information by the partial identification information generation section to perform the verification.

According to a third aspect of the present invention, there is provided a digital document management method that manages document information created and registered in a digital form by a computer, comprising: a partial identification information generation step that divides the document information into a plurality of parts and generates partial identification information that represents, in an identifiable manner, the respective parts of the document information based on information included in the respective parts; a digital signature creation step that creates a digital signature to be appended to the document information using the partial identification information; a management step that manages the document information; and a verification step that verifies the validity of the managed document information, wherein at the registration time of new document information, the management step manages a digital signature created by the digital signature creation step in association with the document information and, at the correction time of the document information, it acquires partial identification information related to a corrected part of the document information before correction, allows the digital signature creation section to create a digital signature to be appended to the corrected document information, and manages the digital signature and partial identification information related to the corrected part of the document information before correction in association with the corrected document information, and the verification step uses the partial identification information and digital signature managed in association with the corrected document information by the management step and partial identification information newly created from the corrected document information by the partial identification information generation step to perform the verification.

According to the present invention, it is possible to satisfy the following requirements which cannot be met by conventional techniques and a plain combination thereof by managing vary small amount of meta data.

(1) Capable of identifying a corrected part in the digital document as well as confirming that any other part than the corrected part includes no change.

(2) Capable of assuring (independently certificating) the integrity and authenticity of the digital document at each time point in the case where a corrected digital document is distributed between a plurality of entities and a correction/addition is made for the digital document at the respective entities.

(3) Capable of performing a third-party certification and distribution using a digital document that has been subjected to sanitizing or using only some versions even though all the versions of the digital document stored/managed in the present system are not taken out.

BRIEF DESCRIPTION OF THE DRAWINGS

FIG. 3 is a view showing an example of policy information;

FIG. 4 is a view showing an example of partial identification information;

FIG. 8 is a view showing an example of partial correction information;

FIG. 11 is a view showing the correction policy information and partial correction information to be compared;

FIG. 25 is a view showing an example in which the main body of an insurance application form (first version) is represented using XML data;

FIG. 27 is a view showing an example in which partial identification information generated at the creation time of the insurance application form (first version) is represented using XML data;

FIG. 30 is a view showing an example in which an updated insurance application form—main body (second version) is represented using XML data;

FIG. 34 is a view showing an example in which an insurance application form—main body (third version) is represented using XML data;

FIG. 37 is a view showing coupling-management of all the partial identification information required for verifying the second version;

FIG. 38 a view showing coupling-management of all the partial identification information required for verifying the third version;

FIG. 40 is a view showing an original document storage state at the creation time of the insurance application form (third version) in the method 2;

FIG. 41 is a view showing an example of XML data for evaluation/analysis;

FIG. 42 is a view showing the update of XML data for evaluation/analysis;

FIG. 62 is a view showing the overview of the operation performed in the second embodiment;

FIG. 63 is a view showing operation performed at the signature time in a third embodiment;

FIG. 64 is a view showing operation performed at the first sanitizing time in the third embodiment;

FIG. 65 is a view showing operation performed at the second and subsequent sanitizing time in the third embodiment;

FIG. 68 is a view schematically showing effects of the third embodiment in comparison with the underlying technique;

FIG. 70 is a view showing an example of a conventional paper agreement document that has been corrected.

DETAILED DESCRIPTION OF THE PREFERRED EMBODIMENTS

Hereinafter, an underlying technique of the present invention will be described with reference to the drawings before description of the embodiment is given.

(Underlying Technique)

A digital document management system, which is an underlying technique of the present invention, retains, independently of document information serving as a digital document composed of digital information, policy information (policy information for registration and policy information for correction) and partial integrity information (partial identification information and partial correction information) and provides a mechanism that verifies and distributes the digital document as a digital document partial integrity assurance system.

Figure 1:
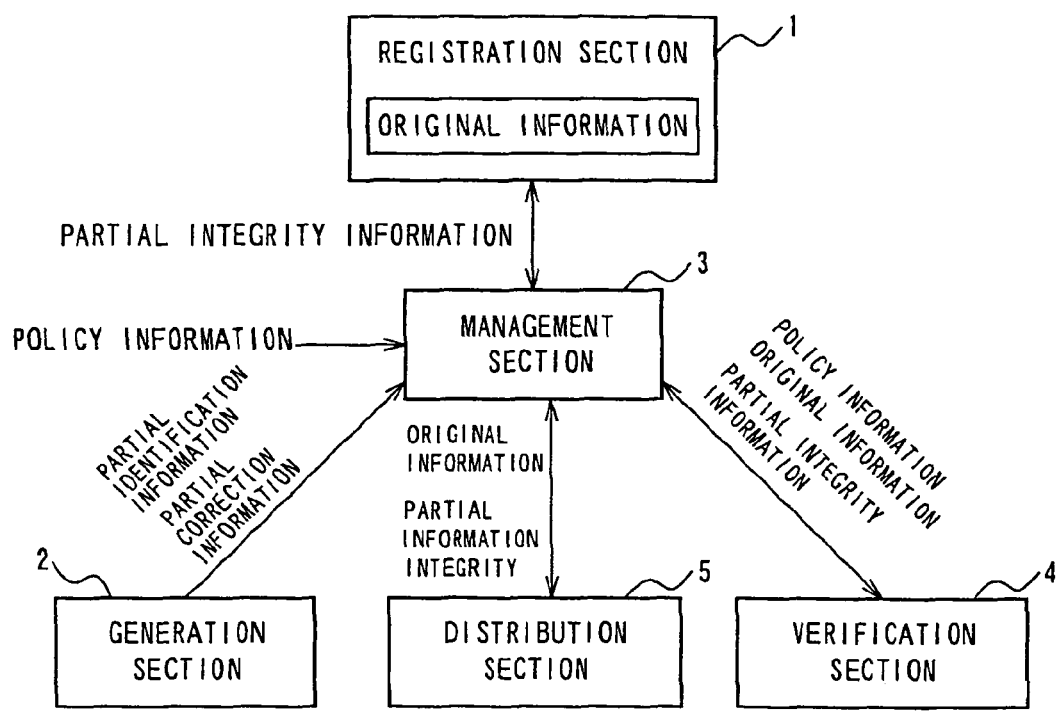
FIG. 1 is a view showing an underlying technique of the present invention.

FIG. 1 is a view of the principle of a digital document management system according to the present invention. Firstly, the basic configuration of the digital document management system will be described with reference to FIG. 1. Note that, in the present specification, "document information" and "original document information", "document" and "original document", are synonymous terms respectively.

The digital document management system shown in FIG. 1 includes a registration section 1, a generation section 2, a management section 3, a verification section 4, and a distribution section 5.

The registration section 1 registers document information composed of digital information as original document information. The generation section 2 generates partial identification information for identifying a partial correction, change, addition, deletion, and the like (hereinafter, referred collectively to as "correction") and partial correction information representing partial correction history of the original document information.

The management section 3 manages the partial identification information and partial correction information as partial integrity information together with the original document information. Further, the management section 3 associates the two information with the policy information.

At the registration time of the original document information, the policy information is used as registration policy information, i.e., information describing conditions including required entries (required document information) in the original document information, creator's authority, and the like. At the time of correction of the original document information after registration, the policy information is used as correction policy information, i.e., information describing partial correction management control information (corrector, correctable area, non-correctable area, and the like), procedure, constraint, condition, and the like which are previously set for the original document information. Note that, in the present underlying technique, identical correction policy information and identical registration information are used.

In the case of a paper agreement document, sections to be filled with, corrector, correction operation, correction procedure are regulated by a code or the like. Similarly, in the case of the document information composed of digital information, a section that performs operation control and validates the operation control is provided.

The verification section 4 uses the correction policy information and partial integrity information to verify that a partial correction has properly been made for the original document information.

The distribution section 5 constitutes a transmitting/receiving section that transmits and receives the original document information to distribute the original document information among a plurality of entities.

The original document information that the registration section 1 registers corresponds to a document (e.g., critical document such as articles of agreement) requiring a third-party certification for use as evidence if end up in court afterward. The registered original document information is stored in the registration section 1. The partial identification information and partial correction information that the generation section 2 generates are for post-confirmation of a correction made for the original document information that has been registered in the registration section 1 and associated with the original document information. When a correction is made for the original document information stored in the registration section 1, a new version is created and stored with a previous version left without change, and partial integrity information corresponding to the new version number is generated and associated with other information.

According to the above digital document management system, it is possible to: clearly identify a correction made for a digital document such as the abovementioned original document information; guarantee that the partial correction has properly been made; distribute the corrected digital document (document information) among a plurality of entities; and assure the integrity of the corrected digital document at each entity.

(Underlying Technique 1)

Figure 2:
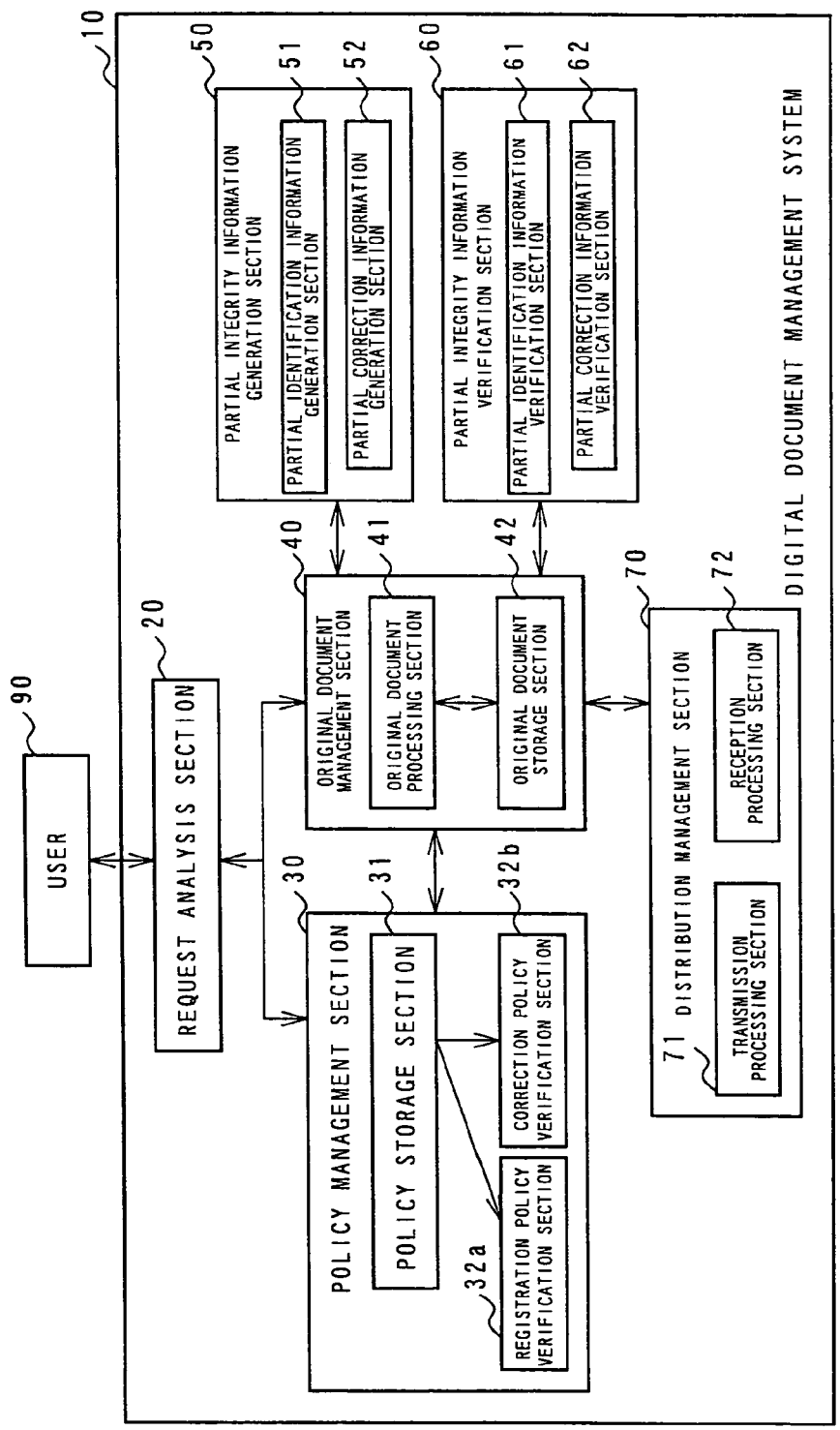
FIG. 2 is a block diagram functionally showing a configuration of a digital document management system as the underlying technique of the present invention.

Hereinafter, as an underlying technique 1 of the present invention, a case where the underlying technique of the present invention is applied to a first application field will be described. FIG. 2 is a block diagram functionally showing a configuration of the digital document management system as the underlying technique of the present invention.

A digital document management system 10 shown in FIG. 2 includes a request analysis section 20, a policy management section 30, an original document information management section 40, a partial integrity information generation section 50, a partial integrity information verification section 60, and a distribution management section 70.

Configurations and rolls of the above sections will be described below.

The request analysis section 20 receives a processing request from a user 90 and assigns the processing to the policy management section 30 or original document management section 40 according to the content of the request. The policy management section 30 stores and verifies policy information corresponding to original document information.

The policy information describes, with respect to the corresponding original document information, required entries and creator's authority at the registration (creation) time of the original document information, or predetermined partial correction management control information (corrector, correctable area, non-correctable area, and the like), procedure, constraint, condition, and the like.

In the case of a paper agreement document, sections to be filled with, corrector, correction operation, correction procedure are regulated by a code or the like. Similarly, in the case of digital information, a section that performs operation control and validates the operation control is provided. The policy management section 30 includes two sub-elements: a policy storage section 31 and a set of registration policy verification section 32*a* and correction policy verification section 32*b*.

The policy storage section 31 receives a policy storage request from the request analysis section 20 and, according to the request, registers/stores the policy information. The registration policy verification section 32*a* verifies, according to the registration policy information that has already been stored in the policy storage section 31, whether the creator corresponds to one who has been previously registered at the registration time of the original document information, or whether all required entries are made. The correction policy verification section 32*b* verifies, according to the correction policy information that has already been registered in the policy storage section 31, whether the original document information is created and corrected properly.

The original document management section 40 associates, together with partial integrity information, the policy information registered in the policy management section 30 with digital information and registers/manages/stores the associated information as original document information. The original document management section 40 includes two sub-elements: an original document processing section 41 and an original document storage section 42.

The original document processing section 41 receives a processing request from the request analysis section 20 and, according to the request, performs various processing for the original document information. The original document processing section 41 can execute new data registration processing (original document registration processing), registration data correction processing (registration original document correction processing), registration data acquisition processing (registration original document acquisition processing), and registration data verification processing (registration original document verification processing).

The original document storage section 42 receives an original document registration/storage request from the original document processing section 41 and, according to the request, registers/storages the original document information together with the partial integrity information. Further, the original document storage section 42 receives an original document information acquisition request from the original document processing section 41 and, according to the request, takes out the original document information and partial integrity information.

The partial integrity information generation section 50 receives a partial integrity information generation request from the original document management section 40 and, according to the request, generates partial identification information and partial correction information corresponding to the original document information. The partial integrity information generation section 50 includes two sub-elements: a partial identification information generation section 51 and a partial correction information generation section 52.

The partial identification information generation section 51 receives a partial identification information generation request from the original document management section 40 and, according to the request, generates partial identification information (information representing respective parts of the original document information and entries thereof in an identifiable manner) corresponding to the original document information. The partial identification information describes, e.g., hash information that includes random numbers for respective parts so as to check presence/absence of a change in the respective (e.g., in units of one character or in units of one element in the case of XML data) parts of the original document information and position information indicating correspondence between the section and hash information.

The partial correction information generation section 52 receives a partial correction information generation request from the original document management section 40 and, according to the request, generates partial correction information corresponding to the original document information. The partial correction information describes, e.g., information (correction history in respective parts of the original document information) like "When a correction has been made", "Who has made a correction", "For which part a correction has been made", "How a document has been changed", "Information before correction", "Reason for correction".

The partial integrity information verification section 60 receives a partial integrity information verification request from the original document management section 40 and, according to the request, verifies partial identification information and partial correction information against corresponding original document information. The partial integrity information verification section 60 includes two sub-elements: a partial identification information verification section 61 and a partial correction information verification section 62.

The partial identification information verification section 61 receives a partial identification information verification request from the original document management section 40 and, according to the request, verifies partial identification information against corresponding original document information.

The partial correction information verification section 62 receives a partial correction information verification request from the original document management section 40 and, according to the request, verifies partial correction information against corresponding original document information.

The distribution management section 70 receives a transmission/reception request of original document information from the original document management section 40 and, according to the request, transmits and receives the original document information together with partial integrity information. The distribution management section 70 includes two sub-elements: a transmission processing section 71 and a reception processing section 72.

The transmission processing section 71 receives a transmission request of original document information from the original document management section 40 and, according to the request, transmits the original document information together with partial integrity information to a target entity. The reception processing section 72 receives a reception request of original document information from the original document management section 40 and, according to the request, receives the original document information together with partial integrity information from a target entity.

Here, the underlying technique of the present invention is divided into first and second application fields, and deception will be given for each sector. Firstly, in the first sector, operations related to the basic concept (individual basic functions) of the present invention including "document creation function", "correction (partial sanitizing) function", "verification function", "distribution function", and "acquisition function" will be described. In the second application field, description will be concentrated on XML (extensible Markup Language) document for the purpose of further modifying and improving the original document management method and verification method to be realized in the first application field. In the second field, an original document management method and verification method realizing more effective partial falsification detection with attention being focused on "structuring" which is one of the features of XML document format.

Firstly, the basic concept (individual basic functions) which is the first application field will be described in line with usage scene. As an example of operation of the present underlying technique 1, first and second phases will be described.

<First Phase>

As the first phase, the following usage scene is assumed.

It is assumed that a user utilizes the present system to record/store an agreement document. In the agreement document, a correction may be made after the creation thereof in some cases. In this case, validity such as identification of corrector, identification of corrected part, or corrected content is required. The user uses the present system to preserve the records so that he or she can exhibit the records as evidence if embroiled in court case afterward. "Hanako Suzuki" and "Administrator" appear on this scene. Hanako Suzuki newly creates the agreement document and makes a correction for the document. Administrator uses the present system to perform verification. The above two characters are assumed to perform the following processes.

(Creation of New Document)

Hanako Suzuki newly creates a new agreement document and registers it in the system.

(Correction)

A correction event occurs in the address of Hanako Suzuki due to relocation.

Hanako Suzuki herself changes "Kawasaki-shi Nakahara-ku" listed in address field in the agreement document to "Yokohama-shi Kohoku-ku" and registers the new address in the system.

(Verification)

Immediately after completion of the correction and registration, administrator performs verification (identification of corrected part, confirmation of corrected content, and confirmation of absence of correction in any other part than the corrected part) involved in the address change.

In the above usage scene, the system provides the following three functions to Hanako Suzuki and administrator.

(A) New data registration function (this function is used when a new agreement document is created).

(B) Registration data correction function (this function is used when a correction is made for the agreement document).

(C) Registration data verification function (this function is used when the agreement document is verified).

Hereinafter, operations in the above respective events (A) to (C) will be described.

As a precondition in this usage scene, a user 90 (Hanako Suzuki or administrator) has previously been registered in this digital document management system so as to be able to access the system. The usage scene is started when Hanako Suzuki and administrator access/login the system. Further, it is assumed that policy information corresponding to the agreement document has already been registered and stored in the policy storage section 31. FIG. 3 shows an example of the policy information.

As shown in FIG. 3, the control information written in the policy information defines as follows: to input "Name", "Address", and "Birth date" as essential information for the agreement document; "Name" and "Address" can be corrected as needed; "Birth date" is not correctable by its nature; and sanitizing can be applied to "Birth date". The policy information is distributed among a plurality of entities in the system. In view of this, a signature of administrator may be appended to the policy information for improvement of its safety.

(A) Creation Time of New Agreement Document

Figure 6:
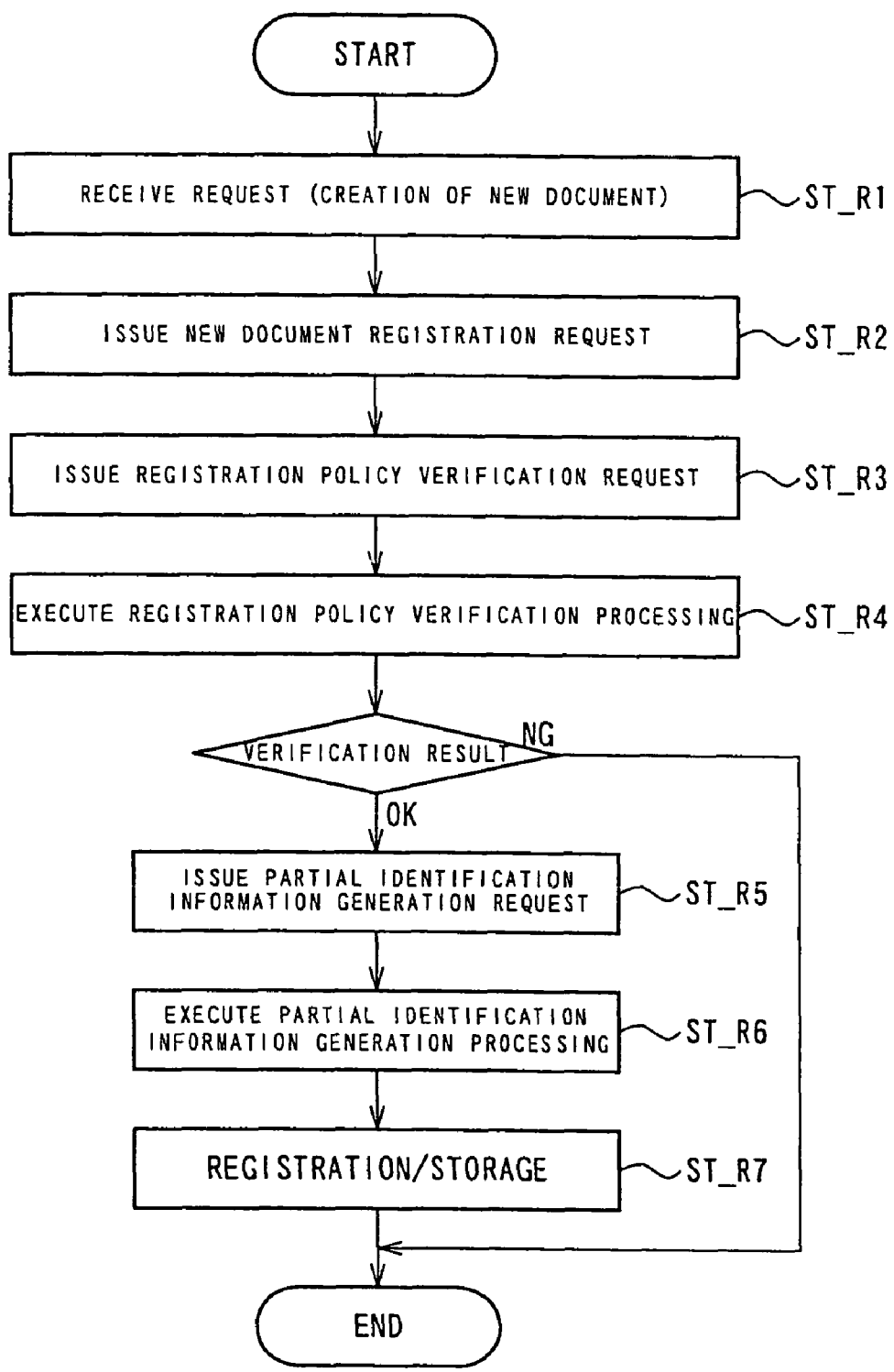
FIG. 6 is a flowchart showing operation of new document registration processing.

FIG. 6 is a flowchart showing operation of new document registration processing. In this new document registration processing, the user 90 (Hanako Suzuki) selects "agreement document" from "creation of new document" menu on a not shown window and performs input operation to an agreement document formatted based on the policy information. After completion of the input operation, a new document registration request is issued to the request analysis section 20 in the digital document management system 10. Then, the following steps are performed.

(1) The request analysis section 20 of the digital document management system 10 receives the new document registration request (step ST-R1) and issues the same to the original document processing section 41 (step ST-R2).

(2) The original document processing section 41 issues a registration policy verification request to the registration policy verification section 32*a* (step ST-R3).

(3) The registration policy verification section 32*a* refers to the policy information that has already been registered/stored in the policy storage section 31 to verify whether the document has been created properly according to the policy information and returns a result of the verification to the original document processing section 41 (step ST-R4).

(4) The original document processing section 41 acquires the verification result from the registration policy verification section 32*a*. When the verification result is affirmative (OK), the original document processing section 41 issues a partial identification information generation request to the partial identification information generation section 51 (step ST-R5). On the other hand, when the verification result is negative (NG), the user 90 logs out of the system to abort this new document registration processing.

(5) The partial identification information generation section 51 generates partial identification information corresponding to the document and returns the generated result to the original document processing section 41 (step ST-R6).

FIG. 4 is a view showing an example of partial identification information generated by the partial identification information generation section 51. In FIG. 4, random number "123" is assigned to a character string "Hanako Suzuki", hash information corresponding to the character string "Hanako Suzuki 123" is calculated, and hash information "abcdefgh" is output as a result of the calculation. The same hash information generation processing is applied to other elements.

The reason for using the random number in FIG. 4 is to make it difficult to guess sanitized original information in the case where partial sanitizing is applied in the second phase to be described later. Although the random number is used in the example of FIG. 4, it is possible to use other techniques for achieving this object.

For example, time stamp F(time-stamp) representing date and time can be used in place of the random number. In this case, F is an arbitrary function and time stamp (time-stamp) is not directly applied. This is because it is likely that the time stamp may be constituted by a fixed format such as "year-month-day-time-minute-second" and, therefore, may easily be guessed. A use of the time stamp here can also assure creation data and time.

(6) The original document processing section 41 acquires the partial identification information from the partial identification information generation section 51 and registers/stores the agreement document and partial identification information in the original document storage section 42 (step ST-R7).

At this time, a signature of Hanako Suzuki is appended to the agreement document and partial identification information respectively.

Figure 5:
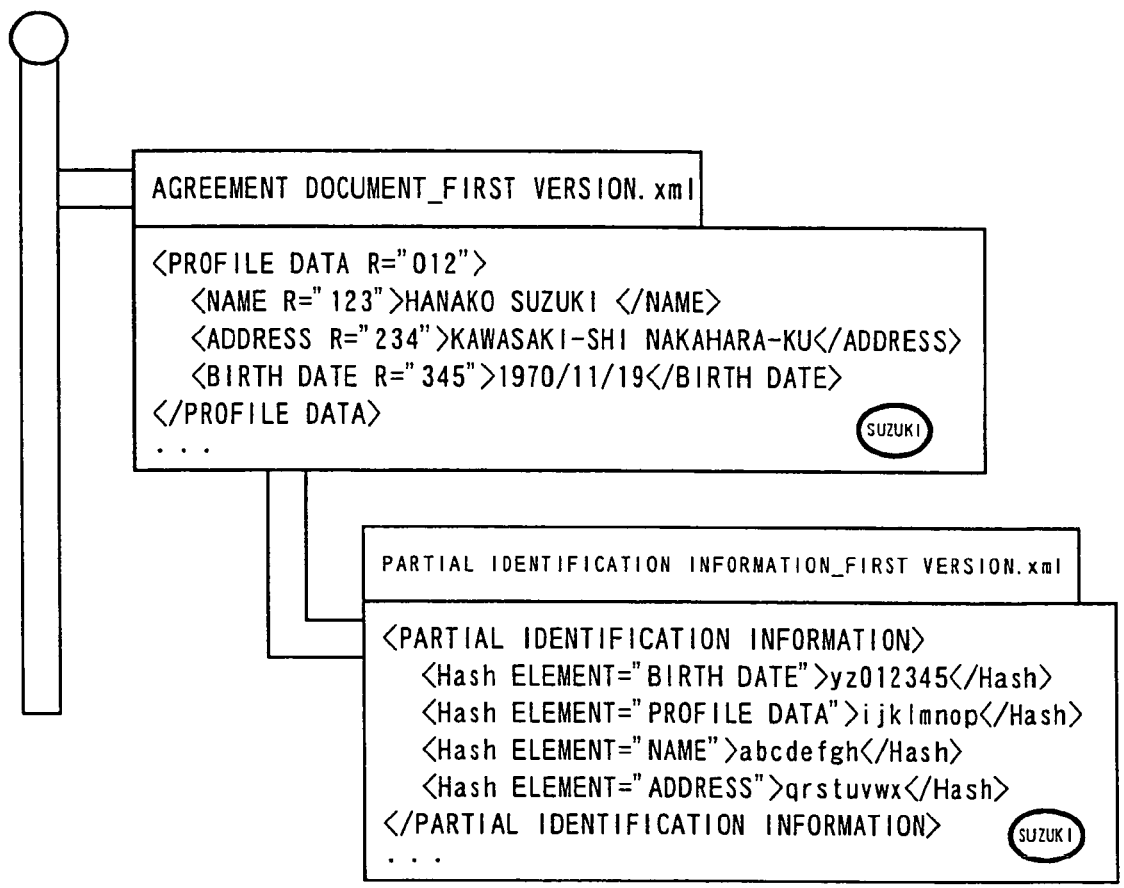
FIG. 5 shows a storage state at the new document registration time.

FIG. 5 shows a state of the original document storage section 42 at the new document registration time. As shown in FIG. 5, the generated partial identification information is combined with the agreement document which is a main body as management information thereof. After completion of the steps described above, the user 90 logs out of the system to normally end the new document registration processing.

(B) Correction Time of Agreement Document

Figure 10:
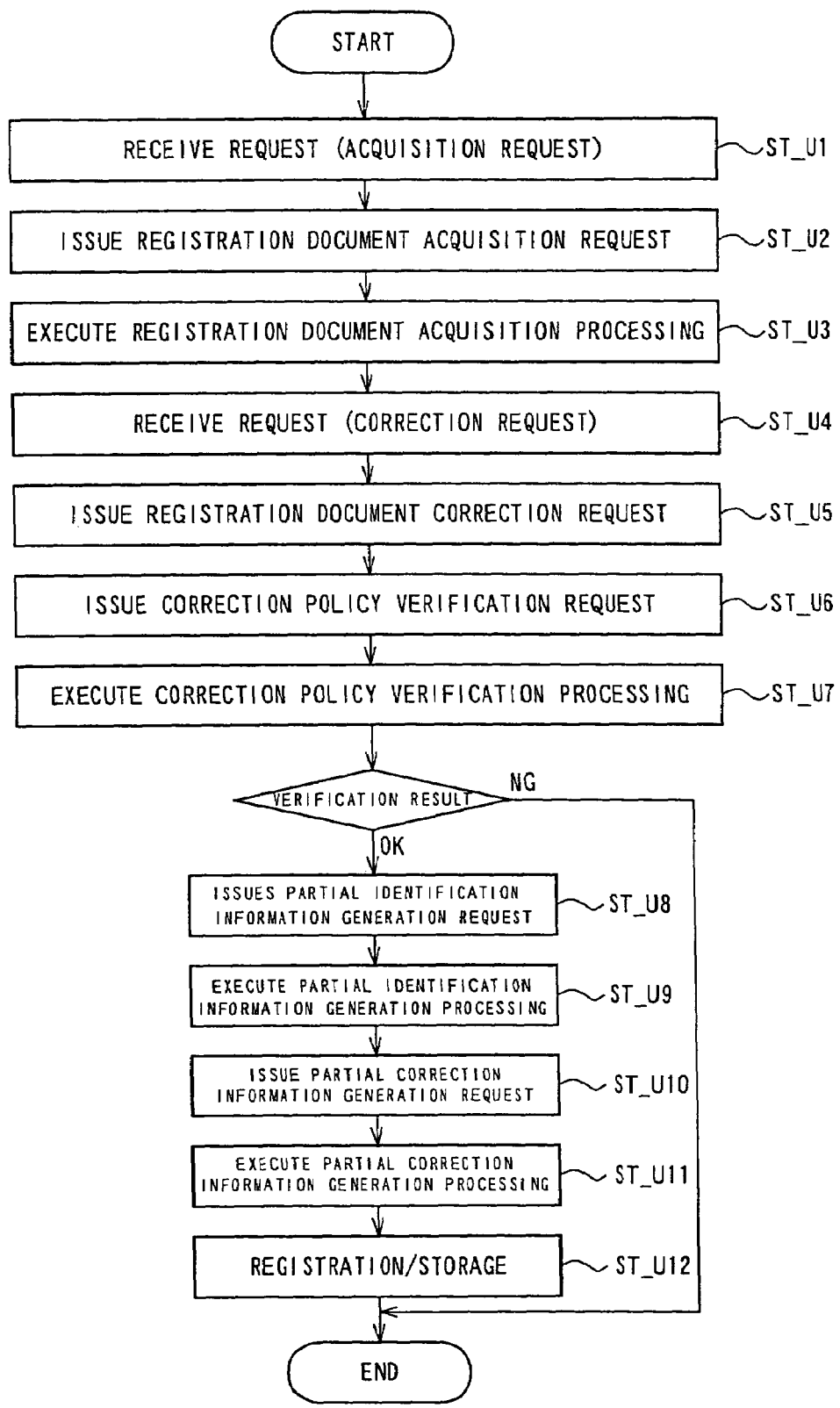
FIG. 10 is a flowchart showing operation of registration document correction processing.

FIG. 10 is a flowchart showing operation of registration document correction processing. When the user 90 (Hanako Suzuki) selects "registration document correction" menu on a not-shown window, "target registration document list" representing documents for which Hanako Suzuki can perform processing (i.e., make a correction) is displayed. When Hanako Suzuki selects an agreement document to be corrected from the "target registration document list" on the window, a registration document acquisition request is issued to the request analysis section 20 of the digital document management system 10. Then, the following steps are performed.

(1) When the registration document acquisition request is issued, the request analysis section 20 of the digital document management system 10 receives the registration document acquisition request (step ST-U1) and issues the same to the original document processing section 41 (step ST-U2).

(2) The original document processing section 41 takes out the agreement document registered/stored in the original document storage section 42 and displays the document on the window so that Hanako Suzuki can refer to it (step ST-U3).

When Hanako Suzuki changes "Kawasaki-shi Nakahara-ku" listed in address field in the agreement document to "Yokohama-shi Kohoku-ku", a registration document correction request is issued to the request analysis section 20 of the digital document management system 10.

(3) The request analysis section 20 of the digital document management system 10 receives the registration document correction request (step ST-U4) and issues the same to the original document processing section 41 (step ST-U5).

(4) The original document processing section 41 issues a correction policy verification request to the correction policy verification section 32b (step ST-U6).

(5) The correction policy verification section 32b refers to the policy information registered/stored in the policy storage section 31 to verify whether the document has been corrected properly according to the policy information and returns a result of the verification to the original document processing section 41 (step ST-U7). Note that, the above correction policy verification is performed only for a correctable area (without departing from the correctable area) defined in the original document information.

Figure 7:
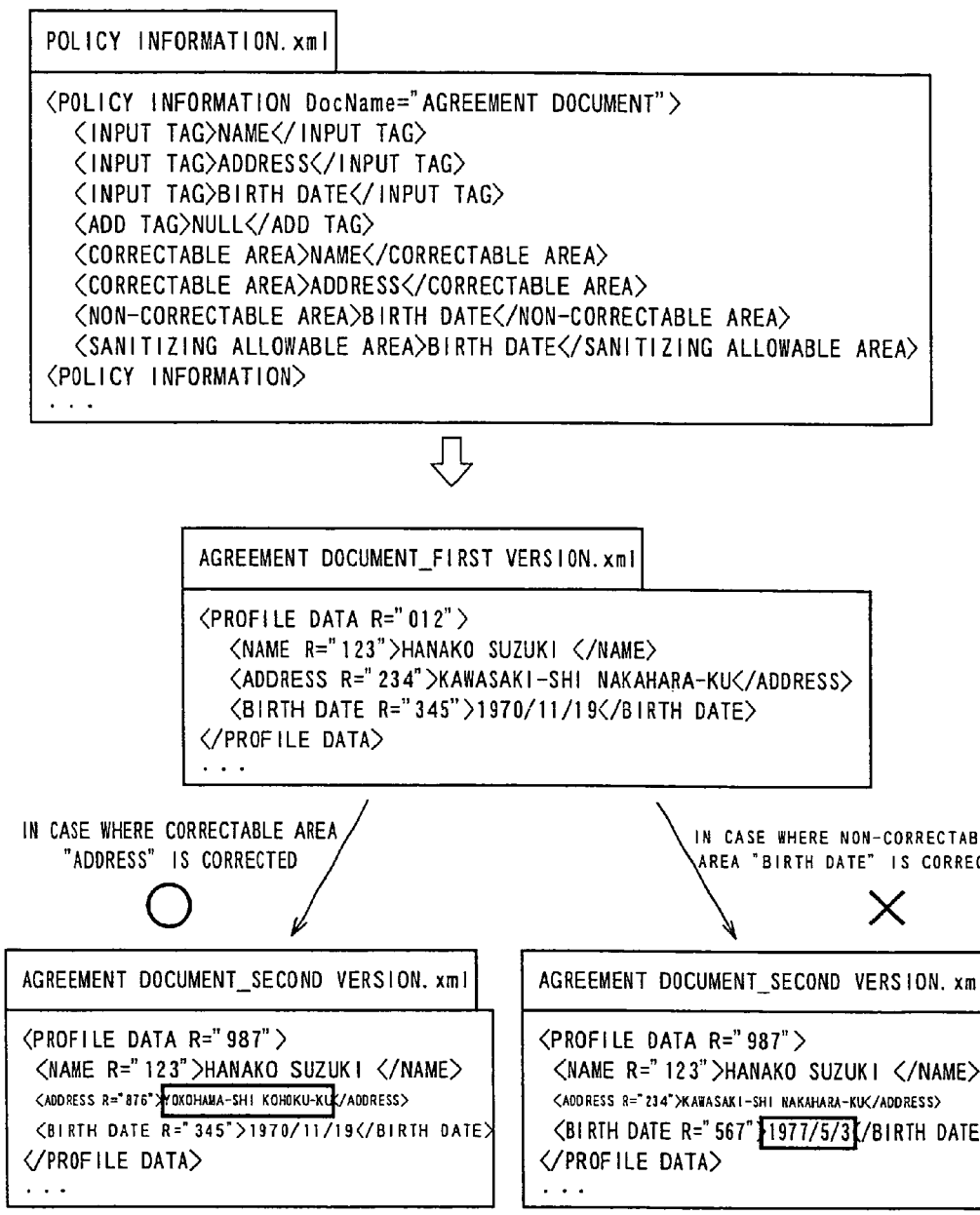
FIG. 7 is a view showing an example in which a correctable area and non-correctable area are identified.

FIG. 7 is a view showing an example in which a correctable area and non-correctable area are identified. When a correctable area "address" is corrected, the verification result becomes affirmative (OK). On the other hand, when a non-correctable area "birth date" is corrected, the verification result becomes negative (NG).

(6) The original document processing section 41 acquires a result of the verification from the correction policy verification section 32b. When the verification result is affirmative, the original document processing section 41 issues a partial identification information generation request to the partial identification information generation section 51 (step ST-U8). When the verification result is negative, the user 90 logs out of the system to abort this registration document correction processing.

(7) The partial identification information generation section 51 generates partial identification information corresponding to the agreement document and returns the generation result to the original document processing section 41 (step ST-U9). In this partial identification information generation processing, a new random number or a time stamp indicating the correction processing time is used to newly generate partial identification information corresponding to "address" which has been corrected from the previous version. The partial identification information corresponding to entries other than "address" (corrected part) are generated using the same random number as that used in the previous version or a time stamp indicating the document creation time. Thus, it is possible to certify that the corrected document (second version) is derivative of the original document (first version). Further, different partial identification information is generated each time even when the same person inputs the same content, so that it is possible to certify "same handwriting", in terms of a paper document.

(8) Subsequently, the original document processing section 41 issues a partial correction information generation request to the partial correction information generation section 52 (step ST-U10).

(9) The partial correction information generation section 52 generates partial correction information corresponding to the agreement document and returns to the generation result to the original document processing section 41 (step ST-U11). FIG. 8 shows an example of the partial correction information.

(10) The original document processing section 41 acquires the partial identification information and partial correction information respectively from the partial identification information generation section 51 and partial correction information generation section 52 and registers/stores the corrected agreement document together with the partial identification information and partial correction information in the original document storage section 42. At this time, a signature of Hanako Suzuki is appended to the agreement document, the partial identification information and partial correction information respectively (step ST-U12).

Figure 9:
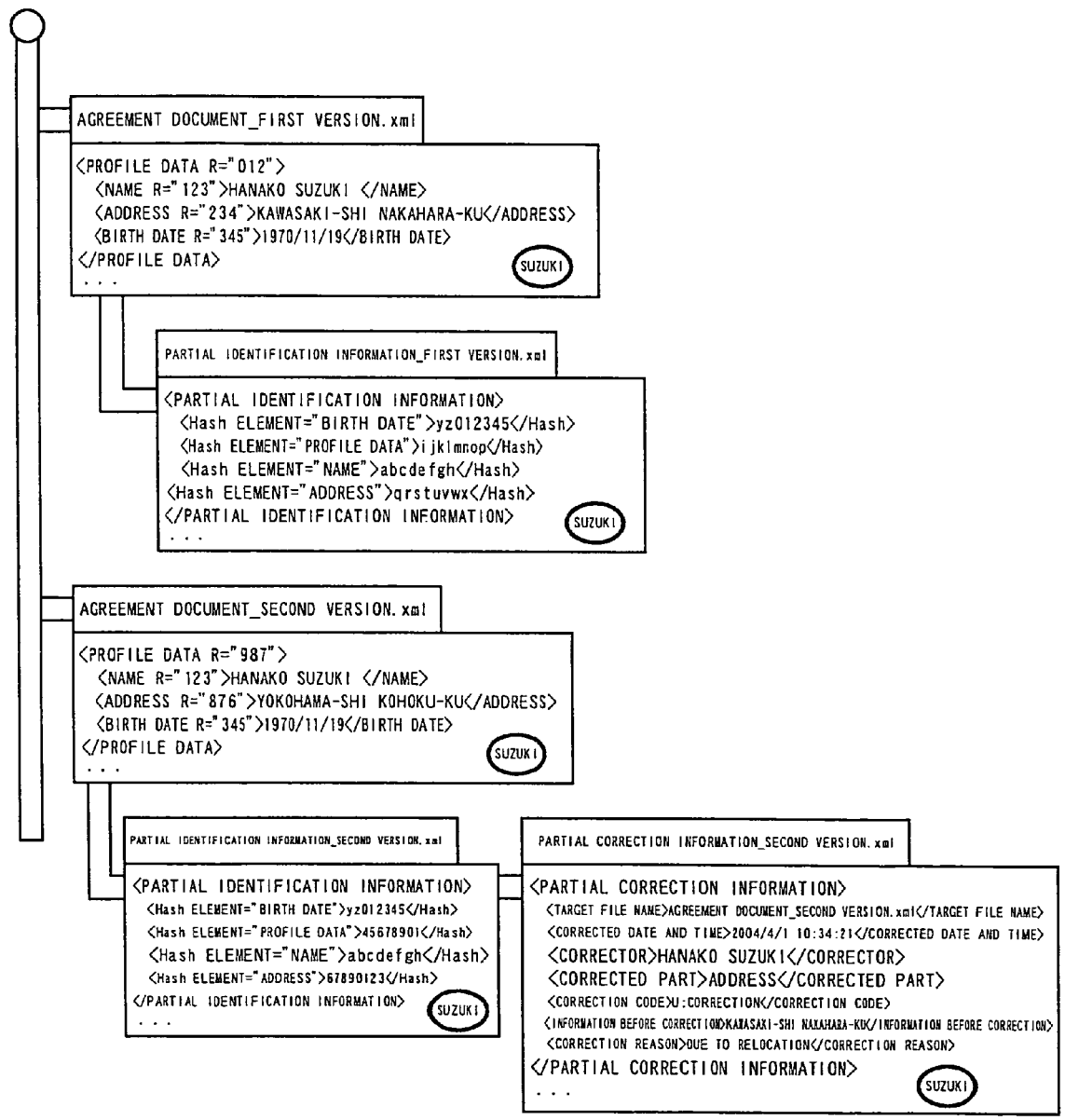
FIG. 9 is a view showing a storage state at the registration document correction time.

FIG. 9 is a view showing a state of the original document storage section 42 at the registration document correction time. Referring to the attribute (=R portion) (in this example, random number is used) of address element, it can be seen that different random numbers are used between the first version (R="234") and second version (R="876"). On the other hand, the same random number is used in the fields other than the address field between the first and second versions. The same is apparently true in the case of the partial identification information.

After completion of the above steps, the user 90 logs out of the system to normally end the new document correction processing. At any one of the above steps ST-U8 to ST-U11, the digital document management system 10 may display a message including "corrected part" and "corrected content" to seek consensus on the correction from the user 90 (Hanako Suzuki). For example, a message says "Are you certain that address has been changed from "Kawasaki-shi Nakahara-ku" to "Yokohama-shi Kohoku-ku?".

(C) Integrity/Validity Verification Time of Corrected Agreement Document

Figure 14:
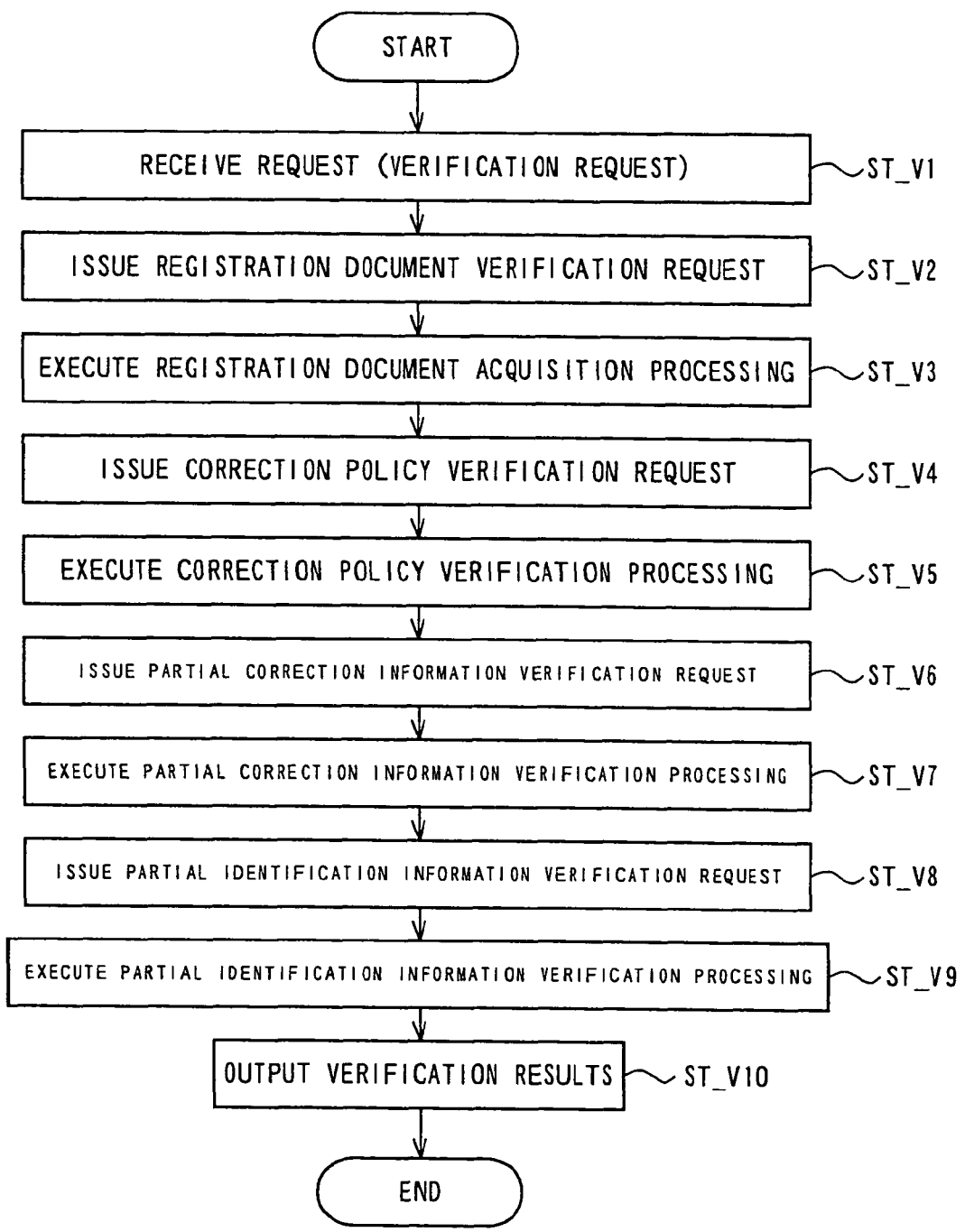
FIG. 14 is a flowchart showing operation of registration document verification processing.

FIG. 14 is a flowchart showing operation of registration document verification processing.

When the user 90 (administrator) selects "registration document verification" menu on a not-shown window, "target registration document list" representing documents for which the administrator can perform processing (i.e., verification) is displayed. When the administrator selects an agreement document to be verified from the "target registration document list" on the window, a registration document verification request is issued to the request analysis section 20 of the digital document management system 10. Then, the following steps are performed.

(1) The request analysis section 20 of the digital document management system 10 receives the registration document verification request (step ST-V1) and issues the same to the original document processing section 41 (step ST-V2).

(2) The original document processing section 41 takes out the relevant verification data group registered/stored in the original document storage section 42 (step ST-V3). The verification data group to be taken at this time is as follows. The number in the brackets indicates the version number, where the latest version is set to N-th version.

(a): Agreement Document (latest version: second version [N-th version])

(b): Partial identification information (latest version; second version [N-th version])

(c): Partial identification information (first version [N−1th version])

(d): Partial correction information (latest version: second version [N-th version])

(3) The original document processing section 41 issues a correction policy verification request to the correction policy verification section 32b (step ST-V4).

(4) The correction policy verification section 32b refers to the policy information registered/stored in the policy storage section 31 to compare the policy information and partial correction information (d) acquired in step ST-V3 to thereby verify whether the document has been corrected properly according to the policy information and returns a result of the verification to the original document processing section 41 (step ST-V5).

FIG. 11 is a view showing the policy information and partial correction information to be compared at this time. The partial correction information indicates that corrected part is "address", and the policy information indicates that "address" is defined as a correctable area. Therefore, the verification results in affirmation (OK).

(5) The original document processing section 41 acquires the verification result from the correction policy verification section 32b. Subsequently, the original document processing section 41 issues a partial correction information verification request to the partial correction information verification section 62 (step ST-V6).

(6) The partial correction information verification section 62 executes the following verification processing and returns a verification result to the original document processing section 41 (step ST-V7).

(6-1) Refers to the partial correction information (d) acquired in step ST-V3 to identify a corrected part and confirm partial correction content.

(7) Subsequently, the original document processing section 41 issues a partial identification information verification request to the partial identification information verification section 61 (step ST-V8).

(8) The partial identification information verification section 61 executes the following verification processing and returns a verification result to the original document processing section 41 (step ST-V9).

Figure 12:
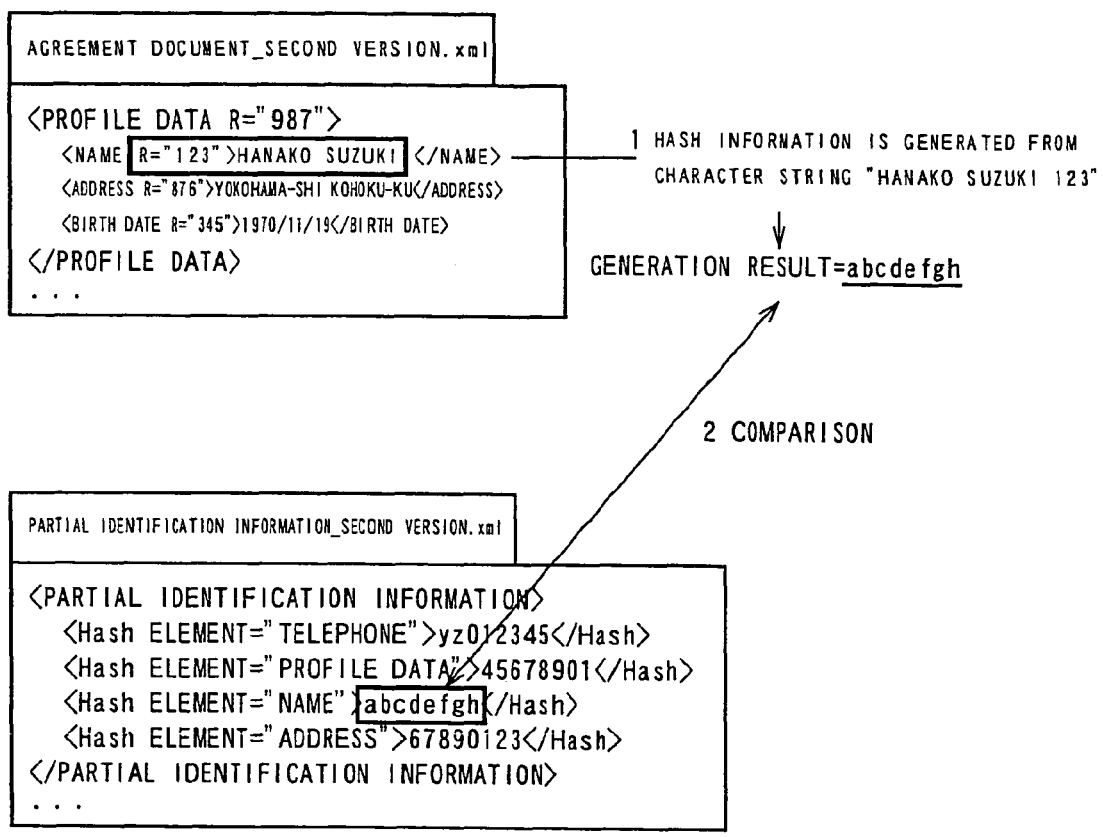
FIG. 12 is a view showing the agreement document and partial identification information to be compared.

(8-1) Compares the agreement document (a) and partial identification information (b) acquired in step ST-V3 and confirm whether there is no falsification in them after registering the relevant version of agreement document in the system. FIG. 12 is a view showing the agreement document and partial identification information to be compared at this time.

Figure 13:
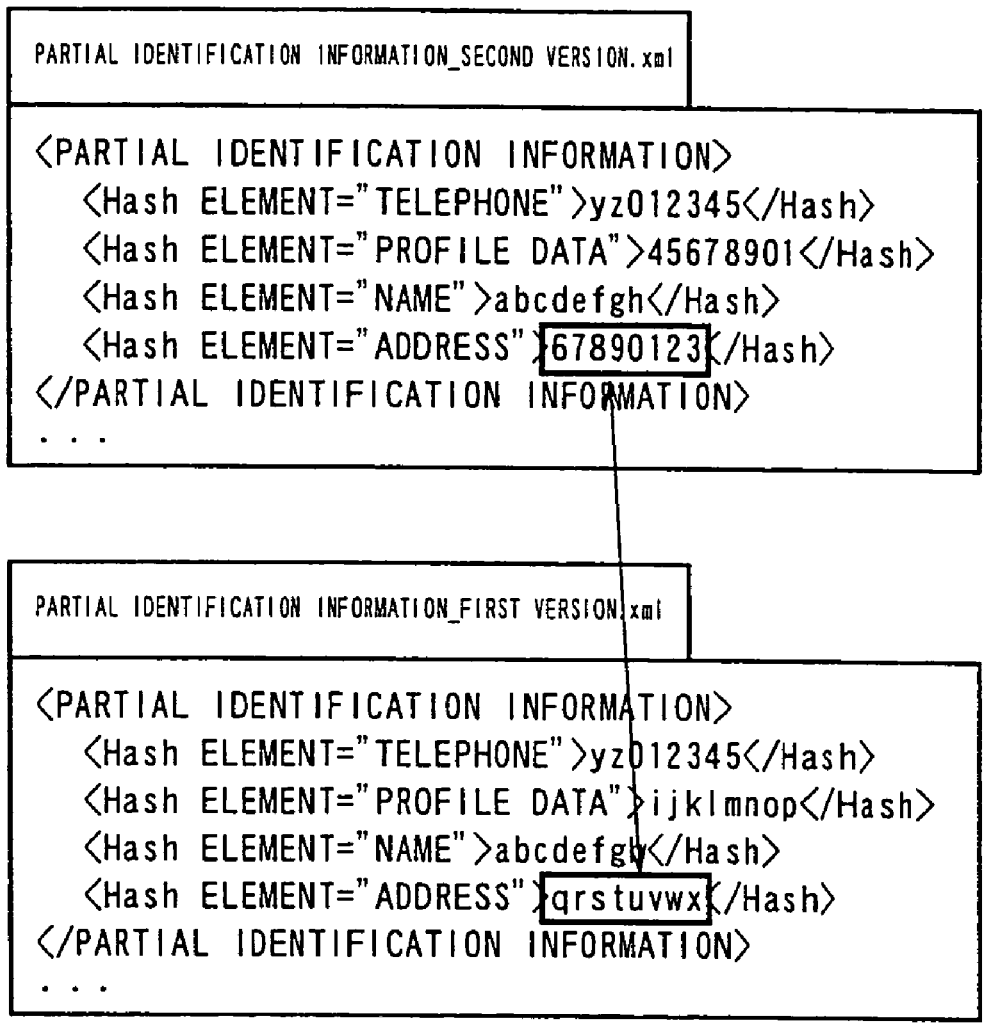
FIG. 13 is a view showing a new version of partial identification information and a previous version of partial identification information to be compared.

(8-2) Identifies a corrected part ("address") based on the verification result (6-1) of the partial correction information which has been acquired in step ST-V7; Compares the content of "address" between the partial identification information (b) and (c) to confirm that a correction has been made for "address"; Confirms that any other part than the corrected part has not been corrected from the previous version. FIG. 13 is a view showing the partial identification information (b) and (c) to be compared. In this example, the partial identification information verification section 61 confirms that only random numbers ("67890123" and "qrstuvwx") assigned to address part differ from each other between the first and second versions of partial identification information. Accordingly, the partial identification information verification section 61 can confirm that any other part than the address part has not been corrected from the previous version (first version).

(9) The original document processing section 41 collectively outputs the verification results acquired in steps ST-V5, ST-V7, and ST-V9 (step ST-V10).

After completion of the steps described above, the user 90 logs out of the system to normally end the registration document verification processing. Note that, in the above configuration, the correction policy verification section 32b and partial integrity information verification section 60 (partial identification information verification section 61 and partial correction information verification section 62) constitute a registration document verification section of the present invention.

<Second Phase>

As the second phase in this underlying technique, the following usage scene is assumed.

In the second phase, a user utilizes the present system to distribute an agreement document that has been corrected and registered in site A to site B. It is assumed that, during the course of distribution, information of "birth date" is subjected to sanitizing while information other than "birth date" is disclosed. "Hanako Suzuki" and "Taro sato" and "Minoru Yamada" appear on this scene. Hanako Suzuki newly created the agreement document and registered it after making a correction for the document in the first phase. Taro Sato, who is a transmitter, applies sanitizing to "birth date" field in the agreement document and distributes the document toward a receiver at site B. Minoru Yamada, who is a receiver, receives a complete set of the agreement document transmitted from Taro Sato at site A and registers the document in the system at site B. Further, Minoru Yamada acquires verification data including the agreement document distributed from site A for a public a third-party certification (e.g., for exhibiting the data as evidence in a court case). The above three characters are assumed to perform the following four processes.

(Correction (Partial Sanitizing))

Hanako Suzuki, a user located in site A, creates an agreement document and registered it in the system. After a correction has been made for the agreement document by Hanako Suzuki, Taro Sato, who is a transmitter, performs correction processing to the document and registers it in the system existing at site A as preparation for distribution to site B. In this correction processing, information of "birth date" is subjected to sanitizing while information other than "birth date" is disclosed.

(Distribution (Transmission))

Taro Sato, who is a transmitter located at site A, transmits a complete set of the agreement document to Minoru Yamada who is a receiver located at site B.

(Distribution (Reception))

Minoru Yamada, who is a receiver located at site B, receives a complete set of the agreement document transmitted from Taro Sato who is a transmitter located at site A and registers the document in the system existing at site B.

(Taking out for a Third-Party Certification)

Minoru Yamada located at site B takes out a complete set of the agreement document (verification data) transmitted from the site A for a public third-party certification (e.g., for providing the data as evidence in a court case).

Figure 15:
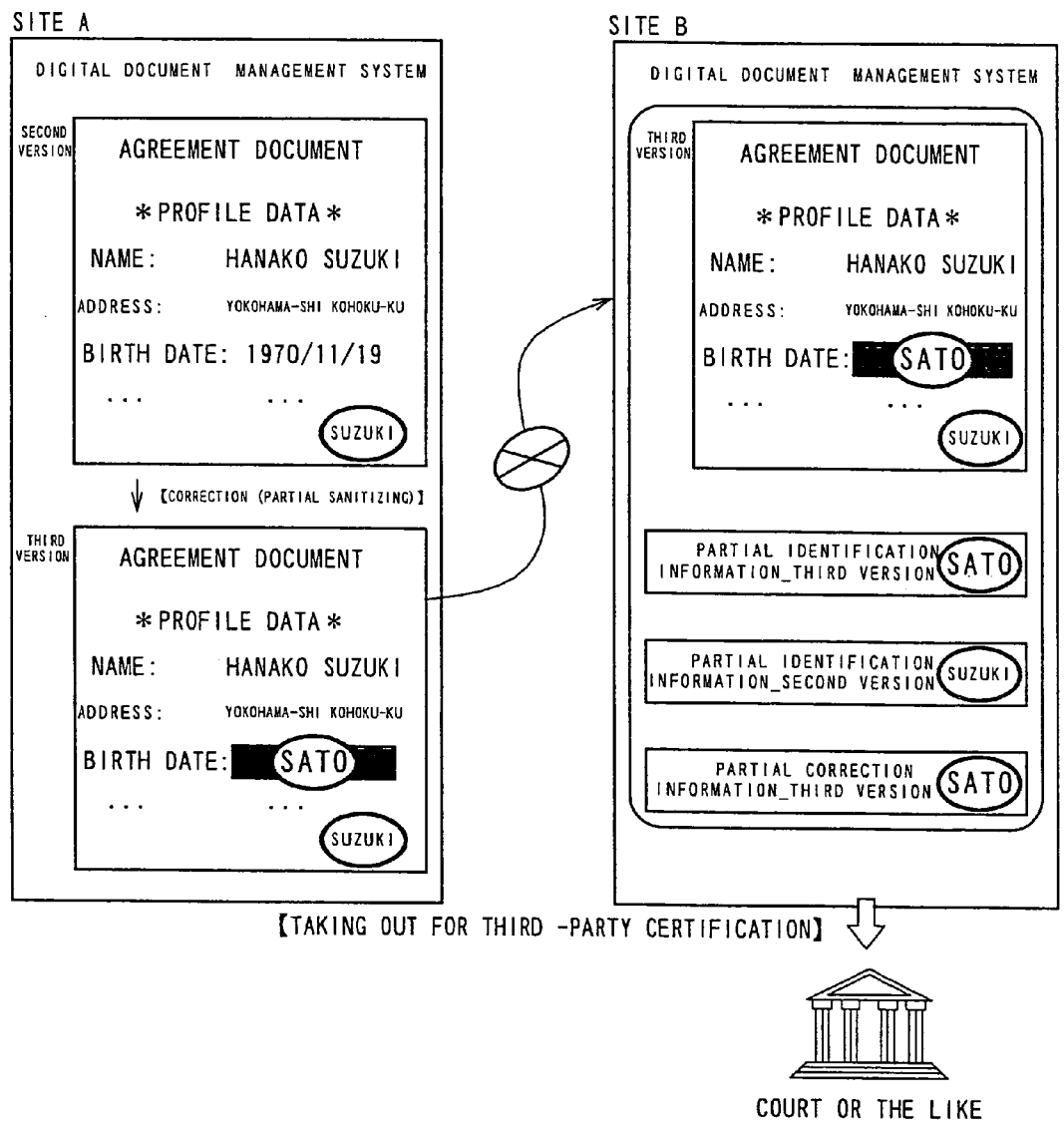
FIG. 15 is a view conceptually showing the usage scene in a second phase.

FIG. 15 is a view conceptually showing the usage scene in the second phase. In the usage scene shown in FIG. 15, the present system provides the following functions to Taro Sato and Minoru Yamada.

(B) Registration data correction function (this function is used when sanitizing is applied to the agreement document)

(D) Registration data distribution (transmission) function (this function is used when the agreement document is transmitted)

(E) Registration data distribution (reception) function (this function is used when the agreement document is received)

(F) Registration data acquisition function (this function is used when the agreement document is exhibited as evidence in a court case)

Figure 16:
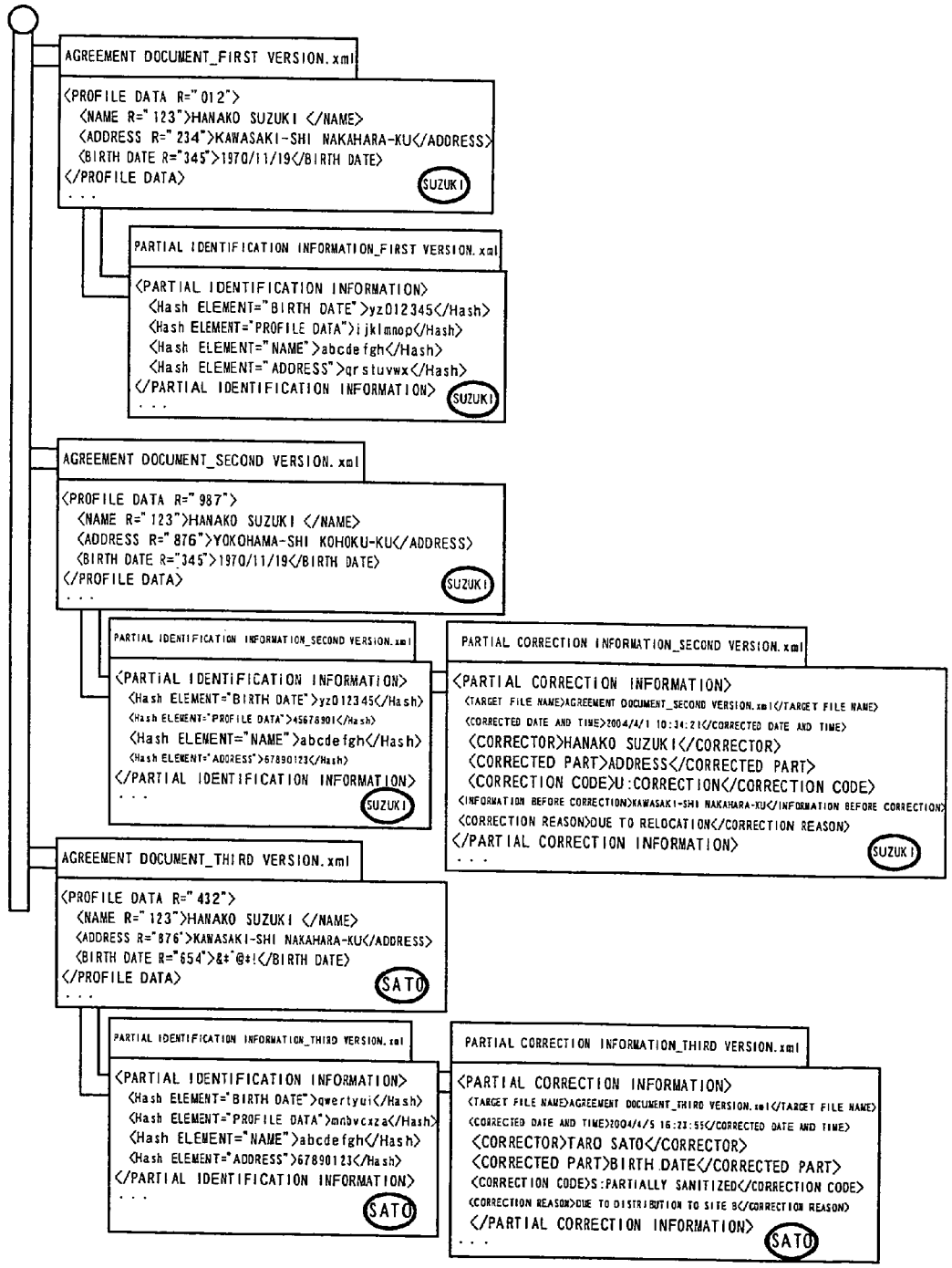
FIG. 16 is a view showing an original document storage state at the registration document correction (partial sanitizing) time.

The operation of (B) has been described in the usage scene set in the first phase and the description thereof is omitted. Hereinafter, operations in the above respective events (D) to (F) will be described. FIG. 16 shows a state of the original document storage section 42 at the correction (partial sanitizing) time of (B). It can be seen form FIG. 16 that a third version has newly been registered. Further, it can be seen from a comparison between the second and third versions of partial identification information that there is a difference only in the information of "birth date" and "profile data" due to sanitizing processing applied to "birth date" field. As a precondition in this usage scene, users 90 (Taro Sato and Minoru Yamada) have previously been registered in this digital document integrity assurance system so as to be able to access the system. The usage scene is started when Taro Sato and Minoru Yamada access/login the system.

(D) Distribution (Transmission) Time of Agreement Document

Figure 18:
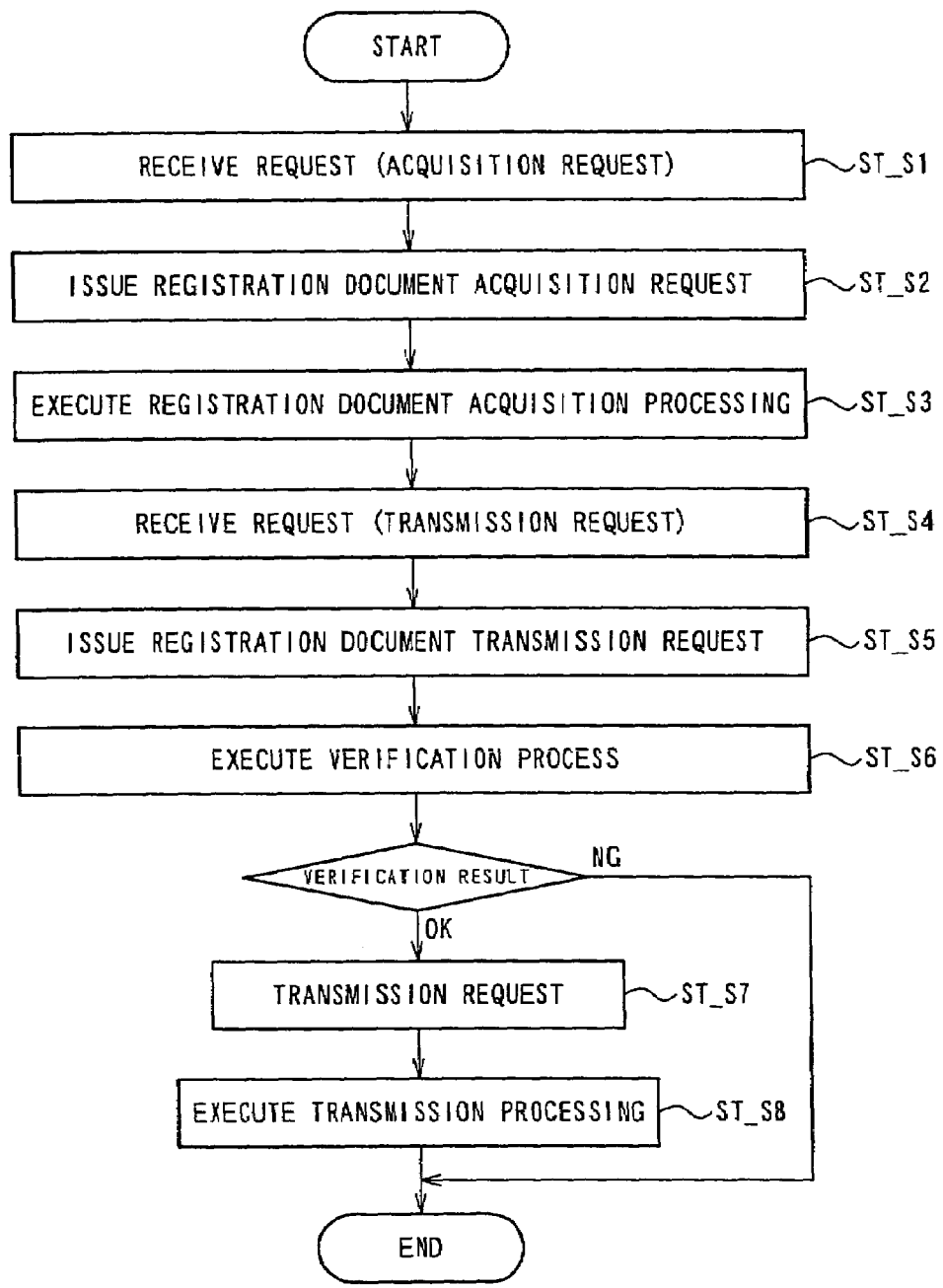
FIG. 18 is a flowchart showing operation of registration document distribution (transmission) processing.

FIG. 18 is a flowchart showing operation of registration document distribution (transmission) processing.

When the user 90 (Taro Sato) selects "registration document distribution (transmission)" menu on a not-shown window, "target registration document list" representing documents for which Taro Sato can perform processing (i.e., transmission processing) is displayed. When Taro Sato selects an agreement document to be transmitted from the "target registration document list" on the window, a registration document acquisition request is issued to the request analysis section 20 of the digital document management system 10. Then, the following steps are performed.

(1) The request analysis section 20 of the digital document management system 10 receives the registration document acquisition request (step ST-S1) and issues the same to the original document processing section 41 (step ST-S2).

(2) The original document processing section 41 takes out the agreement document set registered/stored in the original document storage section 42 and displays the document on the window so that Taro Sato can refer to it. Further, the original document processing section 41 takes out the policy information of the agreement document registered/stored in the policy storage section 31 (step ST-S3).

Figure 17:
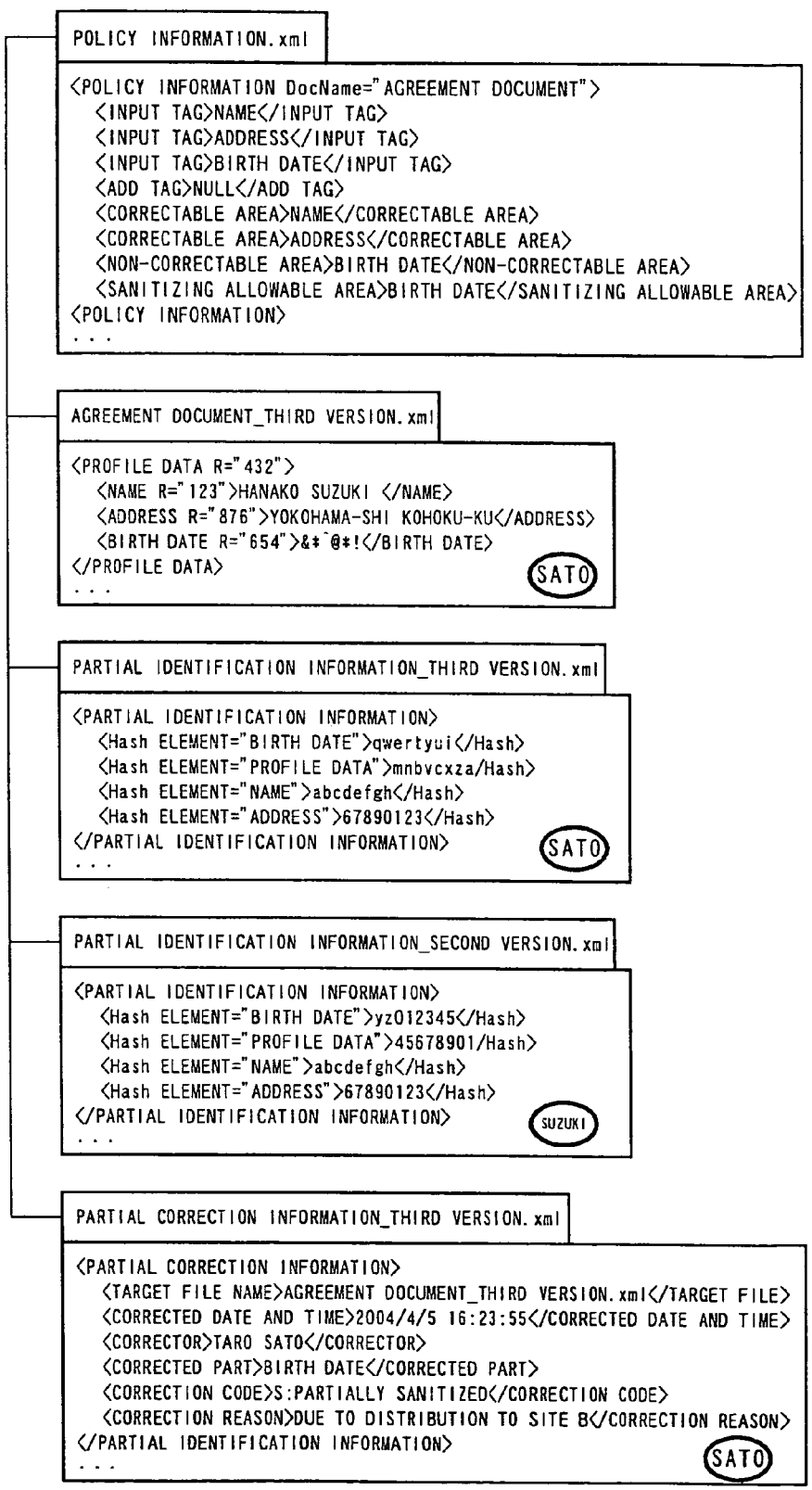
FIG. 17 is a view showing a complete set of agreement document to be transmitted.

The agreement document set to be taken out at this time is shown in FIG. 17. It should be noted that the agreement document—main body (second version) is not disclosed. This is because that information before being sanitized is included in agreement document—main body (second version). Naturally, in the partial sanitizing processing, information before being sanitized is hidden in "information before correction" of the partial correction information, although this is the same with correction processing. By transmitting these information of FIG. 16 other than the agreement document—main body (second version) in a combined manner, it is possible to distribute the information to spot B to allow the user located at site B to utilize the information while keeping the content before being sanitized confidential. Further, a third-party certification is made possible. A method of achieving a third-party certification using the document group will be described later. After Taro Sato has confirmed the content of the transmitted document, a registration document distribution (transmission) request is issued to the request analysis section 20 of the digital document management system 10.

(3) The request analysis section 20 of the digital document management system 10 receives the registration document distribution (transmission) request (step ST-S4) and issues the same to the original document processing section 41 (step ST-S5).

(4) The original document processing section 41 executes a verification process of the agreement document to be transmitted (step ST-S6). The verification process performed at this time has been described in the usage scene set in the first phase and the description thereof is omitted.

(5) The original document processing section 41 acquires a verification result of the agreement document to be transmitted. When the verification result is affirmative (OK), the original document processing section 41 issues a transmission request to the transmission processing section 71 (step ST-S7). On the other hand, when the verification result is negative (NG), the user 90 logs out of the system to abort this registration document distribution (transmission) processing.

(6) The transmission processing section 71 transmits the agreement document set to the digital document management system located at site B and returns a transmission result to the original document processing section 41 (step ST-S8).

After completion of the above steps, the user 90 logs out of the system to normally end the registration document distribution (transmission) processing.

(E) Reception Time of Agreement Document

Figure 19:
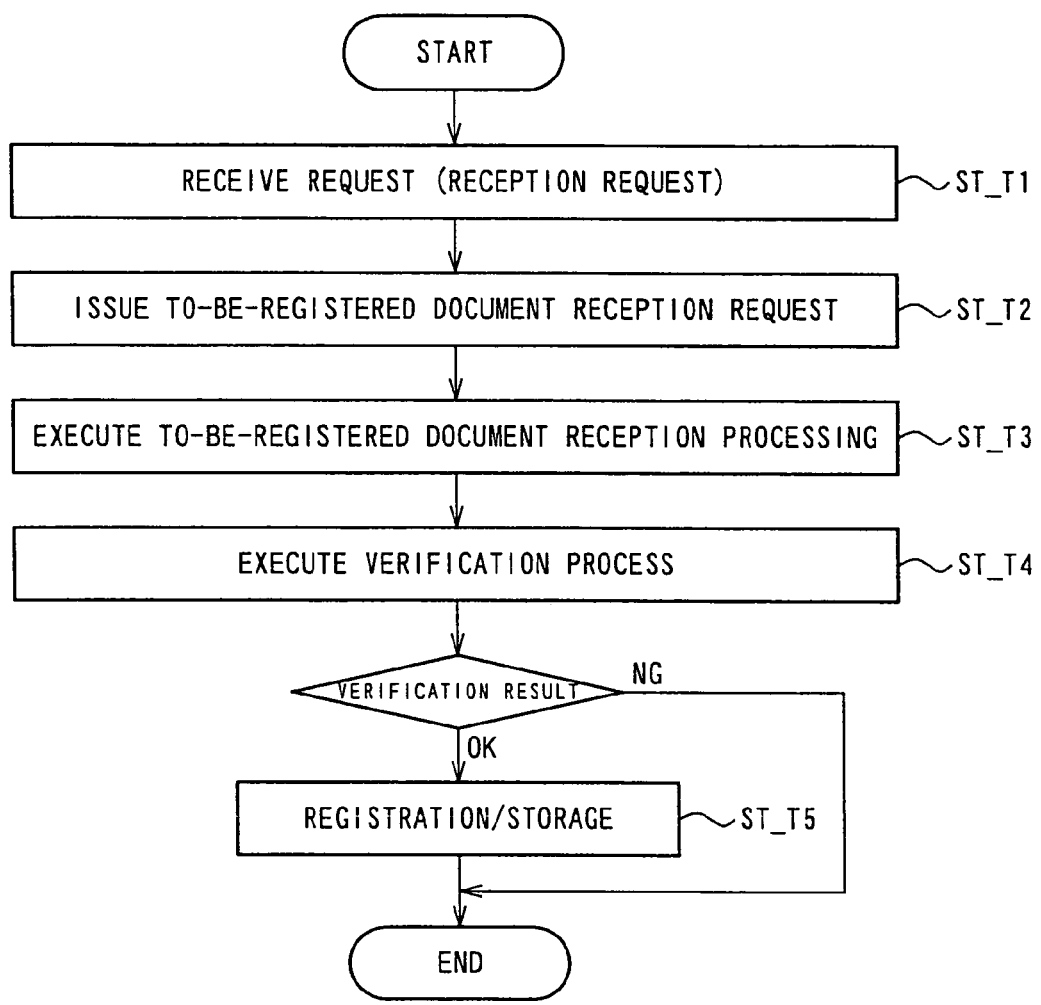
FIG. 19 is a flowchart showing operation of reception processing of a document to be registered.

FIG. 19 is a flowchart showing operation of reception processing of a document to be registered.

When the user 90 (Minoru Yamada) selects "reception of to-be-registered document" menu on a not-shown window, "target to-be-registered document list" representing documents for which Minoru Yamada can perform processing (i.e., reception processing) is displayed. When Minoru Yamada selects an agreement document to be received from the "target to-be-registered document list" on the window, a to-be-registered document reception request is issued to the request analysis section 20 of the digital document management system 10. Then, the following steps are performed.

(1) The request analysis section 20 of the digital document management system 10 receives the to-be-registered document reception request (step ST-T1) and issues the same to the original document processing section 41 (step ST-T2).

(2) The original document processing section 41 issues the to-be-registered document reception request to the reception processing section 72.

(3) The reception processing section 72 receives the agreement document set at the present system at site B and returns the received agreement document set to the original document processing section 41 (step ST-T3).

(4) The original document processing section 41 executes a verification process of the agreement document acquired from the reception processing section 72 (step ST-T4). The verification process performed at this time has been described in the usage scene set in the first phase and the description thereof is omitted.

(5) The original document processing section 41 acquires a verification result of the agreement document to be received. When the verification result is affirmative (OK), the original document processing section 41 registers/stores policy information included in the agreement document set to the policy storage section 31 and registers/stores the agreement document set in the original document storage section 42 (step ST-T5). On the other hand, when the verification result is negative (NG), the user 90 logs out of the system to abort this to-be-registered document reception processing.

After completion of the above steps, the user 90 logs out of the system to normally end this to-be-registered document reception processing.

(F) Acquisition Time of Agreement Document

Figure 20:
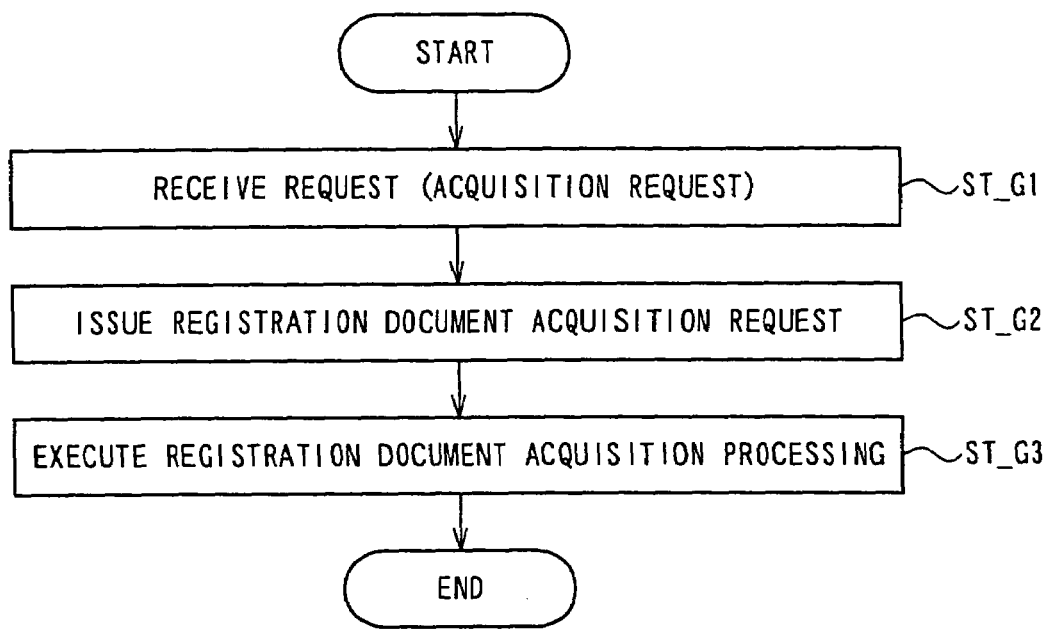
FIG. 20 is a flowchart showing operation of registration document acquisition processing.

FIG. 20 is a flowchart showing operation of registration document acquisition processing.

When the user 90 (Minoru Yamada) selects "registration document acquisition" menu on a not-shown window, "target registration document list" representing documents for which Minoru Yamada can perform processing (i.e., acquisition processing) is displayed. When Minoru Yamada selects an agreement document to be acquired from the "target registration document list" on the window, a registration document acquisition request is issued to the request analysis section 20 of the digital document management system 10. Then, the following steps are performed.

(1) The request analysis section 20 of the digital document management system 10 receives the registration document acquisition request (step ST-G1) and issues the same to the original document processing section 41 (step ST-G2).

(2) The original document processing section 41 acquires the agreement document registered/stored in the original document storage section 42. Further, the original document processing section 41 takes out policy information of the agreement document registered/stored in the policy storage section 31 (step ST-G3).

After completion of the above steps, the user 90 logs out of the system to normally end this registration document acquisition processing. FIG. 17 shows the verification data group to be taken out by this acquisition processing. A description will be given of what kind of third-party certifications can be achieved in the present usage scene in the case where the verification data group is exhibited in a court or the like as evidence.

Figure 21:
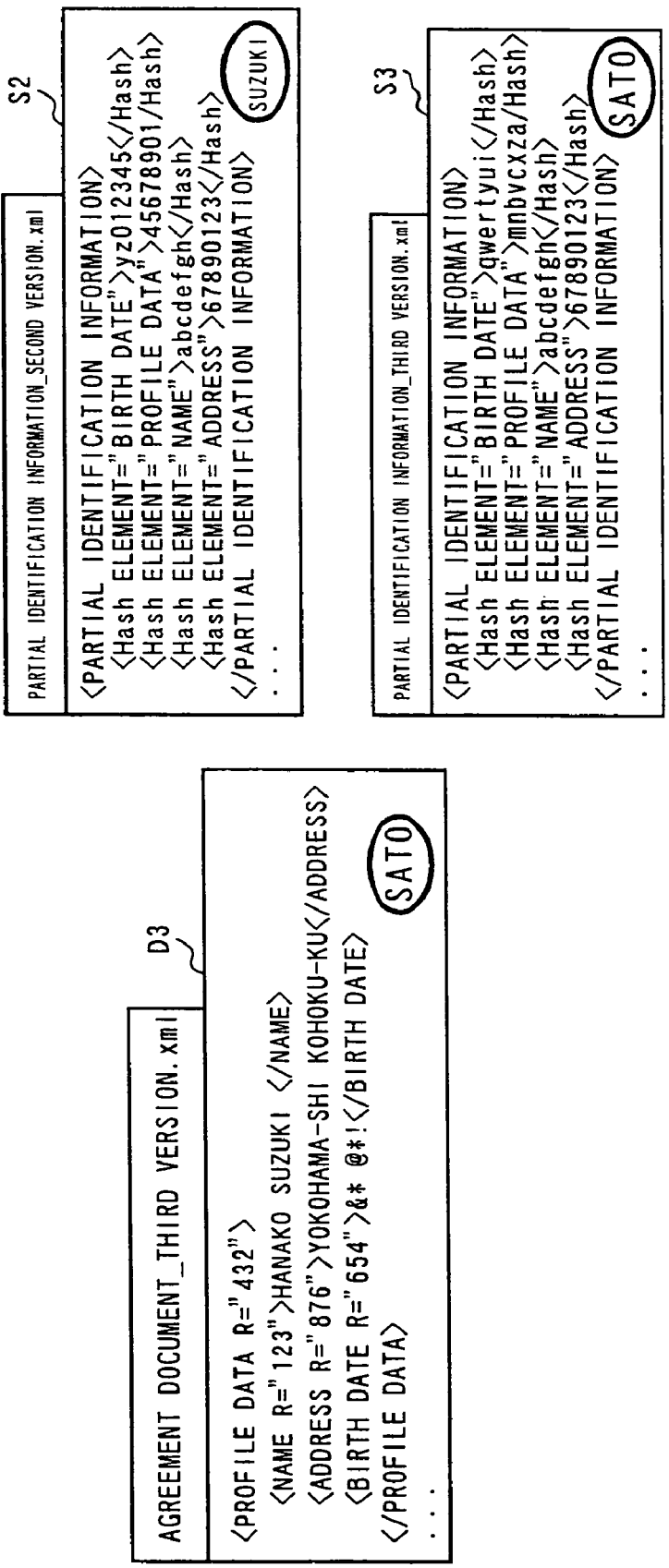
FIG. 21 is a view showing a third-party certification 1.

Firstly, in FIG. 21, a comparison among the agreement document (third version) (D3), partial identification information (second version) (S2), and partial identification information (third version) (S3) allows the following third-party certifications to be achieved.

Certification 1: Capable of confirming that the agreement document (third version) (D3) is created based on the agreement document signed by Hanako Suzuki.

Certification 2: Capable of confirming that the content described by Hanako Suzuki has not been falsified.

Certification 3: Capable of confirming that only "birth date" field has been changed from the previous version. Capable of confirming that any other part than the "birth date" field have not been changed from the previous version.

(Verification Method for Certifications 1 to 3)

It can be seen form FIG. 21, the hash value ("yz012345") of birth date in the partial identification information (second version) (S2) differs from that ("qwertyui") in the partial identification information (third version) (S3) and, accordingly, profile data between the two versions differ from each other. However, the hash values of other parts correspond to each other between the two versions.

As a result, it is possible to confirm that only "birth date" and "profile data" have been changed between the second and third versions. At the same time, it is possible to confirm that any other part than the "birth date" and "profile data" includes no change. Further, signatures of Hanako Suzuki and Taro Sato are appended to the partial identification information (second version) (S2) and partial identification information (third version) (S3) respectively and verification thereof can be made. Therefore, certification 3 can be verified. Further, it can be seen from the above comparison that a signature of Hanako Suzuki is certainly appended to any other part than the changed part. Therefore, the certifications 1 and 2 can be verified.

While "profile data" is included in the partial identification information in the present underlying technique, if the "profile data" is excluded from the partial identification information, the different portion is confined to "birth date" field.

Figure 22:
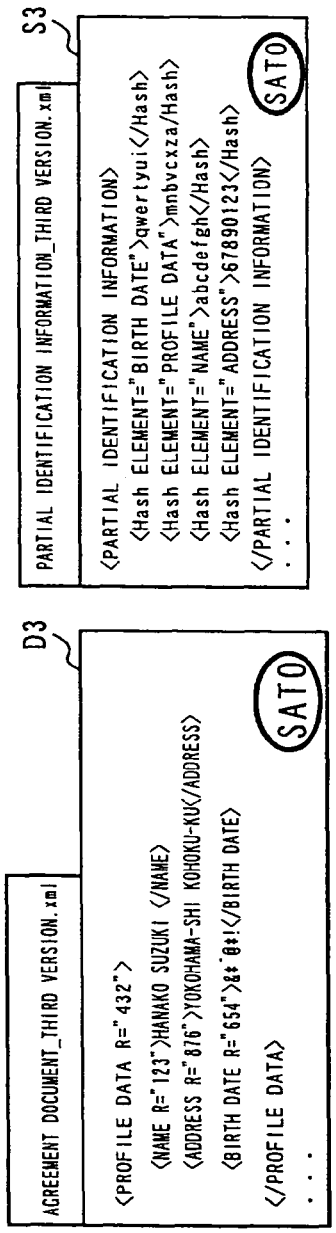
FIG. 22 is a view showing a third-party certification 2.

Next, a comparison between the agreement document (third version) (D3) and partial identification information (third version) (S3) in FIG. 22 allows the following third-party certifications to be achieved.

Certification 4: Capable of confirming that the content of the agreement document (third version) (D3) has not been falsified since it was registered in the system.

(Verification Method for Certification 4)

The certification 4 can be verified by regenerating partial identification information from the agreement document (third version) (D3) and comparing the agreement document (third version) (D3) and regenerated partial identification information (third version) (S3). For example, character strings "Hanako Suzuki" and "123" of the name element in the agreement document (third version) (D3) are coupled to each other to generate a character string "Hanako Suzuki 123". A hash value is generated from the character string "Hanako Suzuki 123". "abcdefgh" is extracted from the name element in the partial identification information (third version) (S3) and the hash value thereof is generated. Then, the above two hash values are compared to each other to determine whether they are identical or not. The same processing and comparison are applied to any other part than the name element. Only when all elements are determined to be identical between the agreement document (third version) (D3) and regenerated partial identification information (third version) (S3), it is possible to say that the agreement document (third version) (D3) has not been falsified since it was registered in the system. Therefore, the certification 4 can be verified.

Figure 23:
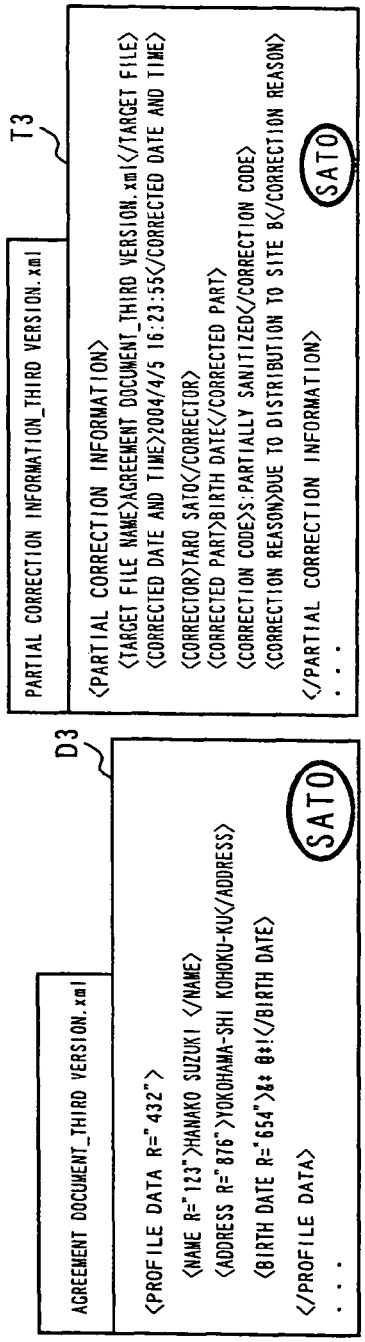
FIG. 23 is a view showing a third-party certification 3.

Further, a comparison between the agreement document (third version) (D3) and partial correction information (third version) (T3) in FIG. 23 allows the following third-party certifications to be achieved.

Certification 5: Capable of confirming that "birth date" of the current (third version (D3)) agreement document has been subjected to sanitizing processing in the previous version by referring to the partial correction information (third version) (T3). Capable of confirming the corrected (sanitized) date and time and corrector's name (in this case, Taro Sato).

(Verification Method for Certification 5)

The certification 5 can be verified by referring to the corrected date and time, corrector, corrected part, correction code, correction reason in the partial correction information (third version) (T3) to which a signature of Taro Sato is appended.

(Underlying Technique 2)

Next, as an underlying technique 2 of the present invention, a case where the underlying technique of the present invention is applied to a second application field will be described. As described above, an original document management method and verification method realizing more effective partial falsification detection in an XML document will be described below.

Figure 24:
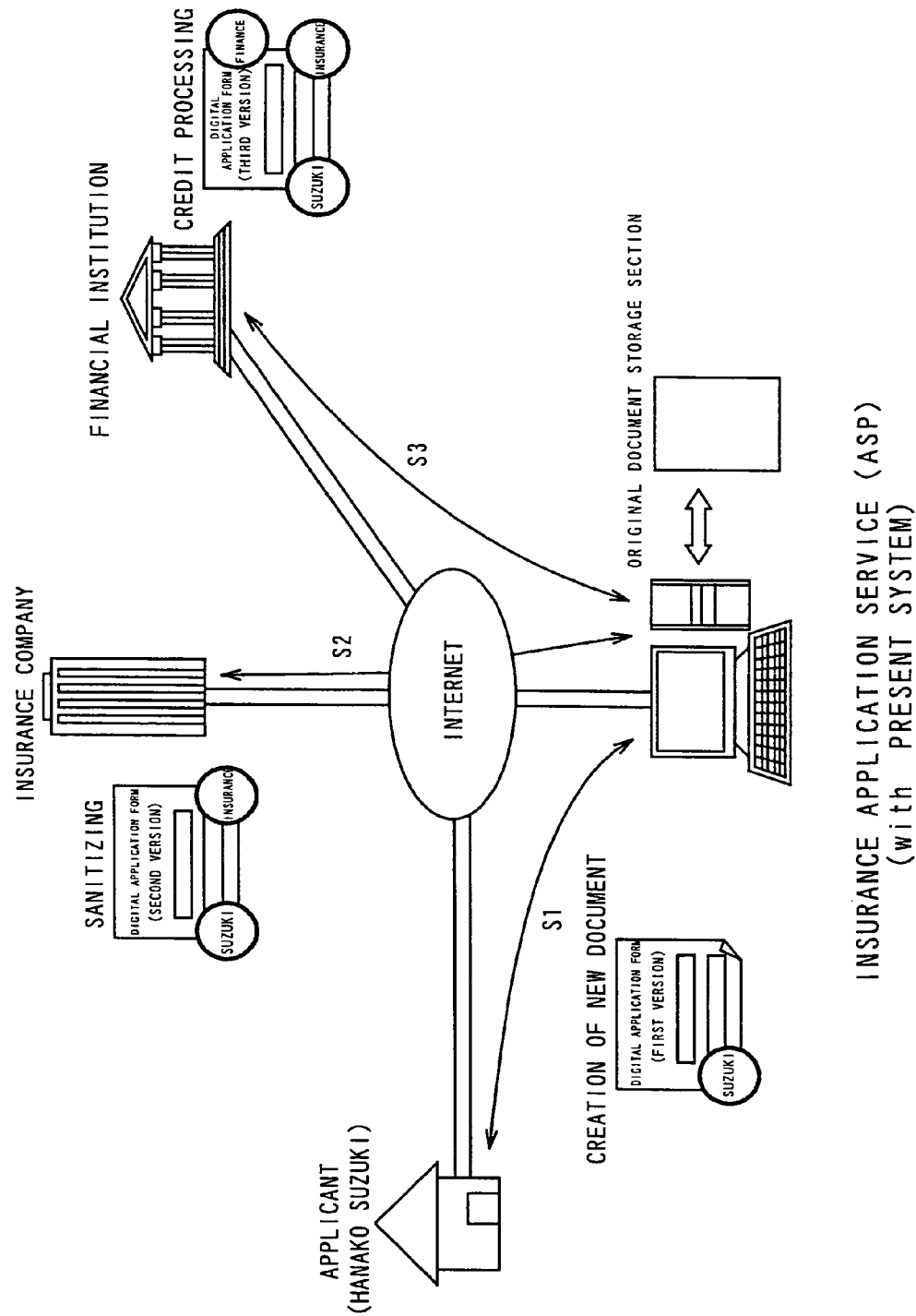
FIG. 24 is a view showing the usage scene of the second application field in underlying technique 2.

In the present usage scene, "insurance application form" is employed as digital data distributed among three entities (applicant, insurance company, and financial institution) to assume "insurance application service" where the data on the "insurance application form" is handled. FIG. 24 is a view showing a form of the present system model. When accessing the "insurance application service" (dedicated Web server/ASP) provided/operated under the above configuration, the three entities can utilize the present system. It is assumed that this "insurance application service" is operated by a reliable third-party organization and that the "insurance application form" is distributed through the third-party organization.

In this service, an applicant (Hanako Suzuki) utilizes the present system installed/provided on Internet to make an insurance application, the insurance company receives the application form, and the financial institution makes settlement of this agreement. The flow of the document is shown in the following steps (1) to (5). Note that the applicant (Hanako Suzuki), an insurance company representative, and a financial institution representative have already been registered in the "insurance application service".

(1) The applicant (Hanako Suzuki) logs in (at this time, identification is made using, e.g., a combination of ID and password or through biometrics) the "insurance application service" through a Web browser, creates/registers an insurance application form (first version) to thereby store the application form in an original document storage unit (original document storage section 42) installed in the present system. When the applicant performs e.g., determination key/transmission key depression operation, application form data (first version) is transmitted to the insurance company (arrow S1 in FIG. 24).

(2) The financial institution representative uses some way (e.g., using a notification through E-mail, or through periodical order check) to acquire the insurance application form (first version) transmitted from the applicant (Hanako Suzuki) from the present system and checks and verifies it.

(3) The insurance company representative transmits credit information to the financial institution in order to make settlement associated with the insurance agreement. At this time, hiding (sanitizing) is partially applied to the information other than that the financial institution needs as the credit information (e.g., information related to a kind of insurances). The insurance company representative then updates the insurance application form (first version) with a new version (second version) of the insurance application form in which the sanitizing has been applied and registers it in the system to thereby store the insurance application form (second version) in an original document storage unit (original document storage section 42). When the insurance company representative performs e.g., determination key/transmission key depression operation, application form data (second version) is transmitted to the financial institution (arrow S2 in FIG. 24).

(4) The insurance company representative uses the same way (i.e., uses, e.g., a notification through E-mail like the insurance company representative) to acquire the insurance application form (second version) transmitted from the insurance company from the present system and checks and verifies it.

(5) The financial institution representative transmits a settlement result associated with the insurance agreement between Hanako Suzuki and insurance company to the insurance company. At this time, the financial institution representative adds credit confirmation information to the application form data to thereby update it with a new version (third version) of the insurance application form and registers it in the system to thereby store the insurance application form (third version) in an original document storage unit (original document storage section 42). When the financial institution representative performs e.g., determination key/transmission key depression operation, application form data (third version) is transmitted to the insurance company (arrow S3 in FIG. 24).

Next, a method of managing the insurance application form in the respective original document storage units (original document storage sections 42) in the course of the steps (1) to (5) will be described. Further, a verification method performed in respective time points and a third-party certification achieved by the verification will be described together. The techniques and functions for controlling the present system have concretely been described in the usage scene of the first application field (underlying technique 1) and the description thereof is omitted.

(1) Creation of Insurance Application Form (First Version)

FIG. 25 shows an example of the insurance application form (XML data) to be newly created in the present step. In the first application field described in the underlying technique 1, a very simple XML data (see FIG. 5) having a flat structure (having only one parent element with a plurality of child elements) has been taken as an example for the purpose of explaining a basic concept. In the second application field, XML data having a complicated hierarchical structure as shown in FIG. 25 is used. FIG. 25 is an example in which the main body of the insurance application form (first version) is represented using the XML data.

In the example of XML data shown in FIG. 25, <insurance application form> is set as a root element, and three parent elements (<contractor>, <designated account>, and <agreement information>) are located under <insurance application form>.

Figure 26:
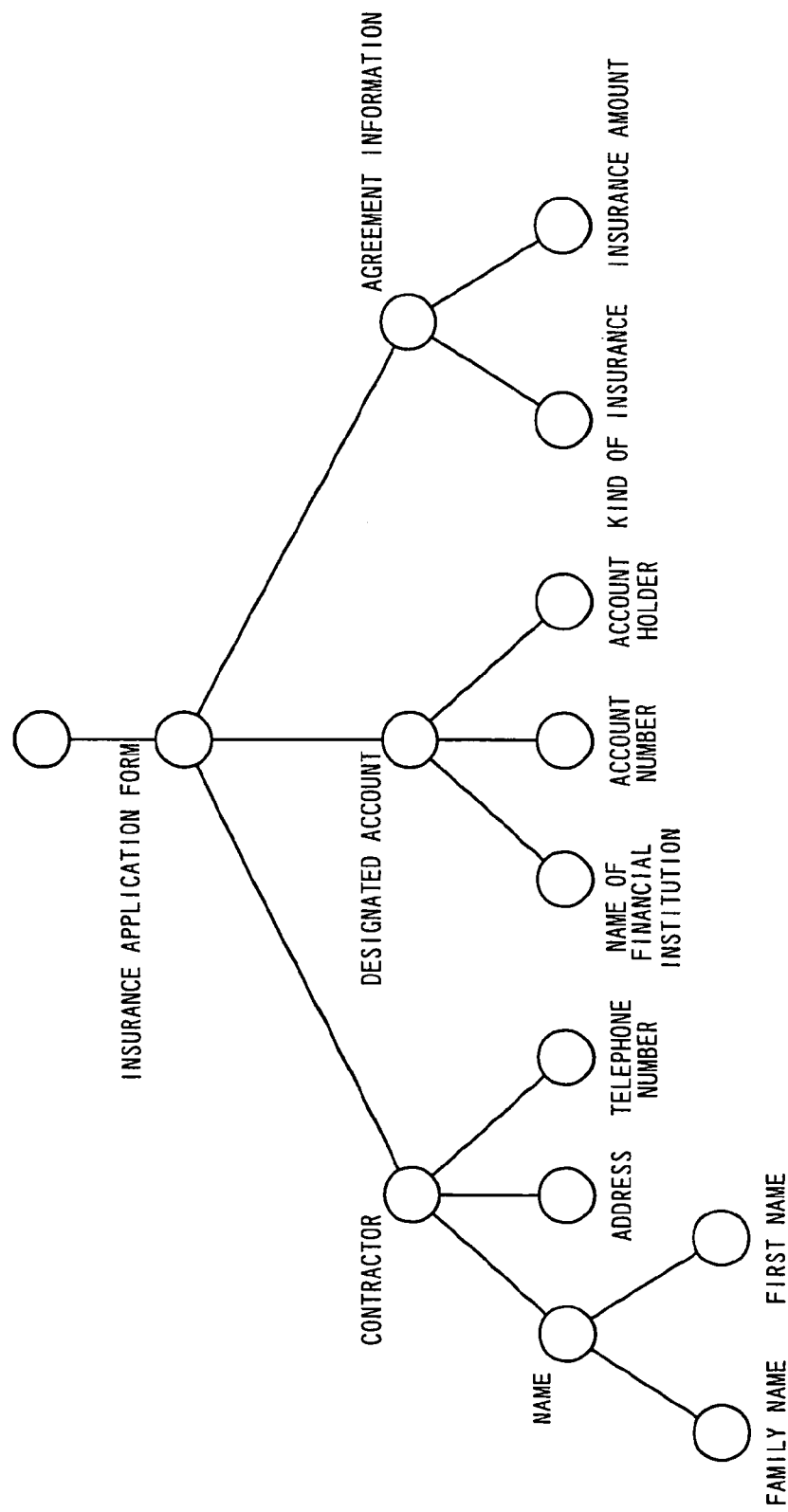
FIG. 26 is a view showing an XML data model of the insurance application form (first version)

Various child elements are located under each parent element. FIG. 26 is a tree model of the XML data and shows an XML data model of the insurance application form (first version). It can be said that the insurance application form is a kind of a hierarchically structured document having a tree structure.

A generation method of partial identification information corresponding to the insurance application form data will next be described. FIG. 27 shows an example in which the partial identification information generated at the creation time of the insurance application form (first version) is represented using XML data.

As shown in FIG. 27, in first version, hash information of all child elements, as well as hash information of all parent elements (<insurance application form>, <contractor>, <designated account>, <agreement information>, <name>) are generated and recorded.

Figure 28:
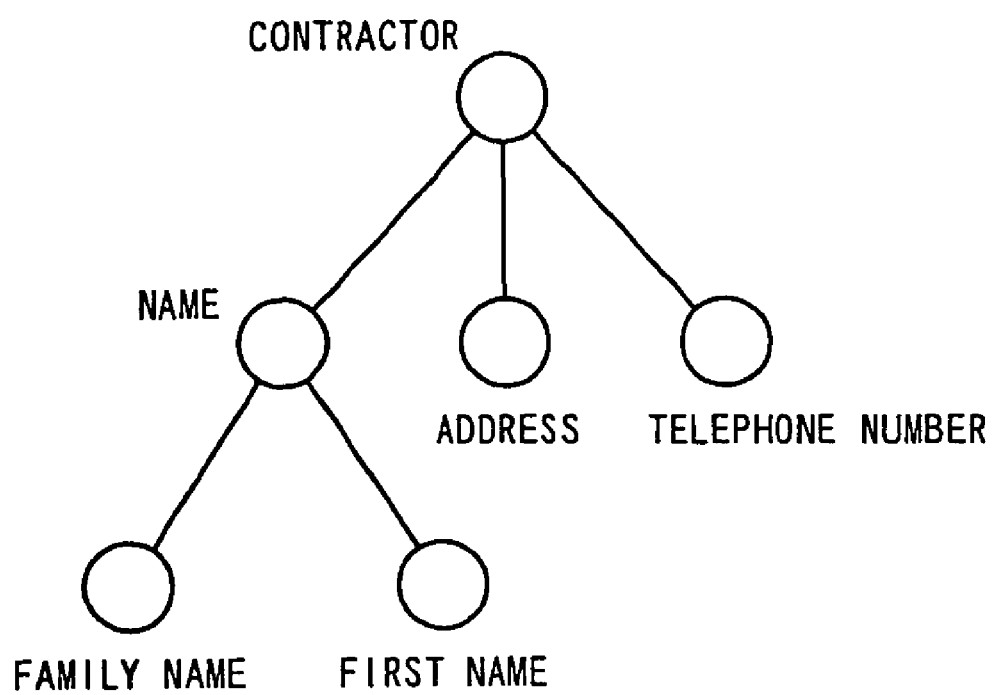
FIG. 28 is a view showing the XML data model constituted only by a set of "contractor"

The above configuration is made for the purpose of simplifying a document update process to be performed after the first version. That is, when no change is made for a set of parent and child elements (e.g., <family name>, <first name>, <name> (which is the parent element of <family name> and <first name>), <address>, and <telephone number>), it is only necessary to record the hash information (="7ed6c") of <contractor> which is the parent element of the above child elements. FIG. 28 is a view showing the XML data model constituted only by a set of "contractor". The above data record management makes it possible to omit verification of the five elements (<family name>, <first name>, <name> (which is the parent element of <family name> and <first name>), <address>, and <telephone number>). That is, it is only necessary to perform integrity verification for the hash information of <contractor>, afterward.

Therefore, at the next (second version) verification time, it is possible to reduce data amount and verification cost much more than a case where verification data corresponding to all of (<family name>, first name>, <name>, <address>, and telephone number>) are retained and managed. While it is assumed that all elements names are unique in this example, there is a possibility that the same element name may be used with different meaning in a different place. It follows that a mechanism that uses an Xpath function or the like to identify/manage the hash information of such elements needs to be provided.

(2) Acquisition/Verification of Insurance Application Form (First Version)

Figure 29:
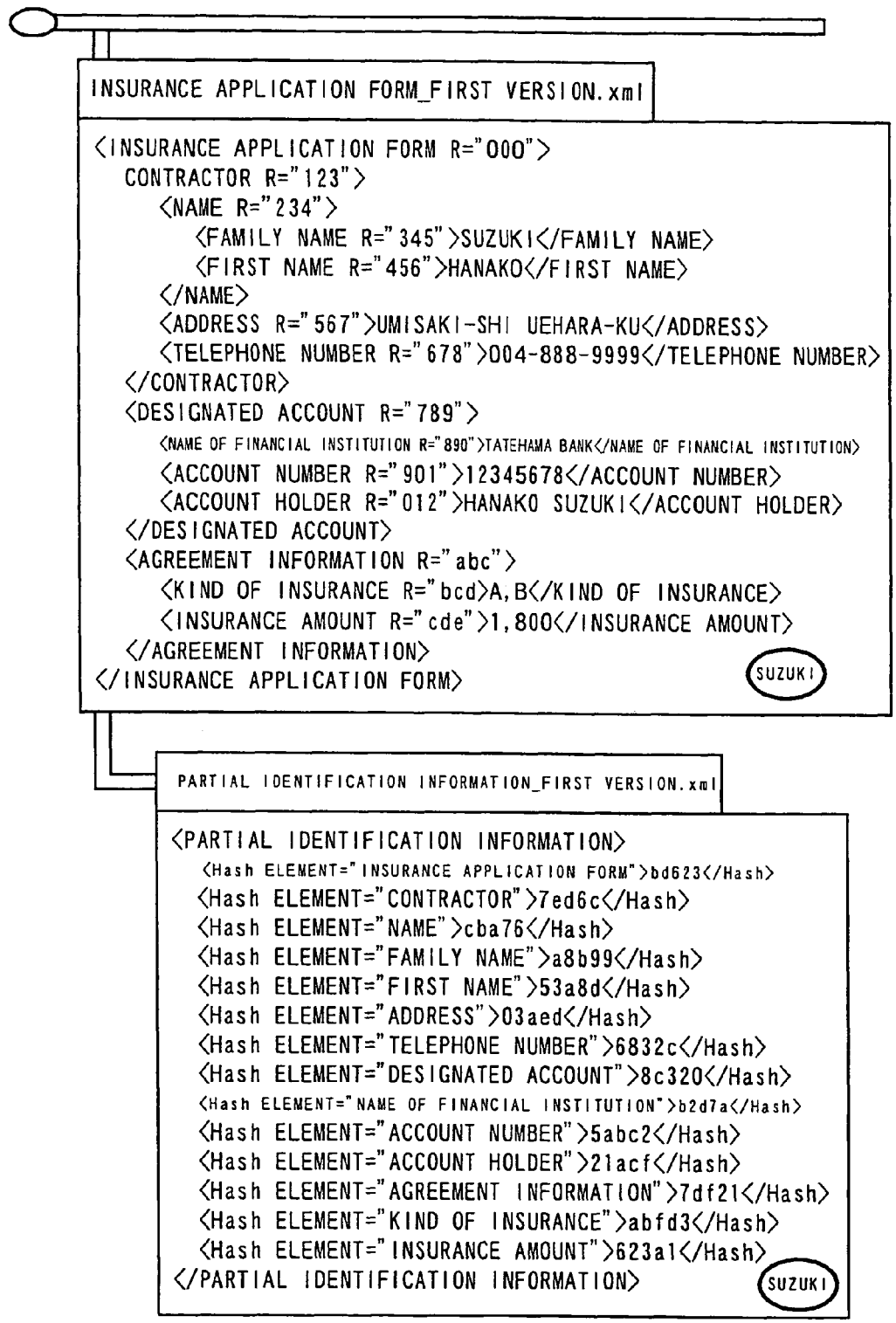
FIG. 29 is an original document storage state at the creation time of the insurance application form (first version)

FIG. 29 is an original document storage state at the creation time of the insurance application form (first version). As shown in FIG. 29, the insurance company representative acquires the insurance application form—main body (first version) and partial identification information and performs verification. The use of the verification data group allows the insurance company representative to confirm whether the insurance application form has been created by the applicant (Hanako Suzuki) and whether there is no falsification in the allocation form itself. A concrete method used in verifying the first version has already been described in the first application field in the underlying technique 1 and the description thereof is omitted.

(3) Creation of Insurance Application Form (Second Version)

To create the insurance application form (second version), the insurance company representative makes update of the insurance application form (first version) created by the applicant (Hanako Suzuki). As the update process, the insurance company representative performs partial hiding (sanitizing) for the contractor information. FIG. 30 is a view showing an example in which the updated insurance application form—main body (second version) is represented using XML data.

A part TZ in FIG. 30 denotes the part that has been corrected this time. It goes without saying that a digital signature appended to the main body at this time is not of the applicant (Hanako Suzuki) but of the insurance company. In this way, the use of a general digital signature system assures identification (i.e., who has created the document) and integrity (i.e., document itself has not been falsified).

A characteristic of the underlying technique of the present invention is as follows. For the entire document, a general digital signature system is used to assure safety. For respective parts in the document, partial identification information is generated and managed separately from the main body to clarify the responsibility of the partial identification information with respect to "Who has made a correction", "for which part a correction has been made", and "how the document has been changed".

As denoted by the part TZ in FIG. 30, the changed elements are <kind of insurance> and <insurance amount> and the changed contents thereof are represented by asterisks (*****). This expression section that the information corresponding to the changed contents has been hidden (sanitized). As a matter of course, as described in the first application field in the first underlying technique, R-attributes of the changed elements (<kind of insurance>, <insurance amount>, <agreement information> (which is the parent element of <kind of insurance> and <insurance amount>)) have been changed.

Similarly, R-attribute of <insurance application form> which is the parent element of <agreement information> and root element of the present XML data has been changed. The reason for appending R-attribute in the document and the reason for changing R-attribute corresponding to a changed part have already been described in the abovementioned first application field and the description thereof is omitted.

Figure 31:
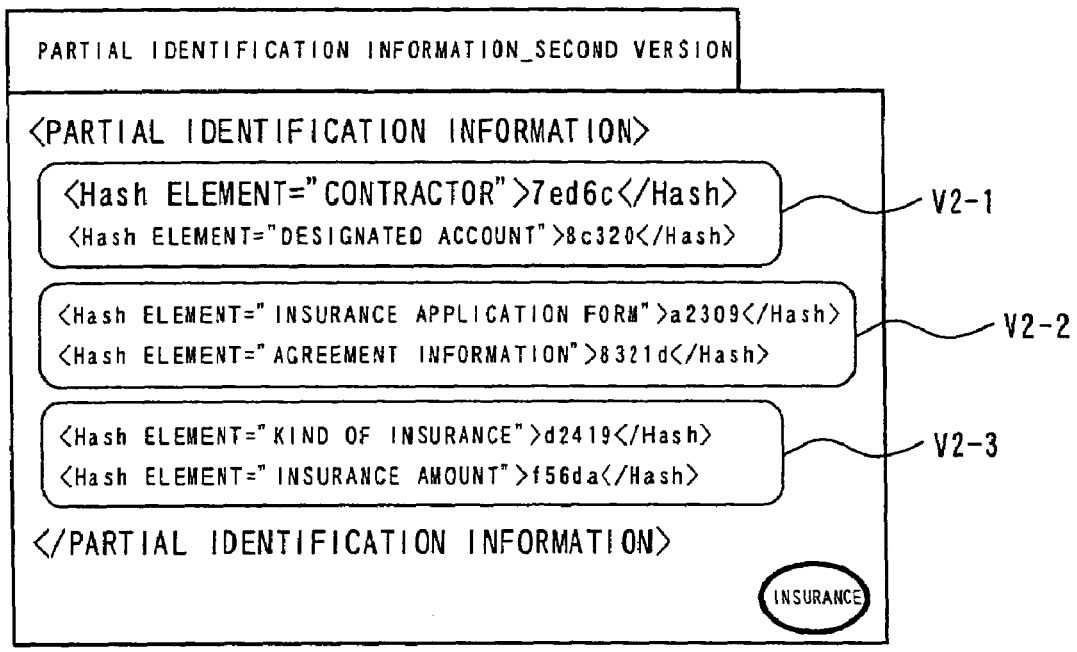
FIG. 31 is a view showing an example in which an insurance application form—partial identification information (second version) is represented using XML data.

A method of generating partial identification information corresponding to the insurance application form data (second version) will next be described. FIG. 31 is a view showing an example in which partial identification information generated at the creation time of the insurance application form (second version) is represented using XML data.

As shown in FIG. 31, the following method is used to generate partial identification information, as far as the second version and subsequent versions are concerned.

Firstly, in this example, no change has been made for <contractor> and <designated account> which are parent elements. This signifies that no change has been made for all child elements located under <contractor> and <designated account>. Therefore, only the hash information of the parent elements (<contractor> and <designated account>) are recorded in the partial identification information (second version), as described above (V2-1 in FIG. 31). The relevant part may be copied from the partial identification information (first version) or may be generated once again from the insurance application form—main body (second version).

It is obviously adequate to use the former method in the sense of reducing generation cost of the partial identification information.

The changes of this time in <kind of insurance> and <insurance amount> give influence to the hash information of the parent elements, i.e., <agreement information> and <insurance application form>. In this example, the hash information of the parent elements are generated and recorded once again (V2-2 in FIG. 31). This part (V2-2) can directly be utilized at the next update (third version) time if there is no change in the relevant part.

With the above configuration, it is possible to reduce generation cost of the hash information corresponding to unchanged part in the next update or later. In this example, <insurance application form> serves as a root element. Thus, only one change in the parent/child elements under <insurance application form> causes the hash information of the root element (<insurance application form>) to be changed. The recording of the hash information of the root element (<insurance application form>) makes it possible to easily confirm that there is no falsification in the information, improving further the verification quality.

However, since similar verification can be made using a digital signature appended to the entire document, it is not always necessary to record the hash information of the root element (<insurance application form>). It goes without saying that it is necessary to regenerate and record the hash information corresponding to 25<kind of insurance> and <insurance amount> which have been changed this time in order to identify the changed part afterward (V2-3 in FIG. 31).

Figure 32:
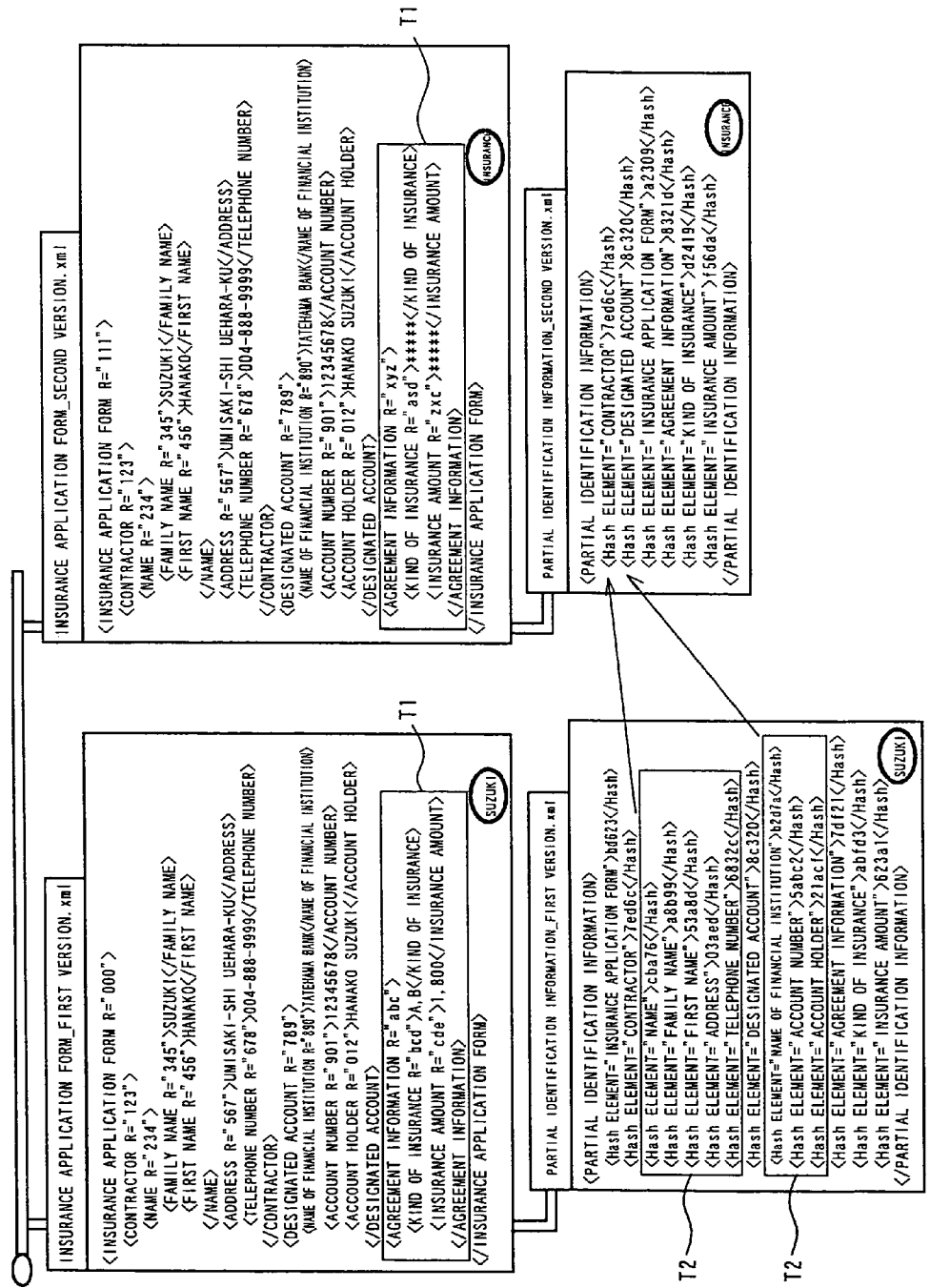
FIG. 32 is a view showing an original document storage state at the creation time of an insurance application form (second version)

FIG. 32 is a view showing an original document storage state at the creation time of the insurance application form (second version). In FIG. 32, a part T1 denotes a changed part, and T2 denotes a part (child elements) which has not been changed this time. It can be seen from this example that the hash information corresponding to the child elements are not recorded but the hash information of the parent elements thereof (<contractor> and <designated account>) are recorded.

The generation/record of the partial correction information has no direct relevance to the usage scene in the second application field and the description thereof is not particularly made. A concrete description about the generation/record of the partial correction information has been made in the usage scene in the first application field.

(4) Acquisition/Verification of Insurance Application Form (Second Version)

As shown in FIG. 32, the financial institution representative acquires the insurance application form—main body (second version), partial identification information (second version), and partial identification information (first version). At this time, it is not possible for the financial institution representative to acquire/review the insurance application form—main body (first version). This is because that the insurance application form—main body (first version) has the contents of <kind of insurance> and <insurance amount> before being hidden (sanitized). If these contents are disclosed, it is regarded as information leak. Therefore, a mechanism that performs access control for respective sites (persons) to limit availability of the document depending on the content included at respective time point (versions) is required in addition to the original document management method using version numbers.

However, this requirement is applicable only in the case where distribution data is centrally controlled within an ASP which is one of the features of the present usage scene. In a configuration where data is directly exchanged through E-mail or the like, it is only necessary to simply select/limit transmission data appropriately.

Figure 33:
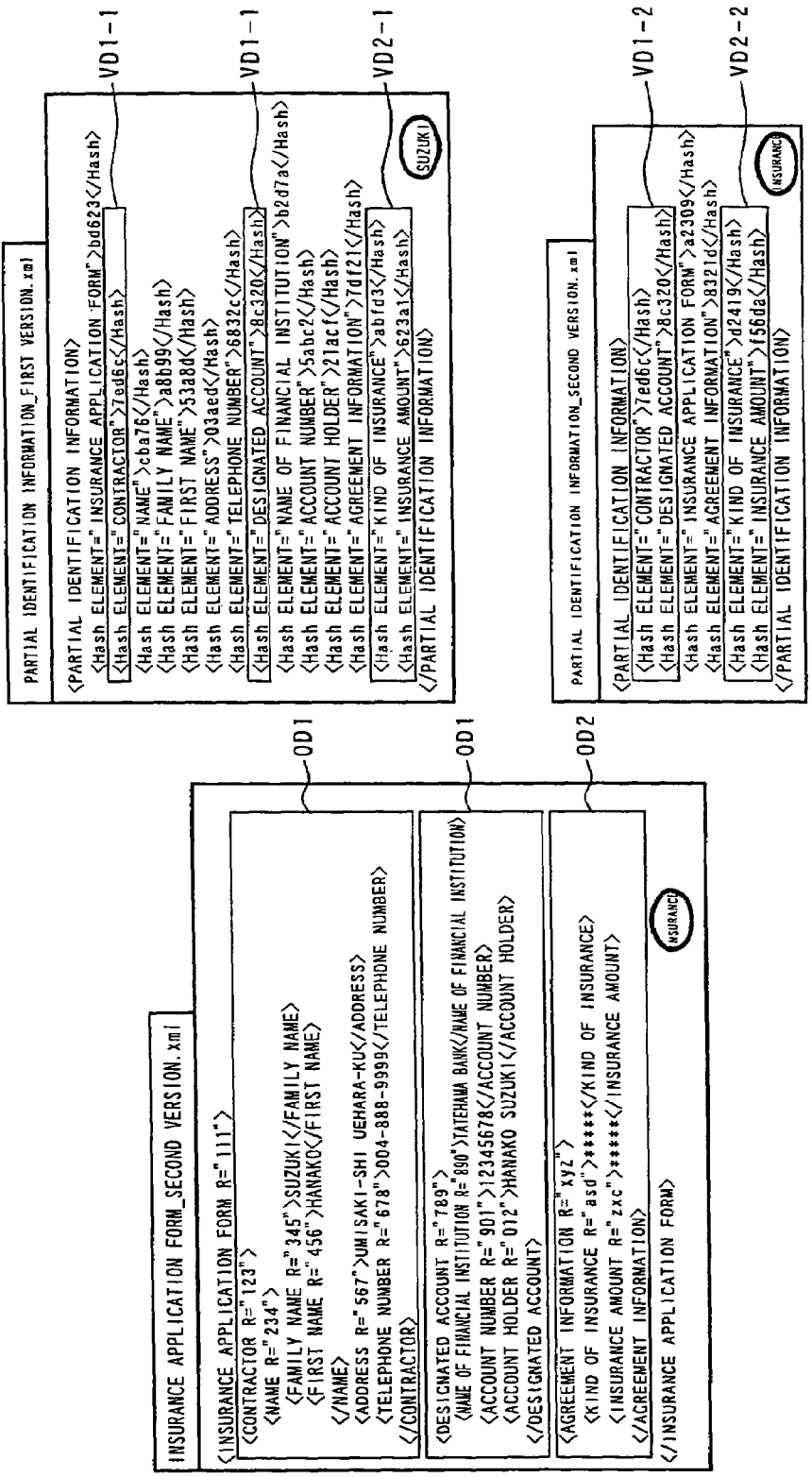
FIG. 33 is a view showing a verification data group that a financial institution representative can review.

It can be seen that the verification data group that the financial institution representative can review under the above condition is confined to "insurance application form—main body (second version)", "partial identification information (first version)", and "partial identification information (second version)". FIG. 33 shows the verification data group that the financial institution representative can review.

A use of the verification data group shown in FIG. 33 allows the verification as described below. Firstly, signatures appended to the respective verification data are verified to confirm/verify whether respective verification data themselves include a falsification or not.

After the confirmation that there is no falsification in the verification data, the insurance application form (second version) and partial identification information (second version) are used to check the content of the insurance application form (second version) itself and check whether there is any replacement of the content. To do this, hash information are generated from the respective elements in the insurance application form (second version), and the generated hash information are compared with the hash information of the corresponding elements recorded in the partial identification information (second version) to check whether they are identical to each other.

After the confirmation of the integrity of all elements, a comparison with the partial identification information (first version) is made. Since no change has been made for a part OD1 in FIG. 33, the hash information of only the parent elements of the child elements existing in the part OD1 are recorded in the partial identification information (second version) as shown by VD1-2. Therefore, when the hash information (VD1-1) in the partial identification information (first version) and hash information (VD1-2) in the partial identification information (second version) are compared with each other, it is possible to confirm that there is no change in the relevant part.

In this example, the hash information of <contractor> of the partial identification information (first version) and partial identification information (second version) are "7ed6c", and hash information of <designated account> thereof are "8c320", so that it is possible to confirm that there is no change in <contractor> and <designated account>. Therefore, in this case, it is only necessary to verify the parent element <contractor>. As a result, it is possible to omit verification of five child elements located under <contractor>, i.e., (<family name>, <first name>, <name> (which is the parent element of <family name> and <first name>), <address>, and <telephone number>) (or four elements, in the case where the verification of the parent element <name> is not included).

Similarly, it is only necessary to verify the parent element <designated account>. As a result, it is possible to omit verification of three child elements located under <designated account>, i.e., (<name of financial institution>, <account number>, and <account holder>). It follows that when only two times of verification operations are performed for the parent element, the same effect as that obtained by eight times of verification operations can be achieved. That is, in this example, it is possible to reduce verification cost by 75%. Further, when only two elements are recorded, the same effect as that obtained by recording of the hash information corresponding to eight elements. As a result, it is also possible to reduce data amount by 75%.

On the other hand, since a part OD2 in FIG. 33 has been changed from the previous version, the hash information of the corresponding child elements are recorded in the partial identification information (second version), as shown in a part VD2-2. Accordingly, by comparing the hash information (VD2-1) in the partial identification information (first version) and hash information (VD2-2) in the partial identification information (second version), it is possible to confirm that the relevant part has been changed.

In this example, the hash information of <kind of insurance> differs between first version ("abfd3") and second version ("d2419"). Further, the hash information of <insurance amount> differs between first version ("623a1") and second version ("f56da"). Accordingly, it is possible to confirm that the relevant part has been changed.

(5) Creation of Insurance Application Form (Third Version)

To create the insurance application form (third version), the financial institution representative makes update of the insurance application form (second version) created by the insurance company representative. As the update process, the financial institution representative adds credit confirmation information to the insurance application form.

FIG. 34 is a view showing an example in which the updated insurance application form—main body (third version) is represented using XML data. In FIG. 34, a part KZ has been added this time. A digital signature appended to the main body at this time is not of the insurance company representative but of the financial institution representative.

As denoted by the KZ part in FIG. 34, the added elements are <credit result> and <credit NO>.

Figure 35:
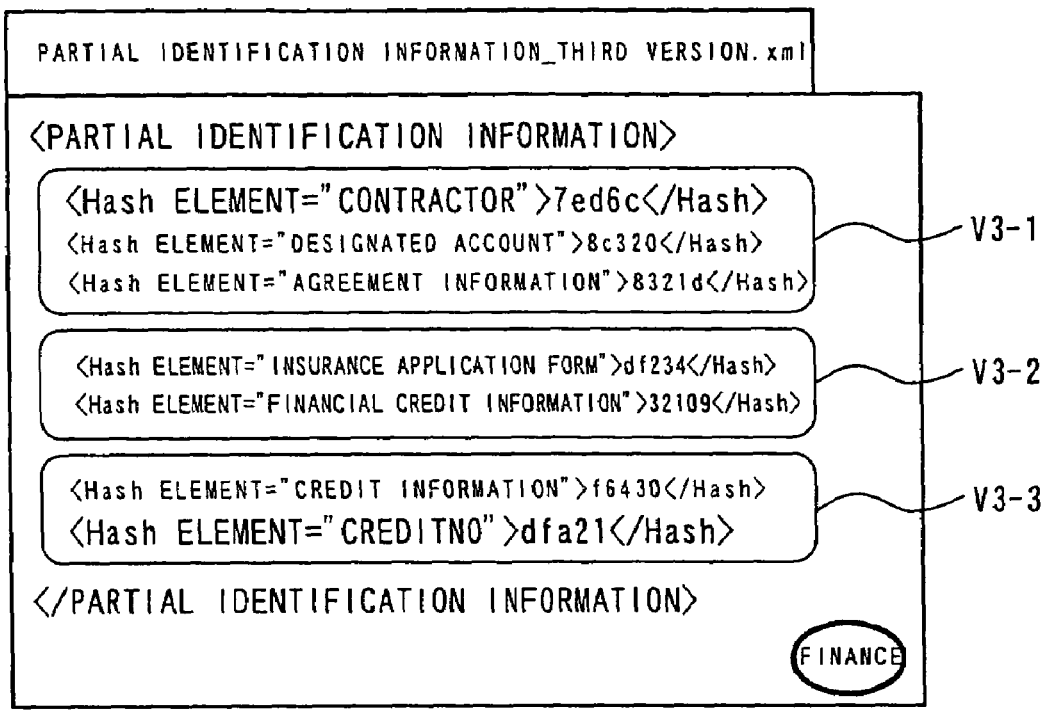
FIG. 35 is a view showing an example in which an insurance application form—partial identification information (third version) is represented using XML data.

A method of generating partial identification information corresponding to the insurance application form data (third version) will next be described. FIG. 35 is a view showing an example in which partial identification information generated at the creation time of the insurance application form (third version) is represented using XML data.

As shown in FIG. 35, the following method is used to generate partial identification information (third version), as in the case with second version.

Firstly, in this example, no change has been made for <contractor>, <designated account>, and <agreement information> which are parent elements. This signifies that no change has been made for all child elements located under <contractor>, <designated account>, and <agreement information>. Therefore, only the hash information of the parent elements (<contractor>, <designated account>, and <agreement information>) are recorded in the partial identification information (third version), as described above (V3-1 in FIG. 35).

While <kind of insurance> and <insurance amount> which are child elements located under <agreement information> were changed in the previous (second version) update time, no change has been made for <kind of insurance> and <insurance amount> this time. It can be easily seen that the previous recording of the hash information of <agreement information> corresponding to the second version of the insurance application form in the partial identification information (second version) is effectively utilized at the time of creation of third version. This signifies that the idea "it is possible to reduce generation cost of the hash information corresponding to unchanged part in the next update or later", which has been estimated at the creation time of the partial identification information (second version), has been realized.

According to the above idea, the hash information of <financial credit information> which is the parent element of a newly added <credit result> and <credit NO> (V3-2 in FIG. 35). This part (V3-2) can directly be utilized at the next update (fourth version) time if there is no change in the relevant part.

In association with the addition, <insurance application form> which is the root element is inevitably regenerated and recorded (V3-2 in FIG. 35). It goes without saying that it is necessary to regenerate and record the hash information corresponding to <credit result> and <credit NO> which have been added this time in order to identify the changed part afterward (V3-3 in FIG. 35).

Figure 36:
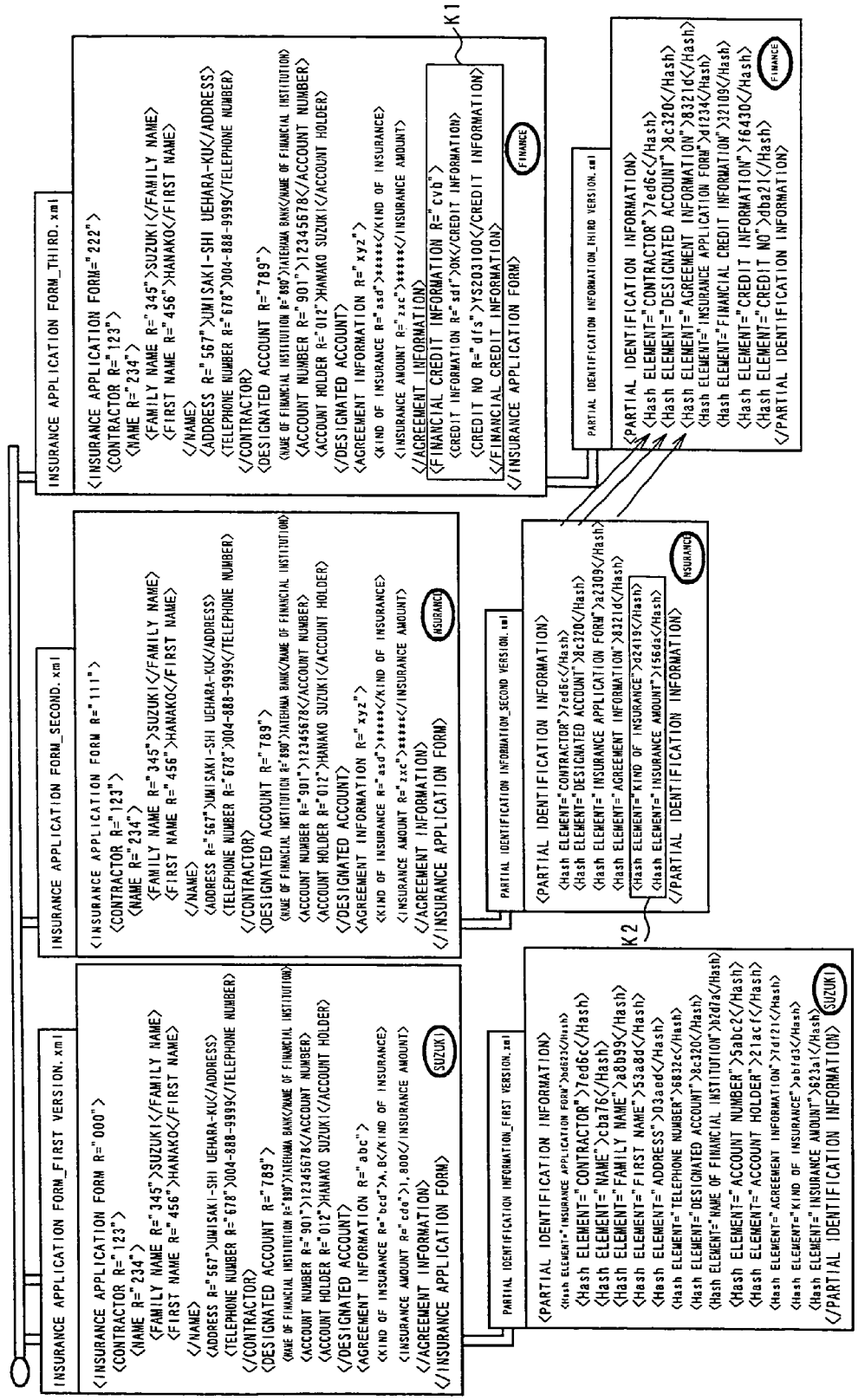
FIG. 36 is a view showing an original document storage state at the creation time of the insurance application form (third version)

FIG. 36 is a view showing an original document storage state at the creation time of the insurance application form (third version). In FIG. 36, a part K1 denotes a part that has newly been added this time, and a part K2 denotes a part (child elements) which has not been changed this time. It can be seen from this example that the hash information corresponding to the child elements are not recorded but the hash information of the parent element thereof (<agreement information>) is recorded.

In the above description, a method of managing the insurance application form in the respective original document storage units (original document storage sections 42) in the course of the steps (1) to (5), a verification method performed in respective time points, and a third-party certification achieved by the verification have been shown. By performing, at each document creation/update time, the generation method of the partial identification information, original document management method, and verification method shown in steps (1) to (5), it is possible to easily realize the partial falsification detection function of the XML data having a complicated structure. Thus, the present system utilizing the partial falsification detection function of the XML data has a greater advantage than a system that manages all the child elements each update time irrespective of presence/absence of a change because it is possible to expect a significant reduction of verification cost and a reduction of amount of data to be transferred/stored.

Further, the system that manages all the child elements each update time irrespective of presence/absence of a change can only be utilized for verification between two versions. For example, in the case where the third version is presented for a third-party's certification, only a difference between the third version and the immediately previous version (second version) can be verified. Of course, it is possible to verify a change from the first version. In this case, however, partial identification information including all elements needs to be presented, increasing the amount of data to be transferred/stored and verification time.

On the other hand, a use of the partial falsification detection function of the XML data having a complicated hierarchical structure reduces the data amount of the partial identification information to be recorded/managed to a minimum level required for verification. That is, it becomes possible to distribute/verify a combination of respective versions of partial identification information (first version (original (or base)), second version, third version . . . N-th version) with a minimum amount of data to be transferred/stored. As a result, it is possible to perform, at each entity (site), historical management of correction events in all versions more simply and at lower cost.

Further, history trace/certification about "When, by whom, for which part, and how a correction has been made" can be achieved.

Although the partial identification information of respective versions are managed as individual files as shown in the example (FIG. 36) of a storage state of the insurance application form (third version), they may be coupled to each other and organized in one file. In this case, by carrying the verification data group among a plurality of entities, the history trace/certification can be performed more effectively at each entity.

Such partial identification information managed in a coupled manner requires assurance of time-variant in version numbers and needs to be capable of identifying creators (identification) for each version. An Xlink function may be used to realize the coupling-management method.

FIGS. 37 and 38 show a state where the respective documents are coupled together as one file. FIG. 37 shows a state where all the partial identification information required for verifying the second version have been coupled together, and FIG. 38 shows a state where all the partial identification information required for verifying the third version have been coupled together.

A digital signature of the creator is appended to each version of the partial identification information. A use of an XML partial digital signature or the like makes it possible to easily append the digital signature. In the present usage scene, a signature of the applicant (Hanako Suzuki) has been appended to the first version, a signature of the insurance company representative has been appended to the second version, and a signature of the financial institution representative has been appended to the third version. Therefore, identification and integrity of the data itself can be easily verified in the respective partial identification information.

It can be seen from a comparison between FIG. 37 and FIG. 38, simply by performing historical management in the form of the partial identification information, a partially corrected part and corrected content can independently be certificate in a third-party manner even if the main body of the insurance application form is overwritten. In other words, it can be said that the content of the partial identification information is a snapshot of each version. By carrying the verification data group having the form described above among a plurality of entities, it is possible to easily perform the historical trace/certification for each part of the document at each site while preventing leakage of information that has partially been hidden.

Described in the above usage scene is a method (hereinafter, referred to as "method 1") that records child elements and its parent element for a part that has been corrected from the previous version but records only a parent element for a part where all child elements located under the parent element have not been corrected.

In addition to the method 1, there is available a method that records child elements and its parent element only for a part that has been corrected from the previous version, that is, purely manages only a difference in order to reduce the amount of data to be transferred/stored more than the method 1. In the following, this method (referred to as "method 2") that manages only a difference will be described.

Figure 39:
FIG. 39 is a view showing an example in which the method 2 is used to represent the partial identification information (second version) using XML data.

According to the method 1, a management method of the partial identification information of the insurance application form—main body (second version) (FIG. 30) is represented as shown in FIG. 31. According to the method 2, the management method thereof is represented as shown in FIG. 39. FIG. 39 is a view showing an example in which the method 2 is used to represent the partial identification information (second version) using XML data.

In the method 2, as shown in FIG. 39, unchanged part (<contractor> and <designated account>), which has been recorded in the method 1, is not recorded. Thus, the amount of data to be transferred/stored can be reduced more than in the case of the method 1.

FIG. 40 shows an original document storage state at the creation time of the insurance application form (third version) in the method 2.

Next, cost evaluation/analysis is made for the amount of data to be transferred/stored and verification processing associated with the generation of the partial identification information with respect to the following three methods. A method 0 indicates a method that has been described in the usage scene in the first application field.

The method 0 (comparison target) records all the hash information irrespective of presence/absence of a change. The method 1 records child elements and its parent element for a part that has been corrected from the previous version but records only a parent element for a part where all child elements located under the parent element have not been corrected (this method has been adopted in the usage scene of the second application field). The method 2 records child elements and its parent element only for a part that has been corrected from the previous version, that is, purely manages only a difference.

Simple XML data as shown in FIG. 41 is used to perform analysis. FIG. 41 is a view showing an example of XML data for evaluation/analysis.

It is assumed, in the present evaluation/analysis, that only <kind of insurance> is subjected to correction at the update time to the second version. FIG. 42 shows a state where the content of <kind of insurance> is changed from "AAA" to "BBB". That is, FIG. 42 is a view showing the update of XML data for evaluation/analysis.

Figure 43:
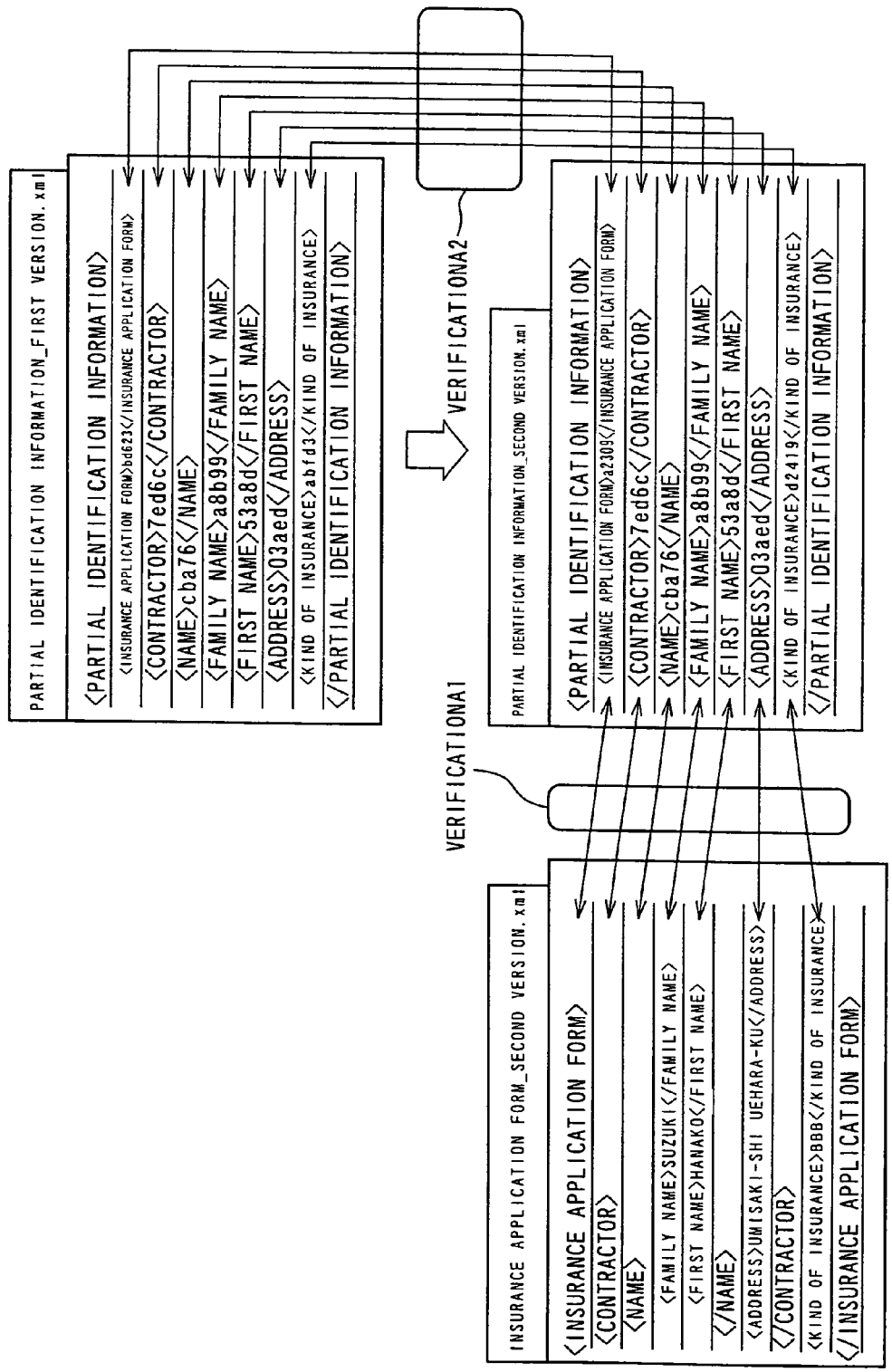
FIG. 43 is a view showing generation and verification of the partial identification information according to the method 0.

Firstly, the analysis is made for the amount of data to be transferred/stored and the number of verification operations with respect to the comparison target (method 0). FIG. 43 shows a data management method and verification processing in the method 0. That is, FIG. 43 is a view showing generation and verification of the partial identification information according to the method 0. In verification A1, the insurance application form (second version) and partial identification information (second version) are used to check whether the content of the insurance application form (second version) has been partly changed. To do this, the hash information are generated from respective elements in the insurance application form (second version) and compared with the has information of the corresponding elements recorded in the partial identification information (second version) to determine the identity between them.

In verification A2, a comparison between the partial identification information (second version) and its previous version (first version) of the partial identification information is made to identify a changed part and confirm that any other part than the changed part includes no change.

The amount of data to be transferred/stored and the number of verification operations in the method 0 are summarized as follows. The transfer/storage data of the partial identification information (second version) is 7 lines, in terms of the number of lines.

Since all the hash information corresponding to the changed and unchanged elements are recorded in the method 0, the data amount corresponding to 7 lines are recorded both in the first and second versions respectively. Note that an element <partial identification information>, which is a root element, is not counted in this example. As for the verification cost, 7 times of verification operations are performed in verification A1 and 7 times of verification operations are performed in verification A2, resulting in generation of cost corresponding to 14 times of verification operations.

Figure 44:
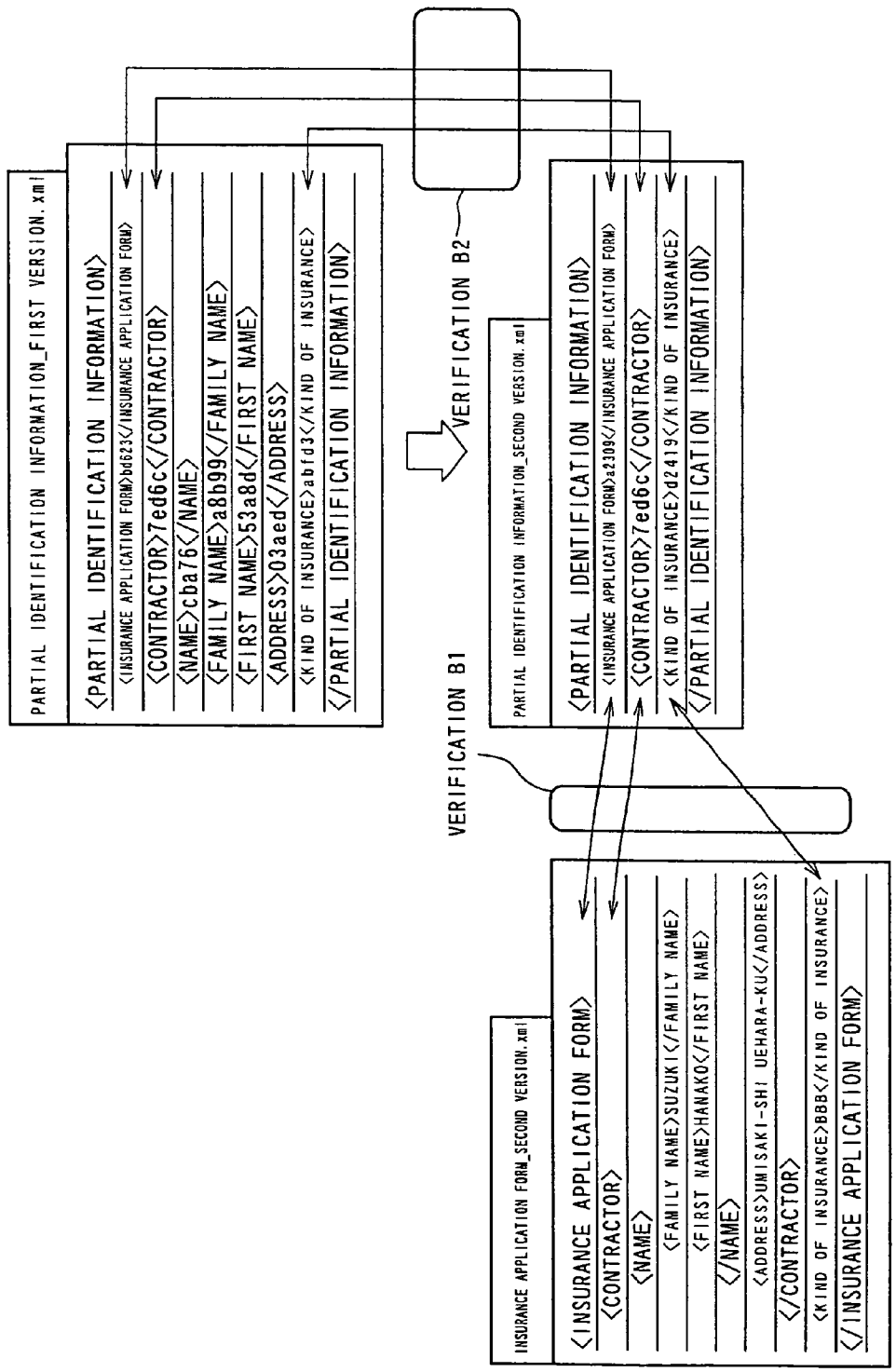
FIG. 44 is a view showing generation and verification of the partial identification information according to the method 1.

Secondly, the analysis is made for the amount of data to be transferred/stored and the number of verification operations with respect to the method 1. FIG. 44 shows a data management method and verification processing in the method 1. That is, FIG. 44 is a view showing generation and verification of the partial identification information according to the method 1.

The amount of data to be transferred/stored and the number of verification operations in the method 1 are summarized as follows. The transfer/storage data of the partial identification information (second version) is 3 lines. Since the method 1 records child elements and its parent element only for a part that has been corrected from the previous version but records only a parent element for a part where all child elements located under the parent element have not been corrected, the data amount of each of the first and second versions can be reduced as compared with that in the method 0.

As for the verification cost, 3 times of verification operations are performed in verification B1 and 3 times of verification operations are performed in verification B2, resulting in generation of cost corresponding to 6 times of verification operations. That is, one verification operation for <contractor> corresponds to verification operations for four elements (<name>, <family name>, <first name>, and <address>), so that the number of verification operations can be correspondingly reduced.

Figure 45:
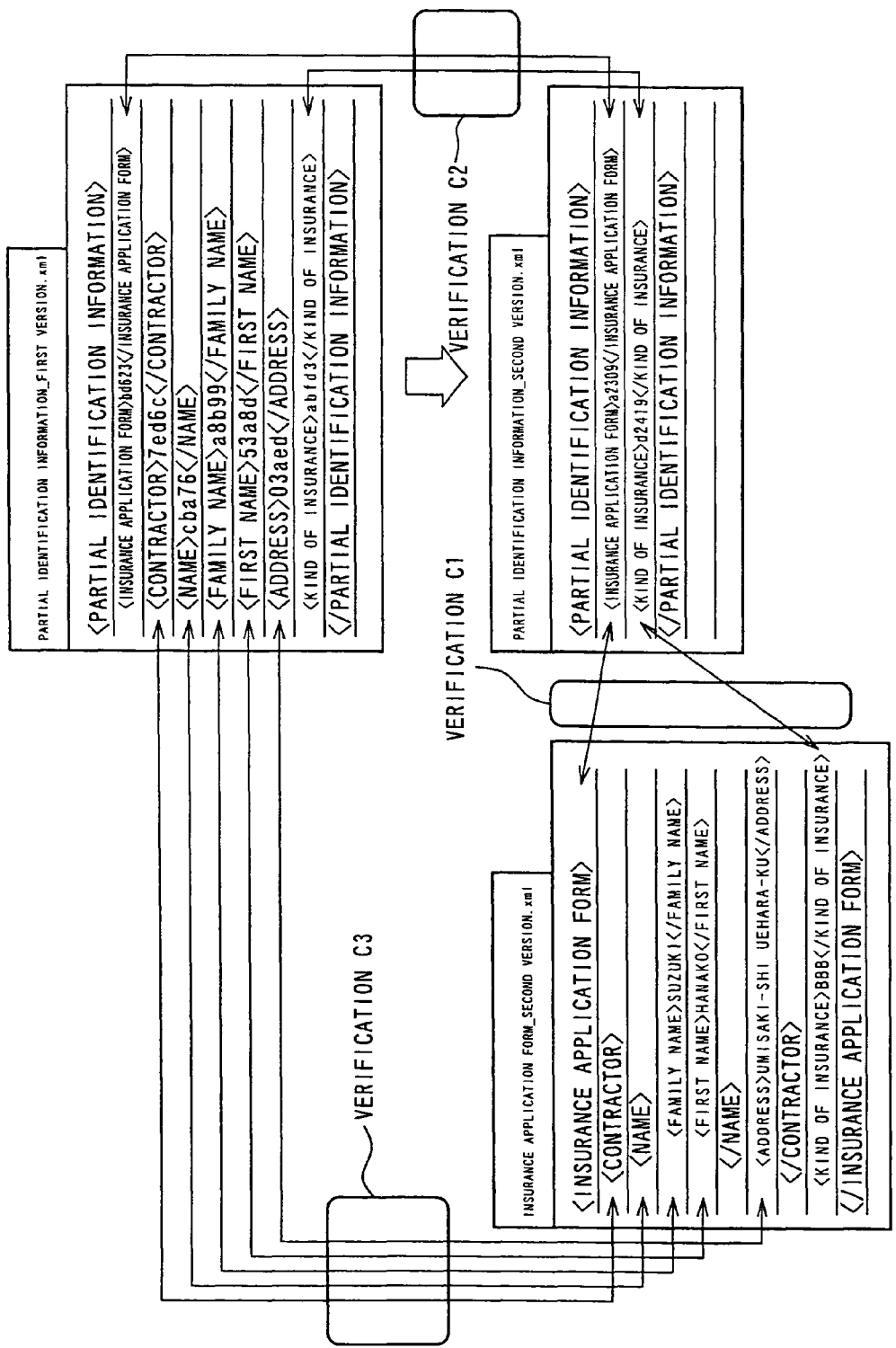
FIG. 45 is a view showing generation and verification of the partial identification information according to the method 2.

Thirdly, the analysis is made for the amount of data to be transferred/stored and the number of verification operations with respect to the method 2. FIG. 45 shows a data management method and verification processing in the method 2. That is, FIG. 45 is a view showing generation and verification of the partial identification information according to the method 2.

The amount of data to be transferred/stored and the number of verification operations in the method 2 are summarized as follows. The transfer/storage data of the partial identification information (second version) is 2 lines. Since the method 2 records child elements and its parent element only for a part that has been corrected from the previous version, the data amount of each of the first and second versions can be reduced as compared with that in the method 0, as in the case of the method 1.

As for the verification cost, 2 times of verification operations are performed in verification C1 and 2 times of verification operations are performed in verification C2, resulting in generation of cost corresponding to 4 times of verification operations.

The method 2 cannot verify that <contractor>, <name>, <family name>, <first name>, and <address> which correspond to an unchanged part have not been changed from the previous version, since, in verification C1, the insurance application form (second version) and partial identification information (second version) are used to check the content of the insurance application form (second version) itself and check whether there is any replacement of the content. That is, the method 2 places utmost priority on the transfer/storage data amount and therefore does not have information for verifying that point.

Accordingly, it is necessary to generate the hash information of the relevant elements based on the insurance application form (second version) and compares the hash information thereof with those of the corresponding elements in the previous version (first version) of the partial identification information. This verification is performed as verification C3 in FIG. 45. In this step, cost corresponding to 5 times of verification operations is generated. In total, cost corresponding to 9 times (=2 (C1)+2 (C2)+5 (C3)) of verification operations is generated.

Figures 46, 47:
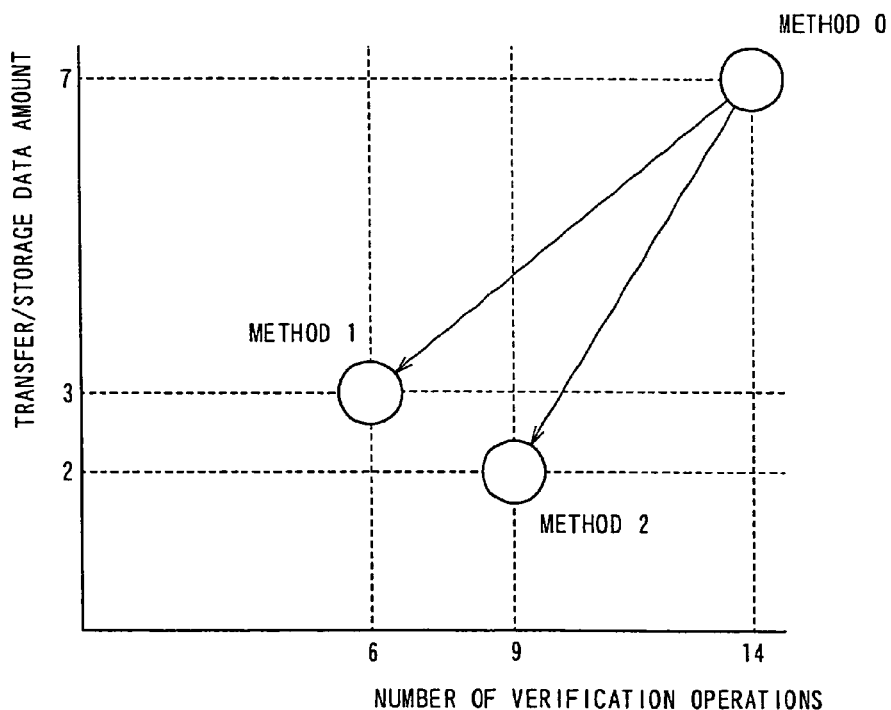
FIG. 46 shows a result of method-based analysis.
FIG. 47 shows a bubble chart representing the result of the method-based analysis.

A comparison between methods 1 and 2 is made with respect to the analysis result obtained in the method 0. FIG. 46 shows a result of the method-based analysis. It can be seen from the analysis result that both the transfer/storage data amount and the number of verification operations are reduced in the methods 1 and 2 respectively as compared with the case of the method 0. Therefore, it can be said that it is preferable to use the method 1 or method 2 for generation/management of the partial identification information. Further, it can be seen from a comparison between methods 1 and 2 that although the method 2 needs less transfer/storage data amount than the method 1, it needs much time for verification processing, and that the method 1 realizes cost reduction of the transfer/storage data amount and the number of verification operations in a balanced manner.

The above result reveals not the order of superiority between the methods 1 and 2, but that it is necessary to select a suitable method depending on the degree of the hierarchical structure of the document.

FIG. 47 shows a bubble chart representing the result of the method-based analysis.

As described above, according to the underlying technique of the present invention, it is possible to satisfy the following requirements which cannot be met by conventional techniques and a plain combination thereof. (1) Capable of identify a corrected part in the digital document as well as confirming that any other part than the corrected part includes no change. (2) Capable of assuring (third-party certification) the integrity and authenticity of the digital document at each time point in the case where a corrected digital document is distributed between a plurality of entities and a correction/addition is made for the digital document at the respective entities. (3) Capable of performing a third-party certification and distribution using a digital document that has been subjected to sanitizing or using only some versions even though all the versions of the digital document stored/managed in the present system are not taken out.

While the underlying technique of the present invention has been described with respect to management of the original document information of document such as the agreement document, the present underlying technique can widely be applied to legal certification, verification, and the like of the history of the document. Further, while the same policy information is used in the verification for registration and verification for correction, it goes without saying that different policy information may be used for the respective verification processing.

(Summary of Underlying Technique)

In an embodiment of the present invention, a modified technique for further reducing the storage data amount relative to the techniques that have been described in the underlying techniques 1 and 2 will be described. For convenience of that description, the underlying techniques 1 and 2 are summarized below. Note that, in the following description, a sanitizing signature technique in the underlying technique and the embodiment of the present invention is referred to as PIAT signature technique.

In the process of the PIAT signature, three entities: a signer, a sanitizer, and verifier appear. The signer generates a signature to be appended to an original document. The sanitizer defines a document including a nondisclosure part based on the original (or sanitized) document to create a sanitized document. The verifier performs signature verification to confirm the integrity of a disclosure part.

In the underlying technique 1, a document is divided into blocks, and the hash function is used to extract characteristic information from each block. The information obtained by collecting the characteristic information is referred to as partial identification information. A digital signature is appended to the partial identification information. The obtained partial identification information is defined as the first version.

In information addition/correction/deletion (sanitizing) for the first version, after completion of the information addition/correction/deletion (sanitizing), corresponding partial identification information and a digital signature to be appended thereto are generated as is the case with processing at the signature creation time. Further, information indicating by whom and for which part the change has been made is stored as the partial identification information. The obtained partial identification information is defined as the second version.

In the PIAT signature confirmation process, the partial identification information (first version), main document (second version), partial identification information (second version), and partial correction information (second version) are used to perform verification. A comparison between the partial identification information (first version) and partial identification information (second version) makes it possible to identify a changed part between them. Further, based on the digital signature appended to the partial identification information, the integrity of the partial identification information can be verified, as well as identification of the person who creates/changes the partial identification information can be assured. In addition, the integrity of the document can be verified/assured based on the document and partial identification information.

The underlying technique 2 is a modification of the underlying technique 1. In the underlying technique 1, since the hash value of all the blocks needs to be retained as the partial identification information in each version, the information amount of the partial identification information becomes enormous. In the underlying technique 2, only a changed part is stored for the second version and subsequent versions of partial identification information to thereby reduce the information amount of the partial identification information. Further, in the case where a structured document such as XML structured-document is used, there is proposed a method for effectively store a changed part with attention being focused on its structure.

It is assumed in the above underlying techniques that a document to which a signature is appended is data messages (M1, . . . Mn) each including n partial document. Further, it is assumed that a random number is generated an appropriate (pseudo) random number generator and that a function H ( ) is a safe arbitrary hash function. Furthermore, it is assumed that a function Sign$_{sk}$( ) is a safe (i.e., existentially unforgettable against adaptive chosen message attacks) arbitrary signature generation function of a signature system.

The overview of the PIAT signature processing in the underlying technique 1 is shown below (Algorithm 1). It is assumed that the number of sanitizers is m. The sanitizer in the PIAT signature generates/outputs signature σ(0) for a set (the set is referred to as partial identification information) h(0) of hash values of the respective partial document appended by the random number. A first sanitizer which has received an original document and a pair of partial identification information and signature retains the content of a partial document to be disclosed without change and, at the same time, substitutes a random number corresponding to the undisclosed partial document with an adequate data message (e.g., M="XXXX") and a new random number to obtain a new hash value.

New partial identification information h(1) and signature σ(1) of the sanitizer are generated in this manner, and a sanitized document after being changed and two partial identification information/signature pairs (h(0), σ(0)), (h(1), σ(1)) are output. The sanitizer can identify the partial document that has been sanitized by comparing the above partial identification information constituting each pair.

Figure 48:
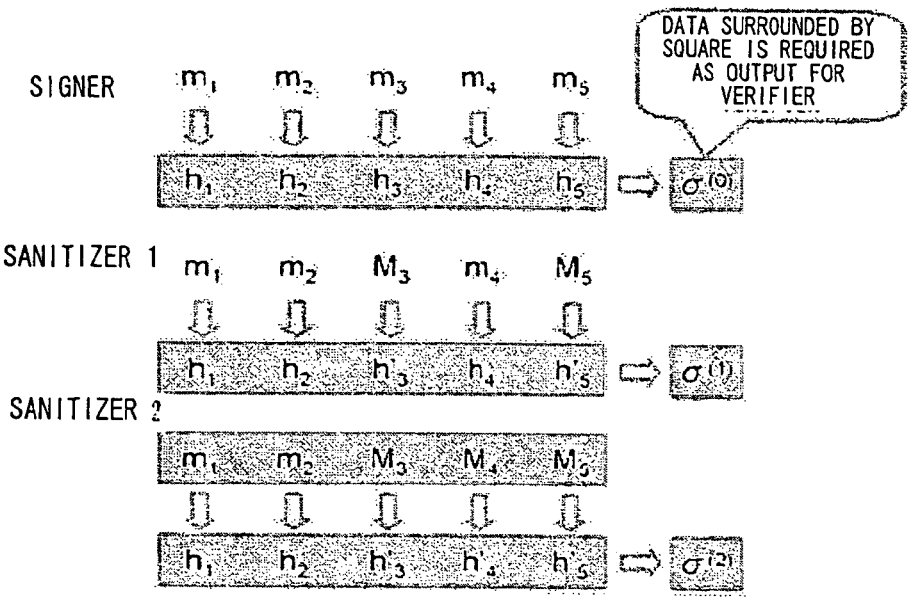
FIG. 48 is a view showing the overview of the processing of the underlying technique 1.

Similarly, j-th (j=1, . . . m) sanitizer receives, as input information, the sanitized document output from the (j—1)-th sanitizer and j partial identification information/signature pairs (h(0), σ(0), . . . , (h(j−1), σ(j−1)). In this case, the j-th sanitizer can identify the sanitized partial document by comparing the partial identification information h(0) and h(j−1). Subsequently, new partial identification information and signature (h(j), σ(j) are generated, and a sanitized document after being changed and (j+1) partial identification information/signature pairs (h(0), σ(0)), . . . , (h(j−1), σ(j−1)), (h(j), σ(j)) are output (FIG. 48).

The verifier receives the sanitized document [M(m)] and (m+1) partial identification information/signature pairs (h(0), σ(0)), . . . , (h(m), σ(m)) output from the last (m-th) sanitizer. The verifier verifies the sanitized document and respective signatures to confirm the integrity of the sanitized document and partial identification information. Then the verifier compares the partial identification information h(0) and h(m) to identify the sanitized partial document and, after that, calculates a value j that satisfies hi(0)= . . . =hi(j−1)≠hi(j)= . . . =hi(m) for the sanitized partial document. When the value j can be obtained, it is possible to identify that the partial document has been sanitized by j-th sanitizer. When the value j cannot be obtained, it is possible to identify that an illegal sanitizing has been made as well as by whom the illegal sanitizing has been made.

(Algorithm 1)

(Signature by Signer)

(S1) Original documents (agreement document) (M1, . . . , Mn) are input.

(S2) Randomly generates identifiers ri corresponding to respective partial document Mi (i=1, . . . , n) to satisfy [Mi] (0)←ri∥Mi; and calculates hash value hi(0)←H([Mi](0)).

(S3) Generates signature σ(0)←Sign$_{sk0}$(h(0)) (sk0 is private key of signer), where h(0)=h1(0)∥ . . . ∥hn(0).

(S4) Outputs document ([M1](0), . . . , [Mn](0)), partial identification information/signature pair (h(0), σ(0)).

(Sanitizing by j-th Sanitizer)

(S1) Receives document ([M1](j−1), . . . , [Mn](j−1)) and j partial identification information/signature pairs (h(0), σ(0)), . . . , (h(j−1), σ(j−1)).

(S2) Compares two partial identification information h(0) and h(j−1) to obtain index set C (={i|hi(0)≠hi(j−1)}) of sanitized partial document.

(S3) Defines partial document to be sanitized (to be undisclosed) to obtain index set C′⊃C.

(S4) Generates new partial document from respective partial documents [Mi](j−1) (i=1, . . . , n).

$$[Mi](j) = r\|M \text{ if } i \in C'/C$$
$$= [Mi](j-1) \text{ otherwise}$$

where, r is random number, and M is adequate data massage.

(S5) Calculates hash value hi(j)←H([Mi](j)) from obtained partial document.

(S6) Generates signature σ(j)←Sign$_{skj}$(h(j)), where skj is private key of j-th sanitizer, and h(j)=h1(j)∥ . . . hn(j).

(S7) Outputs document ([M1](j), . . . , [Mn](j)) and j+1 partial identification information/signature pairs (h(0), σ(0), . . . , (h(j), σ(j))).

(Verifier)

(S1) Receives document ([M1](m), . . . , [Mn](m)), m+1 partial identification information/signature pairs (h(0), σ(0)), . . . , (h(m), σ(m)), and public keys pkj (j=0, . . . , m) of signer/sanitizer.

(S2: Confirmation of sanitized document) Calculates hash values hi of respective partial document [Mi](m)(i=1, . . . , n); and outputs invalid if h1∥ . . . ∥hn is not equal to h(m) to end verification.

(S3: Verification of signature) Uses public key pkj and partial identification information h(j) for respective j (j= 0, . . . , m) to verify signature σ(j); and outputs invalid if verification fails to end verification.

(S4: Identification of sanitized part) Compares two partial identification information h(0) and h(m) to obtain index set C=[i|hi(0)≠hi(m)] of sanitized partial document.

(S5: Verification of sanitizer) Uses m+1 partial identification information h(0), . . . , h(m) to identify sanitizer of i-th (i∈C) sanitized partial document; determines that j-th sanitizer has sanitized above partial document when hi(0)= . . . =hi(j−1)≠hi(j)= . . . =hi(m) is satisfied; and outputs valid when sanitizers corresponding to all Iγ⊂C can be identified and otherwise outputs invalid to end verification.

In (algorithm 1) of the PIAT signature in the underlying technique 1, m+1 partial identification information/signature pairs and, in particular, (m+1)n hash values (or mn hash values, in the case where the partial identification information of the last sanitizer is deleted) are required in addition to a sanitized document in order to perform verification.

Figure 49:
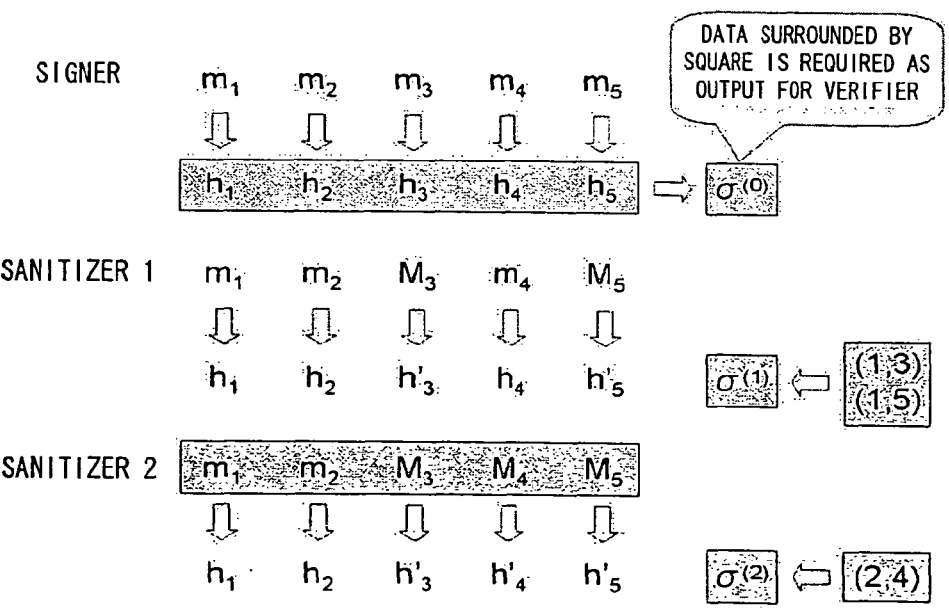
FIG. 49 is a view showing the overview of the processing of the underlying technique 2.

However, since most of the m+1 hash values hi(0), . . . , hi(m) corresponding to i-th partial document have the same value (hi(0)= . . . =hi(m) is satisfied in the case where the partial document is disclosed; and hi(0)= . . . =hi(j−1)≠ hi(j)= . . . hi(m) is satisfied in the case where it is undisclosed), it is inefficient to retain all the hash values. In order to cope with this, the underlying technique proposes a modified method that outputs all partial identification information corresponding to original documents created by a singer but outputs only correction (sanitizing) information (i, j) of a corrected part when a correction (sanitizing) has been made. The sanitizing information (i, j) indicates that i-th partial document has been sanitized by j-th sanitizer (FIG. 49).

When the sanitizer makes a correction, a sanitized document after being changed, sanitizing information, and a signature to be appended to the sanitizing information are output. The verifier can constitute information equivalent to that obtained in the underlying technique 1 based on these information, the same processing as conventionally performed is effective. Such a modification allows the number of hash values required for the verifier to be reduced to n (however, the number of signatures required is not changed). The underlying technique 1 performs version-management of a difference with the first version set as a base point, so that it is called, as a matter of convenience, SCCS (Source Code Control System) named after a source code management tool that performs the similar version-management of a difference.

EMBODIMENT

In the present embodiment, a method which is a modification of the underlying technique 2 and which significantly reduces the information amount of partial identification information to be retained will be described. That is, although the underlying technique 2 manages a difference between a plurality of versions of partial identification information to thereby reduce the amount of information to be stored, this management technique produces improvement on the reduction of the information amount of the second version and subsequent versions of the partial identification information. In other words, it has not yet been possible to reduce the information amount of the first version of the partial identification information. Further, a signature needs to be appended to each version of the partial identification information and, accordingly, it is necessary to store the digital signature having information amount corresponding to the number of versions. Therefore, an object of the present embodiment is to reduce the information amount of the partial identification information and digital signature as much as possible.

The underlying technique 1 stores partial identification information (first version) and uses a difference caused in the first version to create partial identification information (second version) (forward difference). On the other hand, the present embodiment uses a backward difference approach where version-management of a difference is performed with the latest version set as a base point. Basically, there is no difference in the information amount between the forward difference approach and backward difference approach. However, in PIAT signature, the latest partial identification information can be generated from a main body to be disclosed, eliminating the need to store the latest version of partial identification information.

A use of the above feature eliminates the need to store partial identification information serving as a base of a forward difference approach (i.e., first version of partial identification information), allowing significant reduction of storage information amount.

Further, while a digital signature needs to be appended to respective versions of partial identification information (or a difference between them), the present embodiment will also refer to a case where an Aggregate signature scheme is applied to the digital signature system.

First Embodiment

In the first embodiment, a difference management system that manages a difference with the latest version set as a base point is used in place of the underlying technique 2 (SCCS type difference management system) for the purpose of reducing the information amount of partial identification information under the use of PIAT signature. This system is referred to as RCS (Revision Control system) type (modification 1) named after a source code management tool that implements the similar version-management of a difference.

Figure 50:
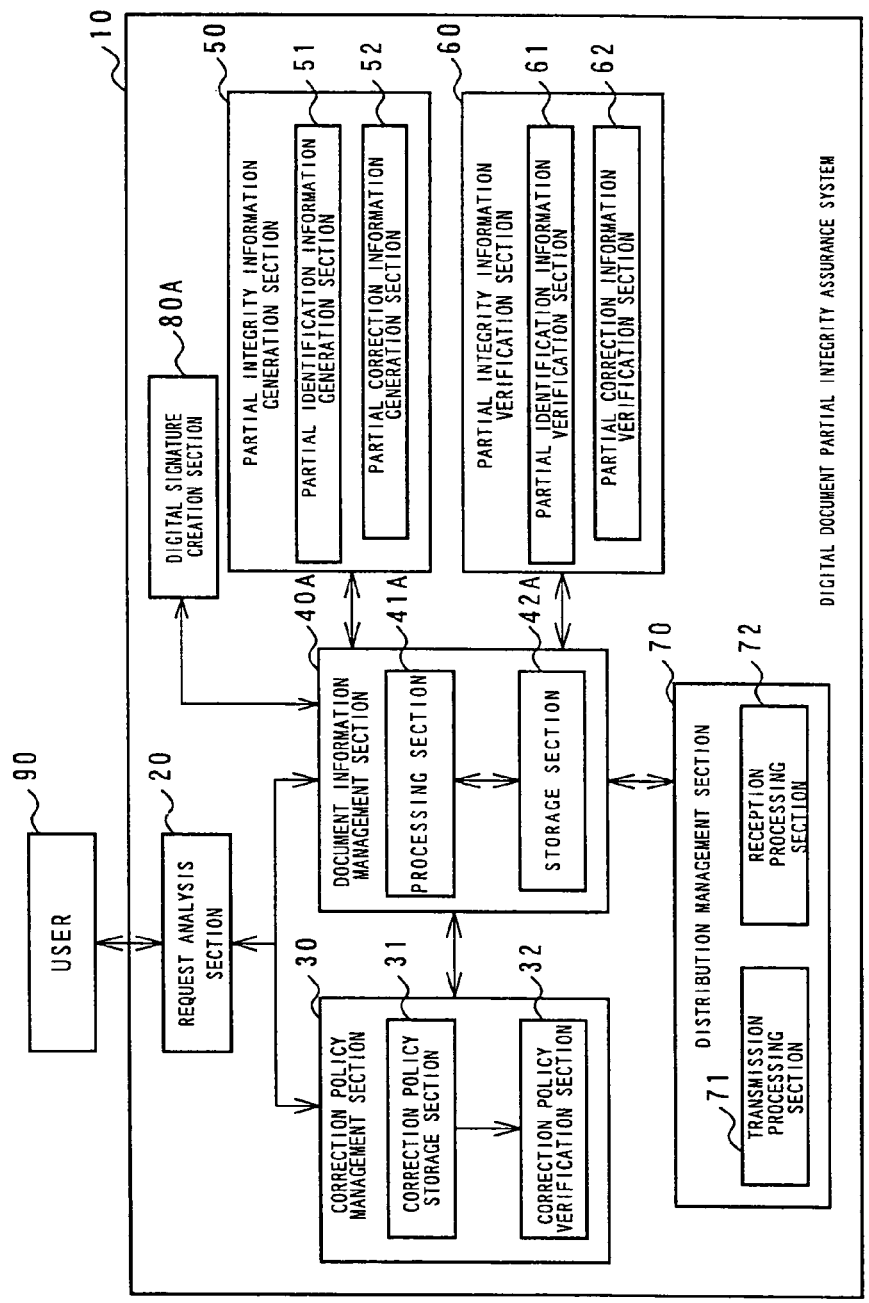
FIG. 50 is a block diagram showing a configuration of an embodiment of the present invention.

FIG. 50 shows a configuration of the first embodiment. A digital signature creation section 80A is newly added to the configuration used in the underlying technique 1. Further, the original document management section 40, original document processing section 41, and original document storage section 42 are replaced by a document information management section 40A, processing section 41A, and storage section 42A respectively. In the following, operation of the first embodiment will be described.

(Operation of Signature Processing)

Figure 51:
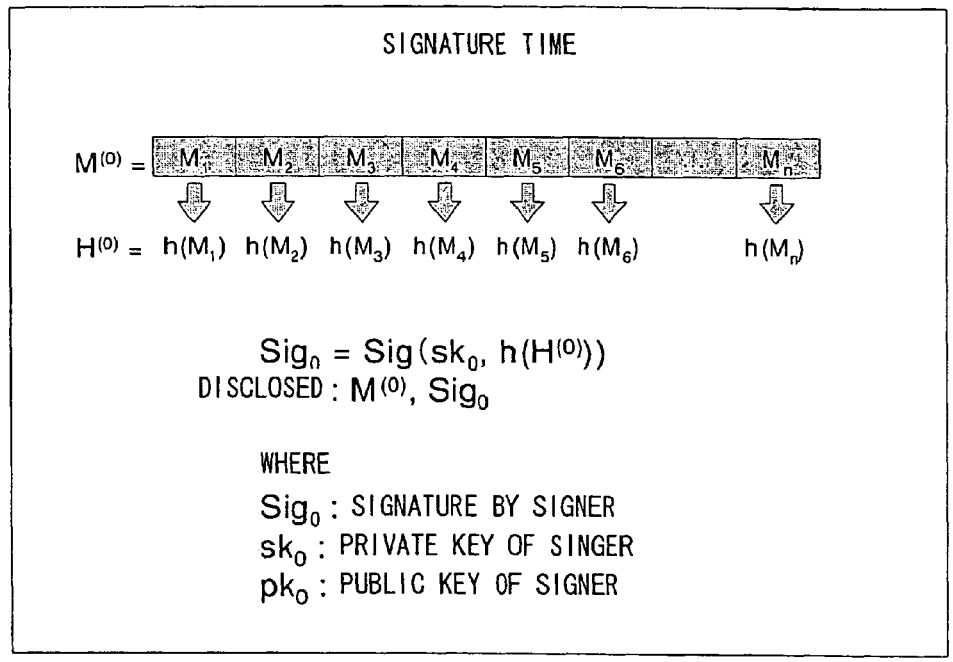
FIG. 51 is a view showing operation performed at the signature time in the first embodiment.

FIG. 51 shows operation of signature processing.

(S1) The partial identification information generation section 51 divides a message (agreement document) M (0) input by a signer into M1 to Mn.

(S2) The partial identification information generation section 51 calculates the hashes of respective blocks to generate hash values (for example, generates h(Mi) for i-th block) to obtain hash value set H(0)

(S3) At the time when a signer performs a signature process, the digital signature creation section 80A uses a signature function in which the hash value set H(0) and the private key of the signer are set as parameters to create a digital signature.

The signature created is, for example, $Sig_0=Sig(sk0, h(H(0)))$. This signifies that the hash value set is hushed once again, and the private key sk0 of the signer is used to append a signature to the resultant hush value set according to signature function Sig( ).

(S4) The document information management section 40A discloses the message M(0) and signature Sig0 to a sanitizer according to an instruction of the signer.

Note that while the hush value set is hashed once again in the case where a signature function is used in (S3), this is just an example, and it goes without saying that various processing methods may be adopted depending on the type of signature functions.

(Operation of Sanitizing Processing (1))

Figure 52:
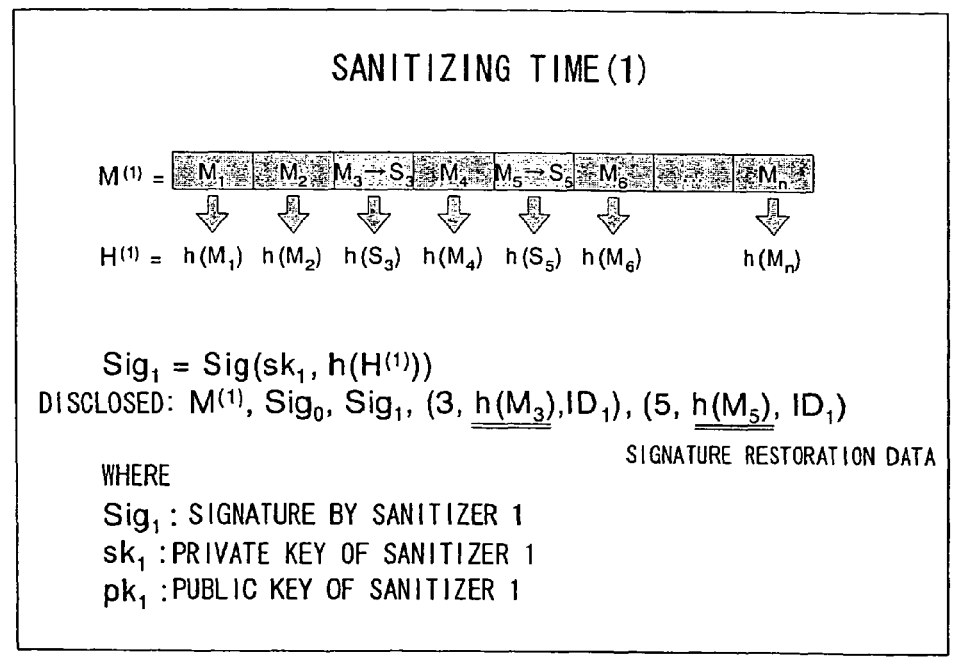
FIG. 52 is a view showing operation performed at the first sanitizing time in the first embodiment.

FIG. 52 is a view showing operation of the first sanitizing processing (1) applied to an original. The first sanitizing (change processing) processing is as follows.

(S1) The processing section 41A substitutes a message to be undisclosed (changed) with a new message according to an instruction of a sanitizer 1. In FIG. 52, messages of blocks 3 and 5 are changed from M3, M5 to S3, S5 respectively. S3 and S5 may be random information or distinct character such as XXXXXXXX that can be recognized as sanitized one on sight. In the case of a change, S3 and S5 are set as information after change. A set of the data after change is referred to as M(1).

(S2) The partial identification information generation section 51 calculates the hush values (h(M3), h(M5)) of the message blocks (M3 and M5) before change separately according to an instruction of the sanitizer 1. These hush values are called signature restoration data. As is the case with the signature processing, the hush values are calculated for respective blocks of M(1) to obtain hash value set H(1).

(S3) The digital signature creation section 80A uses the private key of the sanitizer 1 to append a signature to the hush value set H(1) according to an instruction of the sanitizer 1. The signature created is, for example, $Sig_1=Sig(sk_1, h(H(1)))$. This signifies that the hash value set is hushed once again, and the private key $sk_1$ of the sanitizer 1 is used to append a signature to the resultant hush value set according to signature function Sig( ).

(S4) The document information management section 40A discloses the message M(1) and signature $Sig_1$ as well as the signature Sig( ) of the signer and signature restoration data to a subsequent sanitizer according to an instruction of the sanitizer 1. While the signature restoration data discloses the ID (which identifies that the sanitizer is the first sanitizer) of the sanitizer 1 and block number of the message corresponding to the signature restoration data together, any format may be used to disclose the signature restoration data as far as it indicates the creator of the signature restoration data (i.e., sanitizer 1) and the block number of the signature restoration data.

(Operation of Sanitizing Processing (2))

Figure 53:
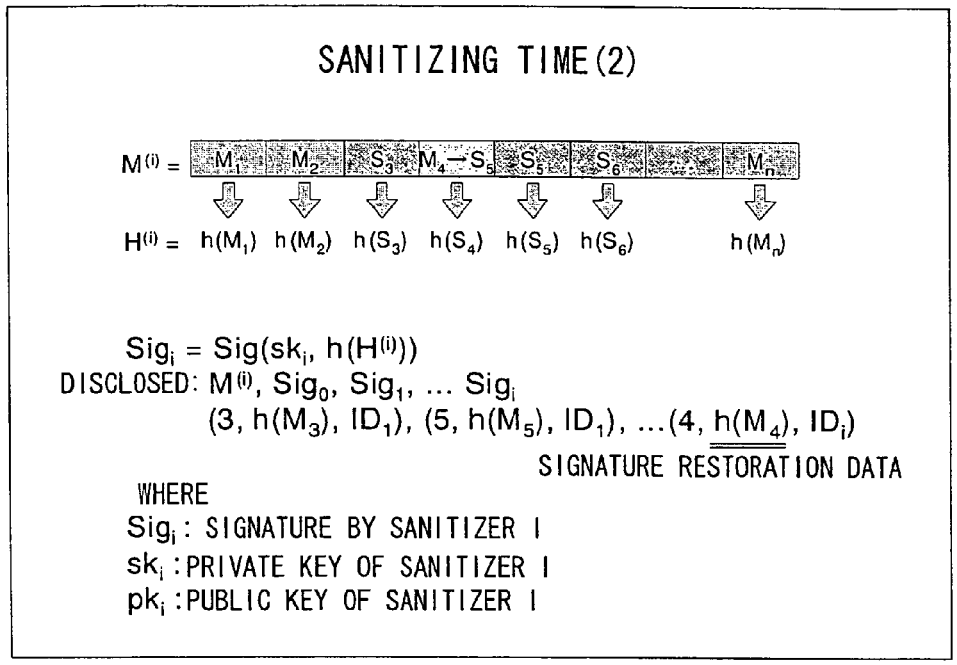
FIG. 53 is a view showing operation performed at the second and subsequent sanitizing time in the first embodiment.

FIG. 53 is a view showing operation of the second and subsequent (i-th (i≧2)) sanitizing processing (2). The i-th sanitizing (change processing) processing is as follows.

(S1) The document information management section 40A substitutes a message to be undisclosed (changed) with a new message according to an instruction of a sanitizer i. In FIG. 53, a message of block 4 is changed from M4 to S4. S4 may be random information or information such as XXXXXXXX that can be recognized as sanitized one at first sight. In the case of a change, S4 is set as information after change. It is possible for the sanitizer i to apply a change once again to the part that has been changed by the previous sanitizer (changer). A set of the data after change is referred to as M(i).

(S2) The partial identification information generation section 51 calculates the hush value (h(M4)) of the message block (M4) before change separately according to an instruction of the sanitizer. The hush value is called signature restoration data.

(S3) As is the case with the signature processing, the hush values are calculated for respective blocks of M(i) to obtain hash value set H(i).

(S4) The digital signature creation section 80A uses the private key of the sanitizer i to create a digital signature for the hush value set H(i) according to an instruction of the sanitizer i. The signature created is, for example, $Sig_i=Sig(sk_i,h(H(i)))$. This signifies that the hash value set is hushed once again, and the private key $sk_i$ of the sanitizer i to append a signature to the resultant hush value set according to signature function Sig( ).

(S5) The document information management section 40A discloses the message M(i) and signature $Sig_i$ as well as the signatures $Sig_0$ and $Sig_1$ to $Sig_i$ of the signer and sanitizers 1 to i and signature restoration data ((3, h(M3), ID1), (5, h(M5), ID1), . . . (4, h(M4), IDi)) of the sanitizer 1 to i to a subsequent sanitizer (or verifier) according to an instruction of the sanitizer i.

(Operation of Signature Confirmation (Verification) Processing)

Figure 54:
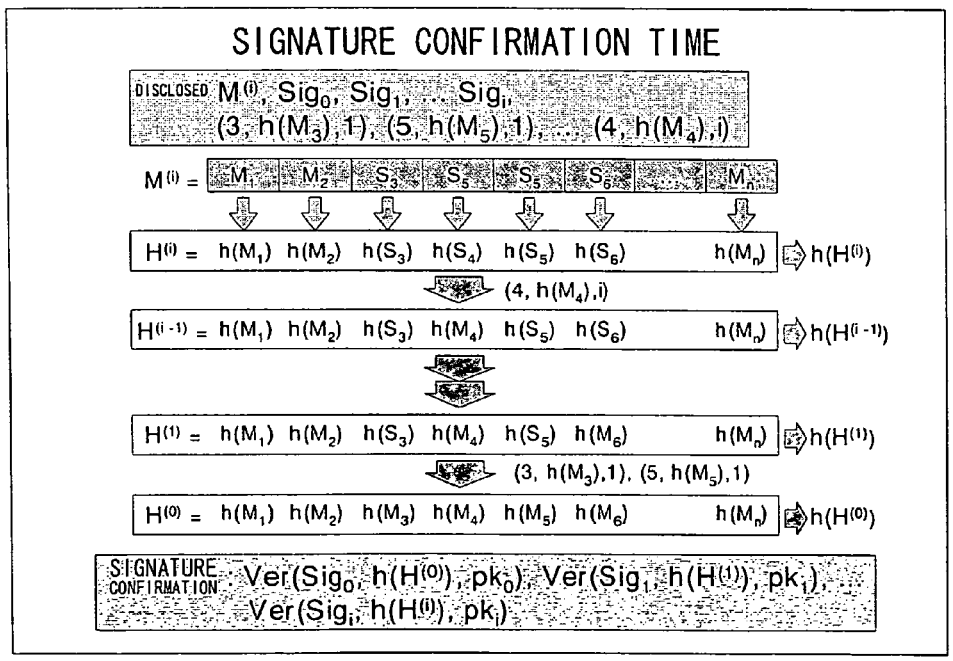
FIG. 54 is a view showing operation performed at the signature verification time in the first embodiment.

FIG. 54 is a view showing operation of the signature confirmation (verification) processing.

(S1) The partial identification information verification section 61 restores the hash value set H(0) of the signer and the hash value sets H(1) to H(i) of the sanitizers 1 to i from the message M(i) and signature restoration data according to an instruction of a verifier.

(S2) The partial identification information verification section 61 uses the signature $Sig_0$ and hush value set H(0) of the signer to perform signature verification. After that, the partial identification information verification section 61 uses the signatures $Sig_1$ to $Sig_i$ and hash value sets H(1) to H(i) of the sanitizer 1 to i to perform signature verification.

(S3) When the above signature verification operations have been performed without problems, the signature confirmation of the message M(i) ends.

The above processing certifies that a part having no signature restoration data is an original document that has been created and signed by the singer, and that a part having signature restoration data is a part that has been sanitized or changed by the creator of the signature restoration data.

In the first embodiment, while a differential information management is performed with the latest partial identification information set as a base point, the same function as that of the underlying technique 2 (SCCS type) can be realized. Further, a use of a feature capable of creating the latest partial identification information from the latest version of the main body document eliminates the need to retain the partial identification information serving as a base point.

According to the first embodiment, the basic function (assurance of the secrecy of the nondisclosure portion and integrity of the disclosure portion) of the PIAT signature in the underlying technique 2 is kept retained. However, only the identification of the illegal sanitizing is made disabled. This occurs because the differential information management of the first embodiment does not retain partial identification information corresponding to the original (original document). That is, in the case where the hash value hj corresponding to a partial document before sanitizing is falsified in sanitizing information (i, j, hj) (indicating that i-th partial document is sanitized by j-th sanitizer and the hash value of a partial document before sanitizing is hj), it is not possible to detect this falsification due to absence of the partial identification information corresponding to the original. Functions other than this point are the same as those of the underlying technique 2.

The aforementioned operation will be described in line with the usage scene of the first phase in the underlying technique 1.

(Creation Time of New Document)

(A) Creation Time of New Agreement Document

The processing at the time of creation of a new agreement document is almost the same as that described in the first phase shown in FIG. 6. Only a different point is that, in the registration/storage step (ST_R7), only an agreement document appended by a signature of "Hanako Suzuki" and a signature of "Hanako Suzuki" appended to partial identification information are stored. In this case, the partial identification information itself is not stored but discarded.

This is because that only with the agreement document, corresponding partial identification information can be restored, and that only with the signature of "Hanako Suzuki" appended to the partial identification information corresponding the agreement document, the integrity of the partial identification information restored from the agreement document can be assured.

(Correction Time)

(B) Correction Time of Agreement Document

A different point from the processing at correction time of an agreement document (FIG. 10) is that when "Hanako Suzuki" selects an agreement document to be changed, partial identification document corresponding to the selected agreement document is restored in ST_U2. Subsequent processing is almost the same as that performed in the usage scene 1. At the storage time in the original document storage section (ST_U12), a difference between the restored partial identification information (first version) and generated partial identification information (second version) serving as a base point is taken, and the difference information is stored as partial identification information difference (first version). Further, as is the case with processing at creation time of a new agreement document, an agreement document (second version) appended by a signature of "Hanako Suzuki" and a signature of "Hanako Suzuki" appended to partial identification information (second version) are stored. Also in this case, the partial identification information (second version) itself is not stored but discarded (while the partial identification information is not stored, it is necessary to create and store information called "partial identification information difference" at creation time of the subsequent version).

(Verification Time)

(C) Verification Time of Integrity/Validity for Corrected Agreement Document

The processing performed at verification time of the integrity/validity for a corrected agreement document is almost the same as that performed in the underlying technique 1. Only a different point is that restoration operation is newly added since partial identification information is not stored. In ST_V6, a corrected agreement document (second version) is taken, and partial identification information (second version) is restored from the corrected agreement document (second version) by the partial identification information generation section. Then, "partial identification information difference" (first version) is taken from the original document storage section, and partial identification information (first version) is generated from the restored partial identification information (second version) and taken "partial identification information difference".

As a result, all the information required for verification of the integrity/validity made in the first phase: the corrected agreement document (original document) (second version) and its corresponding signature of "Hanako Suzuki"; partial identification information (second version) and its corresponding signature of "Hanako Suzuki"; and partial identification information (first version) and its corresponding signature of "Hanako Suzuki" have been prepared. Subsequently, with the same processing as that performed in the first phase, verification of the integrity/validity for the corrected agreement document is completed.

In the second phase, by not storing the partial identification information but instead storing "partial identification information difference" as described above and by restoring all partial identification information from the "partial identification information difference" as needed, the same processing as that according to the basic method can be employed.

(Sanitizing Time)

(B) Registration Data Correction Function (Used at the Time When Sanitizing is Partially Applied to an Agreement Document)

As is the case with the second phase of the underlying technique 1, it is only necessary for "Taro Sato" to perform (append a signature of himself) the same processing as that described in "(B) Correction time of agreement document" and the description thereof is omitted.

(Transmission Time)

(D) Registration Data Distribution (Transmission) Function (Used at the Transmission Time of an Agreement Document)

The processing to be performed here is almost the same as that according to the basic method except for the data to be transmitted. In the underlying technique 1, an agreement document (third version) (agreement document sanitized by "Taro Sato"), partial identification information (first to third versions, or only second and third versions), partial correction information (third version), and policy information are transmitted. On the other hand, in the first embodiment, an agreement document (third version) (agreement document sanitized by "Taro Sato"), partial identification information difference (first to third versions, or only second and third versions), partial correction information (third version), and policy information are transmitted. That is, the basic method transmits the partial identification information itself; whereas the present method transmits the partial identification information difference.

(Reception Time)

(E) Registration Data Distribution (Reception) Function (Used at the Reception Time of an Agreement Document)

The processing to be performed here is entirely the same as that according to the basic method. The present method (C) is utilized as the verification process.

(Output Time of Third-Party Verification)

(F) Verification Data Acquisition Function (Used When an Agreement Document is Exhibited as Evidence in a Court Case)

The processing to be performed here is entirely the same as that according to the basic method. As is the case with (D), the basic method transmits the partial identification information itself; whereas the present method transmits the partial identification information difference.

Figure 55:
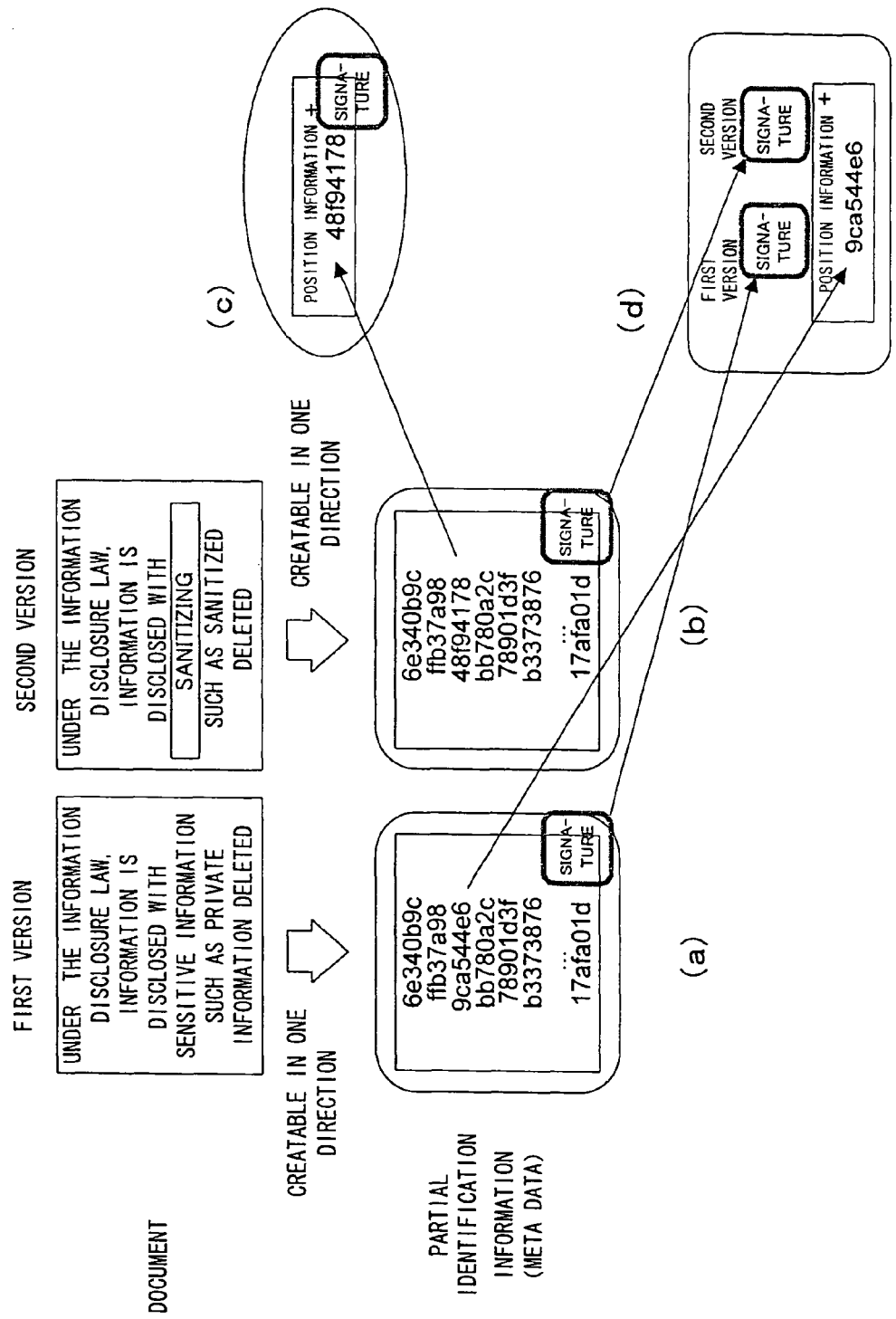
FIG. 55 is a view schematically showing effects of the first embodiment in comparison with the underlying technique.
Figure 56:
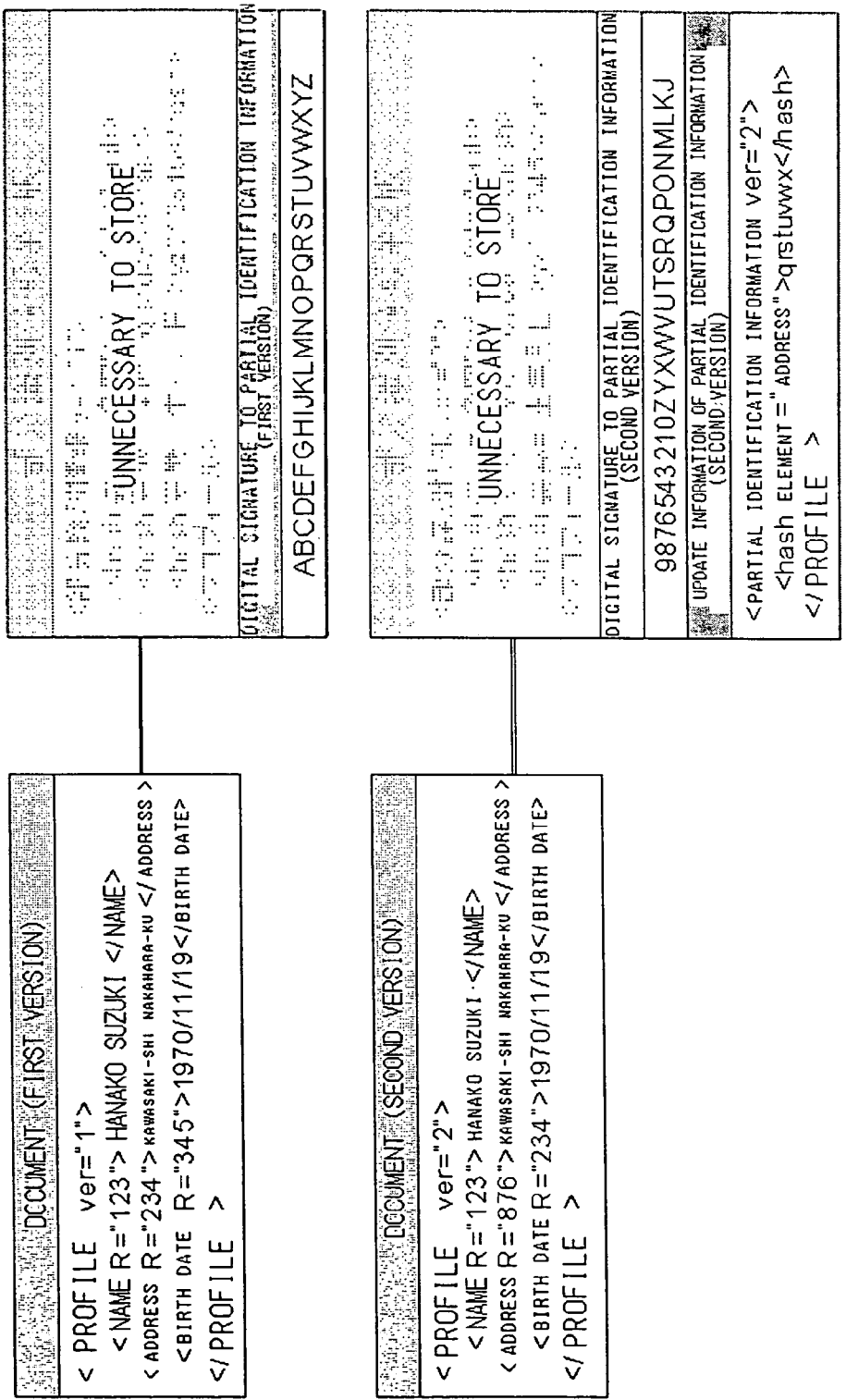
FIG. 56 is a view showing the overview of the operation performed in the first embodiment.

As described above, the underlying technique 1 manages all the partial identification information (a) of an original document and all the partial identification information (b) after correction, as shown in FIG. 55; whereas the first embodiment manages only the partial identification information difference shown in (d) of FIG. 55. The underlying technique 2 uses a hierarchical structure of a document to store differences ((c) of FIG. 55) between the partial identification information (first version) ((a) of FIG. 55) and the second and subsequent versions of the partial identification information. In the first embodiment, it is only necessary to store the difference information, resulting in a significant reduction of storage/transmission data amount, as compared with the underlying technique 2 (see FIG. 56). Even when compared with a case where the underlying technique 2 functions most effectively, it is possible to reduce the storage/transmission data amount by the amount corresponding to that of the partial identification information (first edition) in the first embodiment.

Second Embodiment

As a method for further reducing the storage data in the first embodiment, in the second embodiment, an embedding method of the change difference information into a document will be described.

In the first embodiment, a verifier requires the same number of hush values as that of sanitized parts in addition to a document that has been sanitized most recently. In this case, when the hash value of a partial document before sanitizing is used as data message M for use in sanitizing the partial document, it is possible to eliminate the need to retain the hash value as sanitizing information.

The configuration of the second embodiment is the same as that used in the first embodiment. However, there is a difference in operation between them as follows. The operation processing is performed in the processing section 41A shown in FIG. 50. The operation performed in the second embodiment will be described below.

(Operation of Signature Processing)

Figure 57:
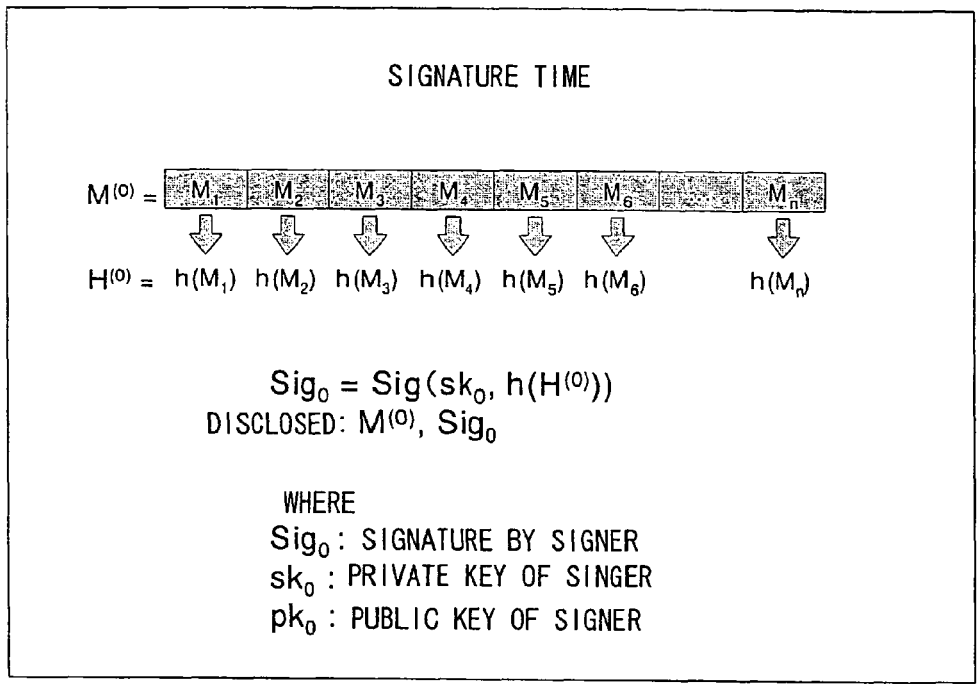
FIG. 57 is a view showing operation performed at the signature time in a second embodiment.

FIG. 57 is a view showing operation of the signature processing. The content shown in FIG. 57 is entirely the same as that shown in FIG. 51. Accordingly, there is no difference in operation of signature processing between the first and second embodiments, and the description thereof is omitted.

(Operation of Sanitizing Processing (1))

Figure 58:
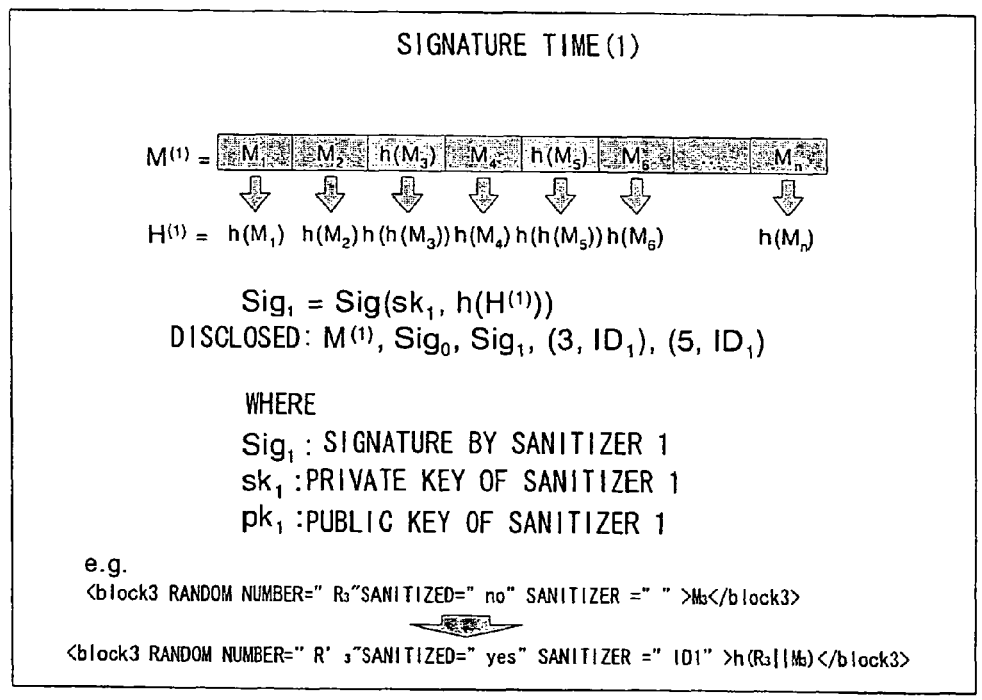
FIG. 58 is a view showing operation performed at the first sanitizing time in the second embodiment.

FIG. 58 is a view showing operation of the first sanitizing processing (1) applied to an original document. A change in the first sanitizing processing is as follows.

(S1) The document information management section 40A uses, in place of sanitizing information S, the hash value of partial identification information before sanitizing calculated by the partial identification information generation section 51 as signature restoration data to form the document information and allows the partial identification information generation section 51 to use it to generate the hush value.

In FIG. 58, H(M3) and h(M5) are used in place of S3 and S5.

(S2) Only the block number including a change and ID of the sanitizer that has created the signature restoration data (in this case, (3, ID1), (5, ID1)) are disclosed in place of the signature restoration data.

Since the block number denotes a location where the signature restoration data has been embedded, it is not always necessary to disclose the block number. The ID may also be embedded in place of the sanitizing information S like the signature restoration data. Further, as shown in the part denoted by "e.g." in FIG. 58, information may be stored as XML tag.

(Operation of Sanitizing Processing (2))

Figure 59:
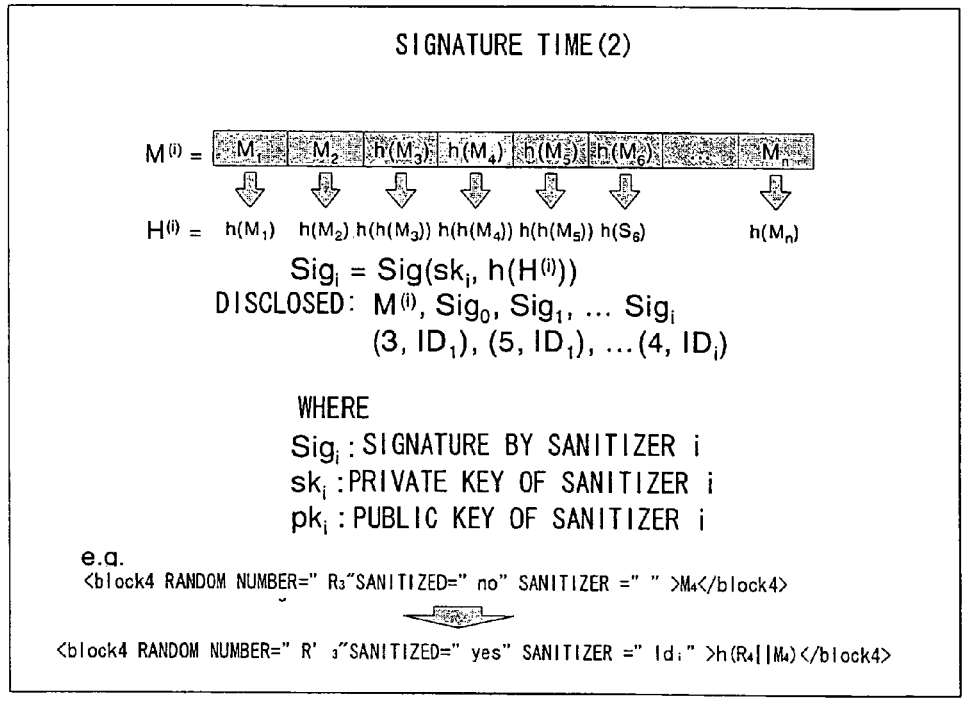
FIG. 59 is a view showing operation performed at the second and subsequent sanitizing time in the second embodiment.

FIG. 59 is a view showing operation of the second and subsequent (i-th (i≧2)) sanitizing processing (2). The content shown in FIG. 59 is entirely the same as that shown in FIG. 58. Accordingly, there is no difference in operation between the sanitizing processing (1) and (2).

(Operation of Signature Confirmation (Verification) Processing)

Figure 60:
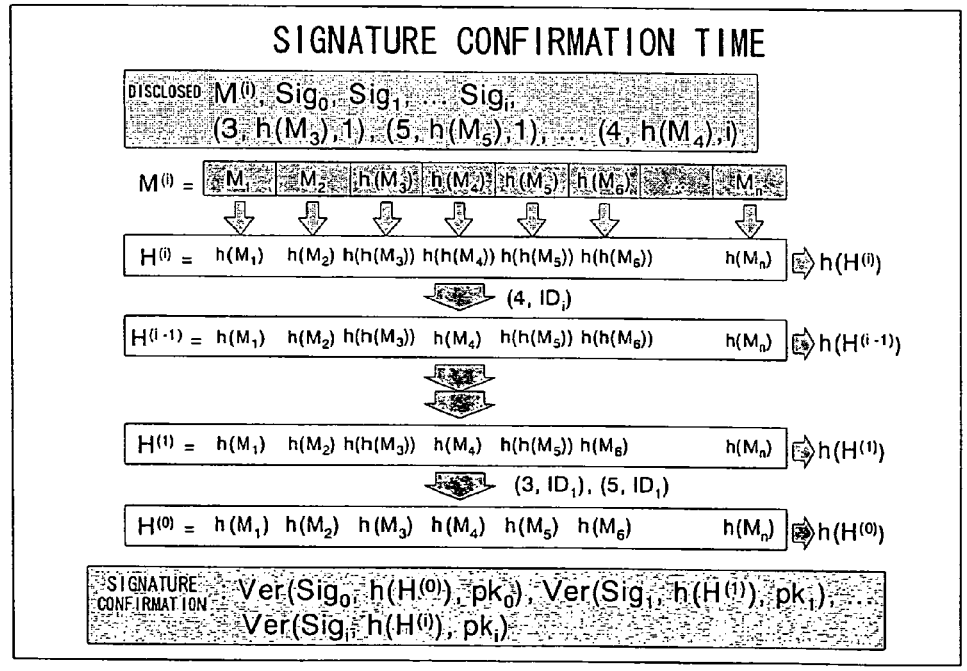
FIG. 60 is a view showing operation performed at the signature verification time in the second embodiment.

FIG. 60 is a view showing operation of the signature confirmation (verification) processing.

The signature confirmation processing according to the second embodiment is almost the same as that according to the first embodiment (FIG. 54) except that the hash value is restored not from the signature confirmation data but from the message of the changed block.

Figure 61:
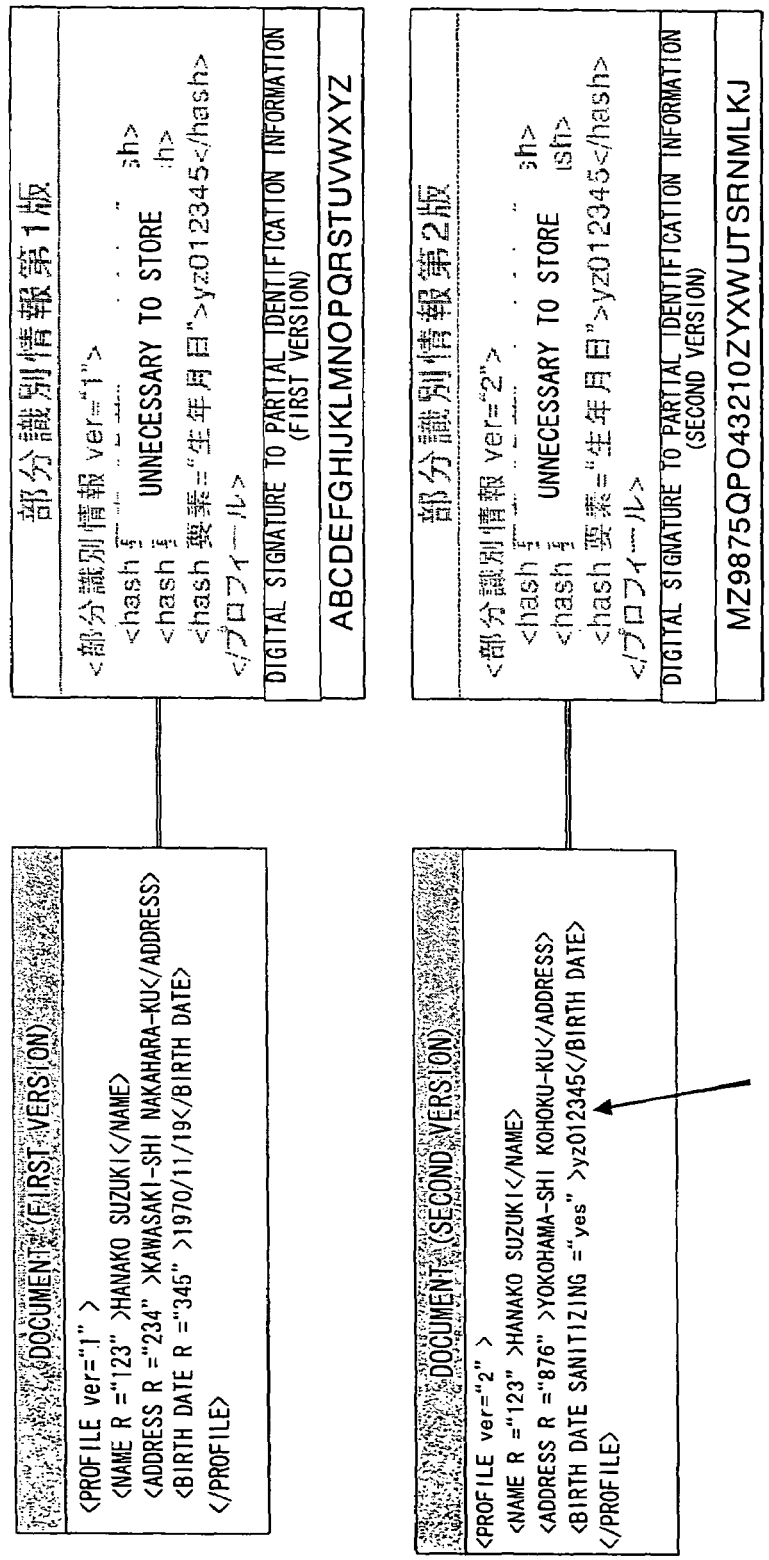
FIG. 61 is a view schematically showing effects of the first embodiment and second embodiment in comparison with the underlying technique.

FIG. 61 is a conceptual view showing the operation of the second embodiment. It can be seen from FIG. 61 that it is not at all necessary to store the partial identification information as meta data. FIG. 62 shows a result obtained by comparing the first and second embodiments with the underlying technique 2. However, in the case where the signature restoration data is embedded in the message, it is not possible to deal with a change or deletion (in which block itself is deleted). As a result, the information amount of the partial identification information can be reduced several times to several tens of times from that in the underlying technique 1 and two to several times from that in the underlying technique 2. Note that the information amount of the partial identification information in the underlying technique 2 can be reduced two to several times from that in the underlying technique 1.

Third Embodiment

In the third embodiment, a case where an Aggregate signature scheme is applied to the digital signature system will be described.

The Aggregate signature is a signature scheme capable of aggregating a plurality of signatures created by a plurality of signers and collectively verifying the aggregated signature. At the time when partial identification information is generated in association with occurrence of a correction and a signature is appended to the generated partial identification information as conventionally performed, the Aggregate signature is performed to aggregate a new signature on the signatures of previous versions. With this technique, it is possible to reduce the data amount of the digital signature which has been required by the number corresponding to that of versions to data amount corresponding to that of one digital signature.

In the following description, (General/Sequential) Aggregate signature (KG/AS/AV) is used. KG is an algorithm for generating a key, AS is an algorithm for generating a signature, and AV is an algorithm for verifying a signature. A j-th signer receives documents M1, . . . , Mj−1 and Aggregate signature σj−1 from a j−1th signer, uses the algorithm AS to generate a new Aggregate signature σj from a document Mj to which the j-th signer intends to append a signature and Aggregate signature σj−1, and outputs documents M1, . . . , Mj−1, Mj and Aggregate signature σj. A verifier of the Aggregate signature uses the algorithm AV to verify an Aggregate signature am for documents M1, . . . , Mm. When the verification results is valid, the integrity of all documents is assured.

The following documents are cited as reference sources.

[BGL+03] D. Boneh, C. Gentry, B. Lynn, and H. Shacham, "Aggregate and Verifiably Encrypted Signatures from Bilinear Maps." Eurocrypt 2003, LNCS 2656, pp. 416-432. Springer-Verlag, 2003.

[LMR+04] A. Lysyanskaya, S. Micali, L. Reyzin, H. Shacham, "Sequential Aggregate Signatures from Trapdoor Permutations" Eurocrypt 2004, LNCS 3027, pp. 74-90 Springer-Verlag, 2004.

The Aggregate signature, which is a kind of a group signature scheme, can aggregate a plurality of signatures on one signature.

1) $G_1$, $G_2$, $G_T$ constitute a cyclic group of order p

2) $g_1$ and $g_2$ are generation sources of $G_1$ and $G_2$

3) ψ is a computable isomorphism mapping ψ(g1)=g2 from $G_1$ to $G_2$ 4) e( ) is a computable bilinear mapping $G_1 \times G_2 \to GT$ When the above conditions 1) to 4) are satisfied, the following equation is satisfied.

$$e(g_1, \sigma) = e(g_1, \Pi_i h_i^{ski}) = \Pi_i e(g_1, h_i)^{ski} = \Pi_i e(g_1^{ski}, h_i) = \Pi_i e(pk_i, h_i)$$

(where $pk_i = g_1^{ski}$, $\sigma_1 = h_i^{ski}$, $\sigma = \Pi_i \sigma_i$)

Assuming that ski and pki are private key/public key and σ is Aggregate signature, the superimposition of signatures can be realized.

Unlike with ordinary signature scheme, the output range of the hush function h is $G_1$. While the calculation of the Aggregate signature is performed as described above, what is important in this example is as follows.

What is important is, assuming that signature of m1 in Aggregate signature function is set such that σ1=SigA(sk1, m1) is satisfied, signature of m2 in Aggregate signature function is set such that σ2=SigA(sk2, m2) is satisfied, and signature of m3 in Aggregate signature function is set such that σ3=SigA(sk3, m3) is satisfied, superimposition σ=σ1×σ2×σ3 of signature can be calculated, and verification can be performed using VerA(pk1, pk2,pk3,σ,m1,m2,m3) at signature verification time.

It should be noted that, while

Ver(pk1,σ1,m1,m2,m3)

Ver(pk2,σ2,m1,m2,m3)

Ver(pk3,σ3,m1,m2,m3) and three signatures (σ1, σ2, σ3) are required in the ordinary signature verification, only σ is required in the Aggregate signature, reducing the data amount to one-third. σ1 to σ3 are called individual signatures, and aggregated signature σ is called Aggregate signature.

While the Aggregate signature using bilinear mapping is described in the present specification (General Aggregate Signature), there is available a conventional Aggregate signature scheme based on RSA such as one that has been proposed in the following papers.

[LMRS04] (Proposed Paper About Sequential Aggregate Signature)
A. Lysyanskaya, S. Micali, L. Reyzin, and H. Schacham, "Sequential Aggregate Signatures from Trapdoor Permutations" Eurocrypt 2004, LNCS 3027, pp. 74-90, 2004.
[TSNT05] (Modification Of Sequential Aggregate Signature)
Isamu Teranishi, Kazue Sako, Jun Noda, Daigo Taguchi, "A New Length invariant Sequential Aggregate Signature Scheme Based on RSA" Information Processing Society of Japan/Computer Security Group (CSEC) May, 2005.

Operation in association with the Aggregate signature will be described below.

(Operation Of Signature Processing)

FIG. 63 shows operation performed at signature time. A different point is that an Aggregate signature function is used in place of a signature function to calculate an individual signature σ0, and an Aggregate signature σ(0) thus obtained is disclosed.

(Operation of Sanitizing Processing (1))

FIG. 64 is a view showing operation of the first sanitizing processing (1) applied to an original document.

A different point that, as in the case of the above signature processing operation, an Aggregate signature function is used in place of a signature function to calculate an individual signature σ1, the Aggregate signature σ(0) of the signer is multiplied by a sanitizer's own individual signature σ1, and only thus obtained Aggregate signature σ(1) is disclosed.

(Operation Of Sanitizing Processing (2))

FIG. 65 is a view showing operation of the second and subsequent (i-th (i≧2)) sanitizing processing (2). The content shown in FIG. 65 is entirely the same as that shown in FIG. 64. Accordingly, there is no difference in operation between the sanitizing processing (1) and (2).

(Operation Of Signature Confirmation (Verification) Processing)

Figure 66:
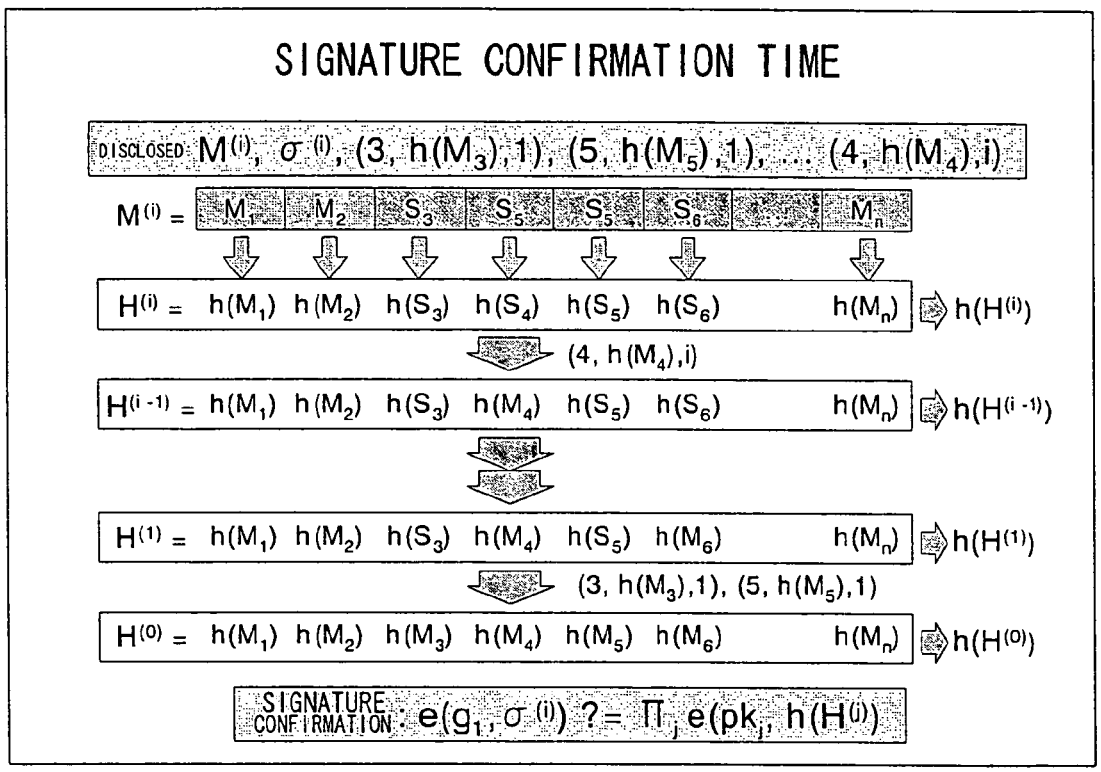
FIG. 66 is a view showing operation performed at the signature verification time in the third embodiment.

FIG. 66 is a view showing operation of the signature confirmation (verification) processing.

Only a different point from the signature verification shown in FIG. 54 is that verification is made for the Aggregate signature.

Figure 67:
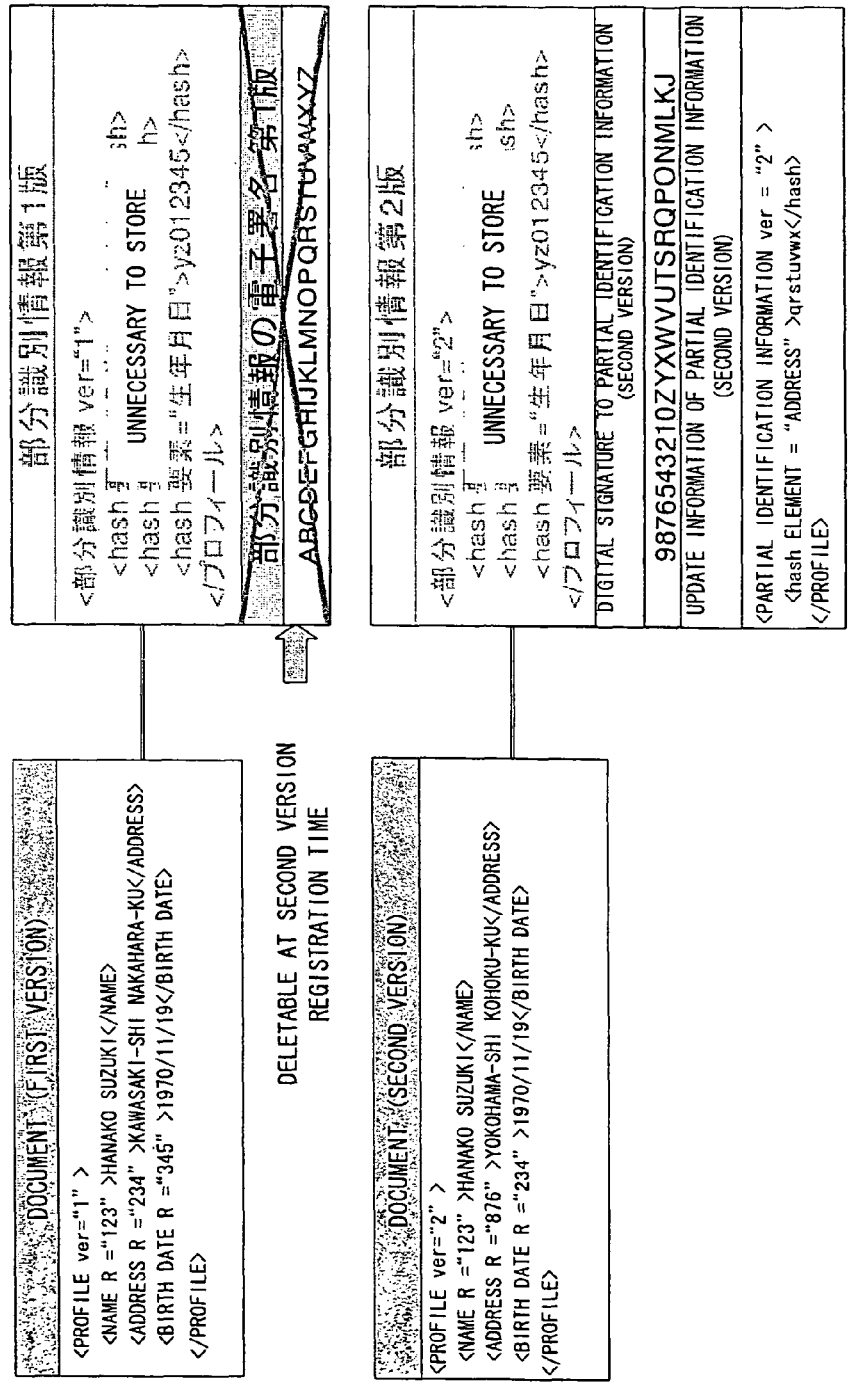
FIG. 67 is a view showing the overview of the operation performed in the third embodiment.

In the PIAT signature described in the abovementioned underlying techniques 1 and 2, and first and second embodiments, the verifier requires m+1 signatures created by a signer and m sanitizers. By using the Aggregate signature in place of these signatures, it is possible to reduce the requisite number of signatures to one (FIG. 67). However, the requisite number of partial identification information is not changed. By applying the Aggregate signature scheme to the above-mentioned underlying techniques 1 and 2, and first and second embodiments, it is also possible to reduce the number of signatures to be managed in the above document management techniques to one (FIG. 68). In this case, however, identification of an illegal sanitizer is made disabled. This is because that when the verification for the Aggregation signature fails, it is impossible to identify for which singer/sanitizer's signature the verification has failed. Other functions of the Aggregate signature at the signature verification time are the same as those in the PIAT signature.

By combining the configuration of the second embodiment and Aggregate signature scheme of the third embodiment, a significant storage data reduction can be realized. Further, this combined configuration requires only one signature and no hash value, realizing an optimal configuration from the viewpoint of the data amount that the verifier requires. Even in this case, the required minimum function as a sanitizable signature scheme can be realized.

In the following, a case will be described where the Aggregate signature is performed by taking a concrete example constituted by "Hanako Suzuki" and other two persons (Taro Sato and Minoru Yamada) who have appeared in the underlying technique 2.

(Preparation)

In the case where the Aggregate signature scheme is applied, "Hanko Suzuki", "Taro Sato", and "Minoru Yamada" have a key for signature corresponding to an Aggregate signature respectively. Further, common parameters for signature are shared between them. Since the data amount of the signature to be appended to an agreement document main body is not reduced even with application of the Aggregate signature in the case of the example of the scene 1, the Aggregate signature is applied to the signature to be appended to the partial identification information. The signature to be appended to individual documents (partial identification information) is called individual signature, and the signature obtained by aggregating the individual signatures using shared information is called aggregated signature. In the verification using the Aggregate signature scheme, it is only necessary to perform verification for the aggregated signature and respective documents (partial identification information). In this case, verification for the individual signatures is not necessary.

The Aggregate signature scheme can be described as follows:

Creation of individual signatures for documents Mi=creation of an aggregated signature from (σi=Sign(Mi)n) individual signatures $$\sigma = \sigma 0 \times \sigma 1 \times \sigma 2 \times \ldots \sigma n$$

For example, in the case of the Aggregate signature scheme using bilinear mapping, Sign(Mi) is realized by a signature scheme based on an elliptic curve cryptosystem, and the aggregated signature creation can be realized by multiplication residue arithmetic on the method P (parameters of Aggregate signature) of the individual signatures.

(New Document Creation Time)

(A) Creation Time of New Agreement Document

Partial identification information corresponding to a new agreement document is generated at the time when the agreement document is created, and a signature of "Hanako Suzuki" is appended thereto. The signature created at this time is regarded as an individual signature of "Hanako Suzuki" in the Aggregate signature scheme. The individual signature of "Hanako Suzuki" is used as the first aggregated signature, and the individual signature itself is discarded. Assuming that the aggregated signature is σ and individual signature of "Hanako Suzuki" for the partial identification information is σ1, an expression σ←σ1 can be obtained ("←" represents substitution).

(Correction Time)

(B) Registration Data Correction Function (Used at the Time When Sanitizing is Partially Applied to an Agreement Document)

At the data correction time, an individual signature of "Hanako Suzuki" is appended to partial identification information corresponding to a corrected agreement document.

Subsequently, as an aggregated signature, the individual signature of "Hanako Suzuki" appended to the partial identification information (second version) is aggregated on the aggregated signature appended to the first version. After that, the individual signature of "Hanako Suzuki" is discarded. Assuming that the aggregated signature is σ and individual signature of "Hanako Suzuki" for the partial identification information (second version) is σ2, an expression σ←σ×σ2 can be obtained.

(Verification Time)

(C) Integrity/Validity Verification Time of Corrected Agreement Document

Signature verification is performed using the restored partial identification information (first and second versions) and aggregated signature according to the verification processing of the Aggregate signature scheme.

(Sanitizing Time)

(B) Registration Data Correction Function (this Function is Used when Sanitizing is Applied to the Agreement Document)

The Aggregate signature processing entirely the same as that performed at the correction time is performed.

(Transmission Time)

(D) Registration Data Distribution (Transmission) Function (Used at the Transmission Time of an Agreement Document)

At the data transmission time, signature/signature verification processing is not performed. The data to be transmitted is almost the same as those described above. Only a different point is that not the signatures corresponding to respective versions of partial identification information, but one aggregated signature is transmitted.

(Reception Time)

(E) Registration Data Distribution (Reception) Function (Used at the Reception Time of an Agreement Document)

At the data reception time, the same processing as that performed at the (B) verification time is performed.

(Output Time of Third-Party Verification)

(F) Verification Data Acquisition Function (Used when an Agreement Document is Exhibited as Evidence in a Court Case)

At the data transmission time, signature/signature verification processing is not performed. The data for verification is almost the same as those described above. Only a different point is that not the signatures corresponding to respective versions of partial identification information, but one aggregated signature is output.

As described above, two signatures of "Hanako Suzuki" and one signature of "Taro Sato" needs to be stored/transmitted when ordinary signature processing is applied to the data corresponding to partial identification information; whereas, when the Aggregate signature scheme is applied, the above three signatures are aggregated on one aggregated signature and therefore it is only necessary to store/transmit one aggregated signature, significantly reducing storage/transmission data amount.

Fourth Embodiment

In the above-described third embodiment, the Aggregate signatures (σ(0), σ(1), σ(2), ...) are disclosed to the verifiers and the like. Therefore, in the case where Aggregate signatures are generated starting from a first signer to the subsequent one or plurality of correctors (sanitizers), if a first Aggregate signature or one of the subsequent Aggregate signatures and the hush value (H(n)) related to the last sanitized document can be acquired, a fake signature can be generated based on them.

For example, there is a fear that a malicious person uses signature σ (0) made by a first signer and hush value (H (n)) related to the last document to create an individual signature σ(A) and then creates Aggregate signature σ←σ×σ(A) to thereby falsifying a signature. This becomes a serious problem particularly when who is an actual document corrector (sanitizer) has an important meaning.

The above problem arises because the Aggregate signature itself is exchanged between the sanitizers and therefore a malicious person can acquire the data on a communication line. To cope with the above problem, in the fourth embodiment, the Aggregate signature to be exchanged on a communication line is encrypted to prevent the signature data from being restored by a malicious person.

Figure 69:
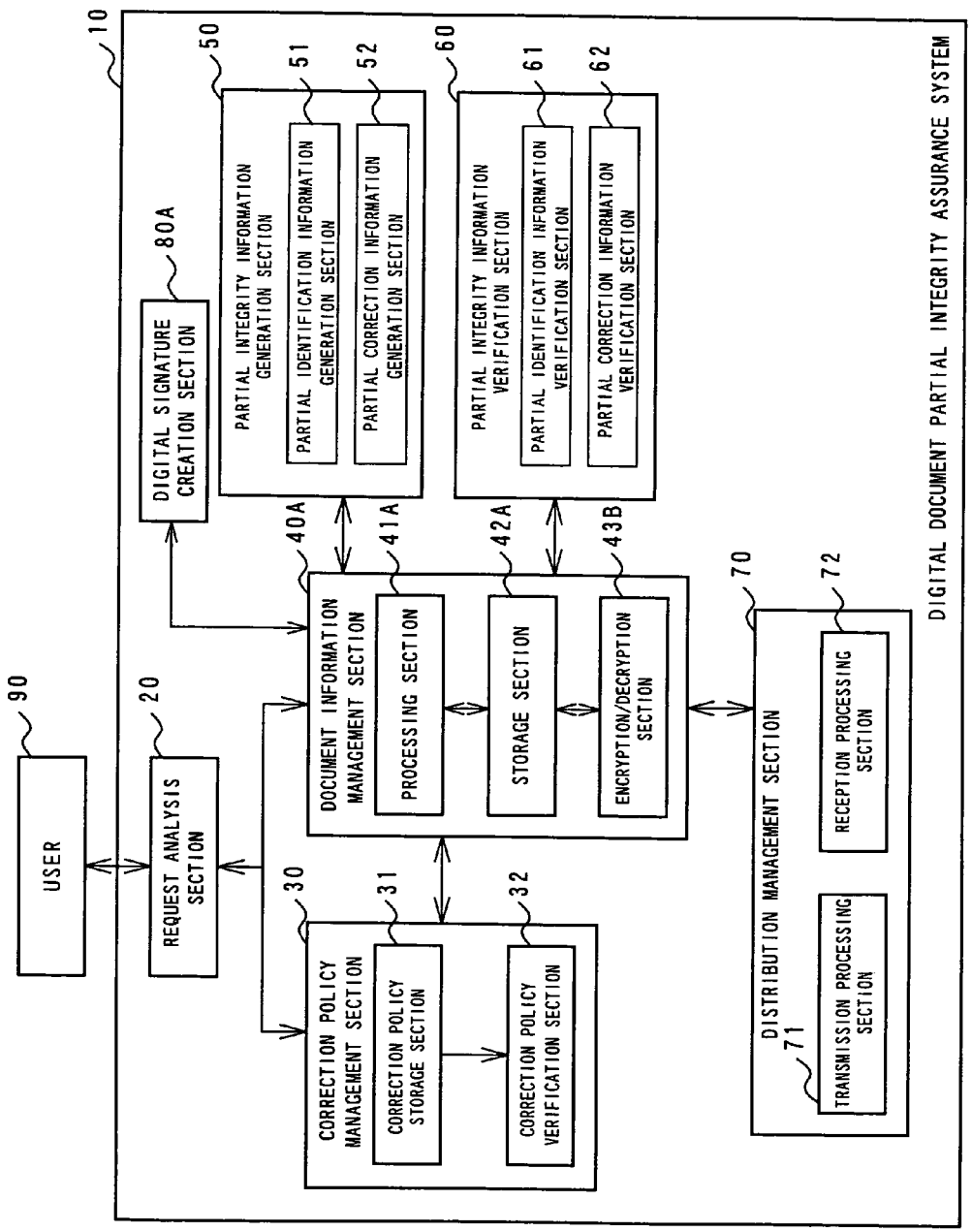
FIG. 69 is a block diagram showing a configuration of a fourth embodiment.

To this end, as shown in FIG. 69, an encryption/decryption section 43B (which corresponds to an encryption section in the present invention) is provided in the document information management section 40A. When the signature data is transmitted on a communication line from the transmission processing section 71, the encryption/decryption section 43B encrypts the Aggregate signature. When the signature data is received from a communication line, the encryption/decryption section 43B decrypts the Aggregate signature. Hereinafter, details of the encryption process will be described. Countermeasure 1 describes an encryption process using a function (encryption using an encryption key). Countermeasure 2 describes an encryption process using a logical operation (a given random number is added to a digital signature). The following description is given based on FIGS. 63 to 65.

(Countermeasure 1)

(S1) A signer (e.g., document creator 0) that has appended a signature to created partial documents calculates hush values corresponding to the partial documents by the system and generates a signature σ(0) corresponding to the hush values.

(S2) The digital signature creation section 80A performs a first Aggregate signature (σ0←σ(0)).

(S3) The encryption/decryption 43B encrypts(c0←Enc (σ0, key1)) to the obtained Aggregate signature and transmits the encrypted Aggregate signature. The Enc(σ0, key1) represents a process in which σ0 is encrypted with an encryption key key1 of a sanitizer 1.

(S4) The system that has received the encrypted Aggregate signature decrypts it according to an instruction of the sanitizer 1 to calculate σ0←Dec(c0,key1'). The Dec(c0,key1') represents a process in which c0 is decrypted with a decryption key key1' of the sanitizer 1. In this case, key1 may be equal to key1'.

(S5) The sanitizer 1 generates a new sanitized document based on the received σ0.

(S6) In the system, the sanitizer 1 calculates hush values corresponding to partial documents of the new sanitized document and generates a signature σ(1) corresponding to the hush values.

(S7) Also, in the digital signature creation section, the sanitizer 1 calculates a second Aggregate signature σ1 which is an Aggregate signature of σ0 and σ(1).

(S8) The sanitizer 1 applies encryption (c1←Enc(σ1, key2)) to this Aggregate signature and transmits it to a sanitizer 2. The Enc(σ1, key2) represents a process in which σ1 is encrypted with an encryption key key2 of a sanitizer 2.

(S9) A system that has received the encrypted Aggregate signature decrypts it according to an instruction of the sanitizer 2 to calculate σ1←Dec(c1,key2'). The Dec(c1,key2')

represents a process in which c1 is decrypted with a decryption key key2' of the sanitizer 2. In this case, key2 may be equal to key2'.

(S10) The sanitizer 2 generates a new sanitized document based on the received document.

(S11) The sanitizer 2 calculates hush values corresponding to partial documents of the new sanitized document and generates a signature $\sigma(2)$ corresponding to the hush values.

(S12) The sanitizer 1 calculates a third Aggregate signature $\sigma 2$ which is an Aggregate signature of $\sigma 1$ and $\sigma(2)$. In the case where a sanitizer 3 exists next to the sanitizer 2, the step S8 and subsequent steps are repeated.

(Countermeasure 2)

(S1) A signer (e.g., document creator 0) that has appended a signature to created partial documents calculates hush values corresponding to the partial documents and generates a signature $\sigma(0)$ corresponding to the hush values.

(S2) The signer performs a first Aggregate signature ($\sigma 0 \leftarrow \sigma(0)$).

(S3) The singer calculates $\sigma 0 \leftarrow \sigma(0)+$key 1 for the obtained Aggregate signature and transmits it to a sanitizer 1.

'+' is exclusive OR for each bit and represents operations such as addition, subtraction, multiplication, and division. The key1 represents secret information (e.g., password) previously given from the sanitizer 1.

(S4) A system that has received the encrypted Aggregate signature calculates $\sigma 0$ from $\sigma 0'$ and key1 according to an instruction of the sanitizer 1.

(S5) The sanitizer 1 generates a new sanitized document based on the received $\sigma 0$.

(S6) The sanitizer 1 calculates hush values corresponding to partial documents of the new sanitized document and generates a signature $\sigma(1)$ corresponding to the hush values.

(S7) The sanitizer 1 calculates a second Aggregate signature $\sigma 1$ which is an Aggregate signature of $\sigma 0$ and $\sigma(1)$.

(S8) The sanitizer 1 calculates $\sigma 1' \leftarrow \sigma(1)+$key2 for the obtained Aggregate signature and transmits it to a sanitizer 2.

'+' is exclusive OR for each bit and represents operations such as addition, subtraction, multiplication, and division. The key1 represents secret information (e.g., password) previously given from the sanitizer 1.

(S9) A system that has received the encrypted Aggregate signature calculates $\sigma 1$ from $\sigma 1$ and key2 according to an instruction of the sanitizer 2.

(S10) The sanitizer 2 generates a new sanitized document based on the received $\sigma 1$.

(S11) The sanitizer 2 calculates hush values corresponding to partial documents of the new sanitized document and generates a signature $\sigma(2)$ corresponding to the hush values.

(S12) The sanitizer 2 calculates a third Aggregate signature $\sigma 2$ which is an Aggregate signature of $\sigma 1$ and $\sigma(2)$. In the case where a sanitizer 3 exists next to the sanitizer 2, the step S8 and subsequent steps are repeated.

Further, it is possible to provide a digital document management program according to the present invention by preparing a program that allows a computer to execute the above operation shown in the flowcharts or steps. By storing the above program in a computer-readable storage medium, it is possible to allow the computer to execute the program. The computer-readable medium mentioned here includes: a portable storage medium such as a CD-ROM, a flexible disk, a DVD disk, a magneto-optical disk, or an IC card; a database that holds computer program; and another computer and database thereof.

What is claimed is:

1. A non-transitory computer readable medium storing a digital document management program that allows a computer to manage document information created and registered in a digital form, the program causing the computer to execute a process comprising:

dividing the document information into a plurality of parts and generating partial identification information that represents the respective parts of the document information using a hash function for the respective parts of the document information;

substituting a part of the document information to be undisclosed with the partial identification information of the part of the document information to be undisclosed at a correction time of the document information;

creating a digital signature to be appended to the document information using the partial identification information;

managing the document information; and verifying the validity of the managed document information, wherein at the registration time of new document information, the managing manages a digital signature created by the creating in association with the document information and, at the correction time of the document information, the managing acquires partial identification information related to a substituted part of the document information before substitution, allows the creating to create a digital signature to be appended to the substituted document information, and manages the digital signature and partial identification information related to the substituted part of the document information before substitution in association with the substituted document information, and the verifying uses the partial identification information and digital signature managed in association with the substituted document information by the managing and partial identification information newly created from the substituted document information by the dividing to perform the verification.

2. The computer readable medium according to claim 1, wherein the creating uses a set of partial identification information created by the dividing and a private key as parameters to create a digital signature according to a signature function.

3. The computer readable medium according to claim 1, wherein the creating uses an Aggregate signature function which is a kind of a group signature scheme and which is capable of aggregating a plurality of signatures on one signature.

4. The computer readable medium according to claim 1, wherein the partial identification information managed in association with the substituted document information is managed separately from the substituted document information data.

5. The computer readable medium according to claim 1, wherein the partial identification information is managed by being embedded in the substituted document information.

6. The computer readable medium according to claim 1, further comprising:

storing previously defined policy information; and generating partial correction information which is information related to a correction history of a substituted part in the case where any substitution has been made for the document information, wherein in the case where any substitution has been made for a part of the document information, the managing allows the generating to generate partial correction information and manages the generated partial correction information and policy information stored by the storing in association with the substituted document information, and the verifying uses the partial correction information and policy information in addition to the partial identification information and signature information managed in association with the substituted document information by the managing to verify the validity of the document information.

7. The computer readable medium according to claim 1, wherein
the information managed by the managing is constituted by XML data having a hierarchical document structure.

8. The computer readable medium according to claim 1, further comprising encrypting a digital signature created by the creating.

9. The computer readable medium according to claim 1, wherein
the managing handles all digital information as original document information corresponding to version numbers, and controls the content of the original document information managed based on the version numbers so that the content is hidden from unauthorized persons depending on the content thereof in the respective versions.

10. A digital document management system running on a processor that manages document information created and registered in a digital form, comprising:
a partial identification information generation section that divides the document information into a plurality of parts and generates partial identification information that represents the respective parts of the document information using a hash function for the respective parts of the document information;
a processing section that substitutes a part of the document information to be undisclosed with the partial identification information of the part of the document information to be undisclosed at a correction time of the document information;
a digital signature creation section that creates a digital signature to be appended to the document information using the partial identification information;
a management section that manages the document information; and
a verification section that verifies the validity of the managed document information, wherein
at the registration time of new document information, the management section manages a digital signature created by the digital signature creation section in association with the document information and, at the correction time of the document information, the management section acquires partial identification information related to a substituted part of the document information before substitution, allows the digital signature creation section to create a digital signature to be appended to the substituted document information, and manages the digital signature and partial identification information related to the substituted part of the document information before substitution in association with the substituted document information, and
the verification section uses the partial identification information and digital signature managed in association with the substituted document information by the management section and partial identification information newly created from the substituted document information by the partial identification information generation section to perform the verification.

11. The digital document management system according to claim 10, wherein
the digital signature creation section uses a set of partial identification information created by the partial identification information generation section and a private key as parameters to create a digital signature according to a signature function.

12. The digital document management system according to claim 10, wherein
the digital signature creation section uses an Aggregate signature function which is a kind of a group signature scheme and which is capable of aggregating a plurality of signatures on one signature.

13. The digital document management system according to claim 10, wherein
the partial identification information managed in association with the substituted document information is managed separately from the substituted document information data.

14. The digital document management system according to claim 10, wherein
the partial identification information is managed by being embedded in the substituted document information.

15. The digital document management system according to claim 10, further comprising:
a policy information storage section that stores previously defined policy information; and
a partial correction information generation section that generates partial correction information which is information related to a correction history of a substituted part in the case where any substitution has been made for the document information, wherein
in the case where any substitution has been made for a part of the document information, the management section allows the partial correction information generation section to generate partial correction information and manages the generated partial correction information and policy information stored by the policy information storage section in association with the substituted document information, and
the verification section uses the partial correction information and policy information in addition to the partial identification information and signature information managed in association with the substituted document information by the management section to verify the validity of the document information.

16. The digital document management system according to claim 10, wherein
the management section handles all digital information as original document information corresponding to version numbers, and controls the content of the original document information managed based on the version numbers so that the content is hidden from unauthorized persons depending on the content thereof in the respective versions.

17. A digital document management method that manages document information created and registered in a digital form by a computer, comprising:
dividing the document information into a plurality of parts and generating partial identification information that represents the respective parts of the document information using a hash function for the respective parts of the document information;
substituting a part of the document information to be undisclosed with the partial identification information of the part of the document information to be undisclosed at a correction time of the document information;

creating a digital signature to be appended to the document information using the partial identification information;

managing the document information; and verifying the validity of the managed document information, wherein at the registration time of new document information, the managing manages a digital signature created by the creating in association with the document information and, at the correction time of the document information, managing acquires partial identification information related to a substituted part of the document information before substitution, allows the digital signature creation section to create a digital signature to be appended to the substituted document information, and manages the digital signature and partial identification information related to the substituted part of the document information before substitution in association with the substituted document information, and the verifying uses the partial identification information and digital signature managed in association with the substituted document information by the managing and partial identification information newly created from the substituted document information by the dividing to perform the verification.

18. The digital document management method according to claim 17, wherein the creating uses a set of partial identification information created by the dividing and a private key to create a digital signature according to an Aggregate signature function which is a kind of a group signature scheme and which is capable of aggregating a plurality of signatures on one signature.

19. The digital document management method according to claim 17, wherein the managing handles all digital information as original document information corresponding to version numbers, and controls the content of the original document information managed based on the version numbers so that the content is hidden from unauthorized persons depending on the content thereof in the respective versions.

* * * * *